US012586506B2

(12) United States Patent
Zhu et al.

(10) Patent No.: US 12,586,506 B2
(45) Date of Patent: Mar. 24, 2026

(54) DISPLAY DRIVING CIRCUIT AND DISPLAY DEVICE

(71) Applicants: Wuhan BOE Optoelectronics Technology Co., Ltd., Hubei (CN); BOE TECHNOLOGY GROUP CO., LTD., Beijing (CN)

(72) Inventors: Ning Zhu, Beijing (CN); Chao Wang, Beijing (CN); Yun Li, Beijing (CN); Xiaoxiao Chen, Beijing (CN); Peng Jiang, Beijing (CN)

(73) Assignees: Wuhan BOE Optoelectronics Technology Co., Ltd., Wuhan (CN); BOE TECHNOLOGY GROUP CO., LTD., Beijing (CN)

( * ) Notice: Subject to any disclaimer, the term of this patent is extended or adjusted under 35 U.S.C. 154(b) by 263 days.

(21) Appl. No.: 18/245,708

(22) PCT Filed: Jun. 29, 2022

(86) PCT No.: PCT/CN2022/102548
§ 371 (c)(1),
(2) Date: Mar. 16, 2023

(87) PCT Pub. No.: WO2024/000328
PCT Pub. Date: Jan. 4, 2024

(65) Prior Publication Data

US 2025/0279027 A1 Sep. 4, 2025

(51) Int. Cl.
*G09G 5/20* (2006.01)
*G09G 3/20* (2006.01)

(52) U.S. Cl.
CPC ... *G09G 3/2092* (2013.01); *G09G 2300/0819* (2013.01); *G09G 2310/0267* (2013.01);
(Continued)

(58) Field of Classification Search
CPC ......... G09G 3/2092; G09G 2300/0819; G09G 2310/0267; G09G 2310/08; G09G 2320/0242; G09G 2330/021
(Continued)

(56) References Cited

U.S. PATENT DOCUMENTS 11,151,943 B1 10/2021 Xue et al.
2004/0165692 A1 8/2004 Moon et al.
(Continued)

FOREIGN PATENT DOCUMENTS

CN 105304011 A 2/2016
CN 105632565 A 6/2016
(Continued)

*Primary Examiner* — Jennifer T Nguyen
(74) *Attorney, Agent, or Firm* — McCoy Russell LLP

(57) ABSTRACT

The present disclosure provides a display driving circuit and a display device. The display driving circuit includes two gate driving circuits, the gate driving circuit includes a plurality of cascaded driving circuits; the driving circuit includes N clock signal terminals, N output sub-circuits and N driving signal output terminals; N is an integer greater than or equal to 2; the N output sub-circuits share a first pull-up node; an ith driving signal output terminal of one driving circuit is electrically connected to an (i+j)th driving signal output terminal of the other driving circuit, and both i and j are positive integers, i is a positive integer less than or equal to N, j is a positive integer less than or equal to N, and i+j is a positive integer less than or equal to N.

19 Claims, 31 Drawing Sheets

(52) U.S. Cl.
CPC . *G09G 2310/08* (2013.01); *G09G 2320/0242* (2013.01); *G09G 2330/021* (2013.01)

(58) Field of Classification Search
USPC ............................................................ 345/55
See application file for complete search history.

(56) References Cited

U.S. PATENT DOCUMENTS

| | | | | |
|---|---|---|---|---|
| 2017/0213515 | A1 | 7/2017 | Chen et al. | |
| 2017/0365204 | A1 | 12/2017 | Choi et al. | |
| 2018/0018920 | A1* | 1/2018 | Kim ..................... | G09G 3/3266 |
| 2020/0051655 | A1* | 2/2020 | Dong ................... | G09G 3/3677 |
| 2020/0286570 | A1 | 9/2020 | Shan et al. | |
| 2020/0302844 | A1* | 9/2020 | Huang ................... | G11C 19/28 |
| 2021/0065829 | A1 | 3/2021 | Feng et al. | |
| 2021/0150988 | A1 | 5/2021 | Yuan et al. | |
| 2021/0327387 | A1 | 10/2021 | Iwase et al. | |

FOREIGN PATENT DOCUMENTS

| | | | |
|---|---|---|---|
| CN | 106128380 | A | 11/2016 |
| CN | 107622758 | A | 1/2018 |
| CN | 109272960 | A | 1/2019 |
| CN | 110390903 | A | 10/2019 |
| CN | 109841194 | B | 4/2020 |
| CN | 111402774 | A | 7/2020 |
| CN | 110517637 | B | 5/2021 |
| CN | 113539197 | A | 10/2021 |
| TW | 200421352 | A | 10/2004 |
| WO | 2020098310 | A1 | 5/2020 |

* cited by examiner

DISPLAY DRIVING CIRCUIT AND DISPLAY DEVICE

CROSS REFERENCE TO RELATED APPLICATION

The present disclosure is the U.S. national phase of PCT Application No. PCT/CN2022/102548 filed on Jun. 29, 2022, which are incorporated herein by reference in their entireties.

TECHNICAL FIELD

The present disclosure relates to the field of display technology, in particular to a display driving circuit and a display device.

BACKGROUND

Related display products are designed using a bilaterally symmetrical Gate On Array (GOA, gate driving circuit on the array substrate) model design, which is difficult to achieve the narrow frame. For full screens and increasingly stringent product frames, wiring space are severely restricted, and it is difficult to meet the product requirements of high resolution and high refresh rate.

SUMMARY

In one aspect, the present disclosure provides in some embodiments a display driving circuit, including two gate driving circuits, wherein the two gate driving circuits are respectively arranged on two opposite sides of a display panel; the gate driving circuit includes a plurality of cascaded driving circuits; the driving circuit includes N clock signal terminals, N output sub-circuits and N driving signal output terminals; N is an integer greater than or equal to 2; the N output sub-circuits share a first pull-up node; an nth output sub-circuit is used to control to output an nth driving signal through an nth driving signal output terminal according to an nth clock signal provided by an nth clock signal terminal under the control of a potential of the first pull-up node; n is a positive integer less than or equal to N; an ith driving signal output terminal of one of the two driving circuits is electrically connected to an (i+j)th driving signal output terminal of the other of the two driving circuits, and both i and j are positive integers, i is a positive integer less than or equal to N, j is a positive integer less than or equal to N, and i+j is a positive integer less than or equal to N; when a potential of an ith clock signal provided by the ith clock signal terminal among the N clock signal terminals jumps from an invalid level to a valid level, the potential of the first pull-up node is a first voltage value, when a potential of an (i+j)th clock signal provided by the (i+j)th clock signal terminal among the N clock signal terminals jumps from an invalid level to a valid level, the potential of the first pull-up node is a second voltage value; the first voltage value is not equal to the second voltage value; a time period during which the potential of the ith clock signal continues to be at the valid level and a time period during which the potential of the (i+j)th clock signal continues to be at the valid level at least partially overlap; a time point when the potential of the ith clock signal jumps from the valid level to the invalid level is different from a time point when the potential of the (i+j)th clock signal jumps from the valid level to the invalid level.

Optionally, when the potential of the ith clock signal jumps from the valid level to the invalid level, the potential of the first pull-up node is a third voltage value; when the potential of the (i+j)th clock signal jumps from the valid level to the invalid level, the potential of the first pull-up node is a fourth voltage value; the third voltage value is not equal to the fourth voltage value.

Optionally, when the potential of the ith clock signal jumps from the invalid level to the valid level, within a first time period, the potential of the first pull-up node rises by a first potential height; when the potential of the (i+j)th clock signal jumps from the invalid level to the valid level, within a second time, the potential of the first pull-up node rises by a second potential height; the first potential height is not equal to the second potential height, and/or, the first time is not equal to the second time.

Optionally, when the potential of the ith clock signal jumps from the valid level to the invalid level, within a third time period, the potential of the first pull-up node drops by a third potential height; when the potential of the (i+j)th clock signal jumps from the valid level to the invalid level, within a fourth time, the potential of the first pull-up node drops by a fourth potential height; the third potential height is not equal to the fourth potential height, and/or, the third time is not equal to the fourth time.

Optionally, the driving circuit includes a capacitor arranged between an ath driving signal terminal and the first pull-up node, the first time is less than the second time, and the first potential height is smaller than the second potential height; a is an even number, and a is a positive integer; or; the driving circuit includes a capacitor arranged between a bth driving signal terminal and the first pull-up node, the first time is greater than the second time, and the first potential height is greater than the second potential height; b is an odd number, and b is a positive integer.

Optionally, the driving circuit includes a capacitor arranged between the ath driving signal terminal and the first pull-up node, the third time is less than the fourth time, and the third potential height is greater than the fourth potential height; a is an even number, and a is a positive integer; or; the driving circuit includes a capacitor arranged between the bth driving signal terminal and the first pull-up node, the third time is greater than the fourth time, and the third potential height is less than the fourth potential height; b is an odd number, and b is a positive integer.

Optionally, the driving circuit further includes a first input sub-circuit, a first pull-down sub-circuit, a first pull-down node control sub-circuit, and N output reset sub-circuits; the N output reset sub-circuits share the first pull-down node; the first input sub-circuit is configured to control the potential of the first pull-up node under the control of a first input signal provided by the first input terminal; the first pull-down sub-circuit is electrically connected to the first pull-up node, the first pull-down node, a first reset terminal and the first voltage terminal respectively, and is used to control to connect the first pull-up node and the first voltage terminal under the control of the potential of the first pull-down node, and control to connect the first pull-up node and the first voltage terminal under the control of a first reset signal provided by the first reset terminal; the first pull-down node control sub-circuit is electrically connected to a first control voltage terminal, the first pull-up node, the first pull-down node and the first voltage terminal, and is configured to control the potential of the first pull-down node under the control of a first control voltage provided by the first control voltage terminal and the potential of the first pull-up node, according to a first voltage signal provided by the first voltage terminal; an nth output reset sub-circuit is electrically connected to the first pull-down node, a second voltage terminal, and an nth driving signal output terminal, and is used to control to connect the nth driving signal output terminal and the second voltage terminal under the control of the potential of the first pull-down node.

Optionally, the driving circuit further includes a first carry signal output terminal and a first carry output sub-circuit; the first carry output sub-circuit is electrically connected to the first pull-up node, the first carry signal output terminal and a first carry clock signal terminal respectively, and is configured to control to connect the first carry signal output terminal and the first carry clock signal terminal under the control of the potential of the first pull-up node.

Optionally, the driving circuit further comprises a first carry reset sub-circuit; the first carry reset sub-circuit is electrically connected to the first pull-down node, the first carry signal output terminal and the first voltage terminal, and is used to control to connect the first carry signal output terminal and the first voltage terminal under the control of the potential of the first pull-down node.

Optionally, the first input sub-circuit is respectively electrically connected to the first input terminal, the first input voltage terminal and the first pull-up node, is configured to control to connect the first pull-up node and the first input voltage terminal under the control of the first input signal provided by the first input terminal; the first input terminal is a first carry signal output terminal of an adjacent previous stage of driving circuit; the first input voltage terminal is a first carry signal output terminal of the adjacent previous stage of driving circuit, a cth driving signal output terminal included in the adjacent previous stage of driving circuit or a third voltage terminal; c is a positive integer less than or equal to N.

Optionally, the first carry clock signal terminal is a cth clock signal terminal among the N clock signal terminals; the first pull-down sub-circuit is electrically connected to the first input voltage terminal, is configured to control to connect the first pull-down node and the first voltage terminal under the control of the first input voltage provided by the first input voltage terminal; the first input sub-circuit is also electrically connected to a frame reset terminal, is configured to control to connect the first pull-up node and the first voltage terminal under the control of a frame reset signal provided by the frame reset terminal.

Optionally, the driving circuit further comprises N capacitors; a first terminal of an nth capacitor among the N capacitors is electrically connected to the first pull-up node, and a second terminal of the nth capacitor among the N capacitors is electrically connected to the nth driving signal output terminal.

Optionally, the first input sub-circuit includes a first transistor, the first pull-down sub-circuit includes a second transistor and a third transistor; the first pull-down node control sub-circuit includes a fourth transistor, a fifth a transistor, a sixth transistor and a seventh transistor; a control electrode of the first transistor is electrically connected to the first input terminal, a first electrode of the first transistor is electrically connected to the first input voltage terminal, and a second electrode of the first transistor is electrically connected to the first pull-up node; a control electrode of the second transistor is electrically connected to the first reset terminal, a first electrode of the second transistor is electrically connected to the first pull-up node, and a second electrode of the second transistor is electrically connected to the first voltage terminal; a control electrode of the third transistor is electrically connected to the first pull-down node, a first electrode of the third transistor is electrically connected to the first pull-up node, and a second electrode of the third transistor is electrically connected to the first voltage terminal; both a control electrode of the fourth transistor and a first electrode of the fourth transistor are electrically connected to the first control voltage terminal, and a second electrode of the fourth transistor is electrically connected to the first pull-down control node; a control electrode of the fifth transistor is electrically connected to the first pull-down control node, a first electrode of the fifth transistor is electrically connected to the first control voltage terminal, and a second electrode of the fifth transistor is electrically connected to the first pull-down node; a control electrode of the sixth transistor is electrically connected to the first pull-up node, a first electrode of the sixth transistor is electrically connected to the first pull-down node, and a second electrode of the sixth transistor is electrically connected to the first voltage terminal; a control electrode of the seventh transistor is electrically connected to the first pull-up node, a first electrode of the seventh transistor is electrically connected to the first pull-down control node, and a second electrode of the seventh transistor is electrically connected to the first voltage terminal.

Optionally, the first pull-down sub-circuit includes an eighth transistor, and the first input sub-circuit further includes a ninth transistor; a control electrode of the eighth transistor is electrically connected to the first input voltage terminal, a first electrode of the eighth transistor is electrically connected to the first pull-down node, and a second electrode of the eighth transistor is electrically connected to the first voltage terminal; a control electrode of the ninth transistor is electrically connected to the frame reset terminal, a first electrode of the ninth transistor is electrically connected to the first pull-up node, and a second electrode of the ninth transistor is electrically connected to the first voltage terminal.

Optionally, the nth output sub-circuit comprises an nth output transistor; a control electrode of the nth output transistor is electrically connected to the first pull-up node, a first electrode of the nth output transistor is electrically connected to the nth clock signal terminal, and a second electrode of the nth output transistor is electrically connected to the nth driving signal output terminal; the first carry output sub-circuit includes a first carry output transistor; a control electrode of the first carry output transistor is electrically connected to the first pull-up node, a first electrode of the first carry output transistor is electrically connected to the first carry clock signal terminal, and a second electrode of the first carry output transistor is electrically connected to the first carry signal output terminal; the nth output reset sub-circuit includes an nth output reset transistor; a control electrode of the nth output reset transistor is electrically connected to the first pull-down node, a first electrode of the nth output reset transistor is electrically connected to the nth driving signal output terminal, and a second electrode of the nth output reset transistor is electrically connected to the second voltage terminal.

Optionally, the first carry reset sub-circuit comprises a first carry reset transistor; a control electrode of the first carry reset transistor is electrically connected to the first pull-down node, a first electrode of the first carry reset transistor is electrically connected to the first carry signal output terminal, and a second electrode of the first carry reset transistor is electrically connected to the first voltage terminal.

Optionally, the driving circuit further comprises a first on-off control sub-circuit; the first on-off control sub-circuit is electrically connected to a touch enable terminal, a first connection node and the first pull-up node respectively, and is configured to control to connect or disconnect the first connection node and the first pull-up node under the control of a touch enable signal provided by the touch enable terminal.

Optionally, the first on-off control sub-circuit comprises a first on-off control transistor; a control electrode of the first on-off control transistor is electrically connected to the touch enable terminal, a first electrode of the first on-off control transistor is connected to the first pull-up node, and a second electrode of the first on-off control transistor is electrically connected to the first connection node.

Optionally, the driving circuit further comprises a first output capacitor; a first terminal of the first output capacitor is electrically connected to the pull-up node circuit, and a second terminal of the first output capacitor is electrically connected to one of the N driving signal output terminals.

Optionally, the driving circuit further includes M clock signal terminals, M output sub-circuits, a second carry output sub-circuit, M driving signal output terminals and a second carry signal output terminal; the M output sub-circuits share a second pull-up node; an (N+m)th output sub-circuit is configured to output an (N+m)th driving signal through an (N+m)th driving signal output terminal according to an (N+m)th clock signal provided by the (N+m)th clock signal terminal under the control of a potential of the second pull-up node, m is a positive integer less than or equal to M, and M is a positive integer greater than or equal to 2; the second carry output sub-circuit is electrically connected to the second pull-up node, the second carry signal output terminal and the second carry clock signal terminal, and is configured to control to connect the second carry signal output terminal and the second carry clock signal terminal under the control of the potential of the second pull-up node.

Optionally, the driving circuit further comprises M capacitors; a first terminal of an mth capacitor among the M capacitors is electrically connected to the second pull-up node, and a second terminal of the mth capacitor among the M capacitors is connected to the (N+m)th driving signal output terminal.

Optionally, the driving circuit further includes a second input sub-circuit, a second pull-down sub-circuit, a second pull-down node control sub-circuit, and M output reset sub-circuits; the M output reset sub-circuits share a second pull-down node; the second input sub-circuit is configured to control the potential of the second pull-up node under the control of a second input signal provided by the second input terminal; the second pull-down sub-circuit is respectively electrically connected to the second pull-up node, the second pull-down node, the second reset terminal and the first voltage terminal, and is used to control to connect the second pull-up node and the first voltage terminal under the control of a potential of the second pull-down node, and control to connect the second pull-up node and the first voltage terminal under the control of a second reset signal provided by the second reset terminal; the second pull-down node control sub-circuit is electrically connected to a second control voltage terminal, the second pull-up node, the second pull-down node, and the first voltage terminal, is configured to control the potential of the second pull-down node under the control of a second control voltage provided by the second control voltage terminal and the potential of the second pull-up node according to the first voltage signal provided by the first voltage terminal; the (N+m)th output reset sub-circuit is electrically connected to the second pull-down node, the second voltage terminal, and the (N+m)th driving signal output terminal, and is used to control to connect the (N+m)th driving signal output terminal and the second voltage terminal under the control of the potential of the second pull-down node.

Optionally, the driving circuit further comprises a second carry reset sub-circuit; the second carry reset sub-circuit is electrically connected to the second pull-down node, the second carry signal output terminal and the first voltage terminal, and is used to control to connect the second carry signal output terminal and the first voltage terminal under the control of the potential of the second pull-down node.

Optionally, the second input sub-circuit is respectively electrically connected to the second input terminal, the second input voltage terminal and the second pull-up node, is configured to control to connect the second pull-up node and the second input voltage terminal under the control of the second input signal provided by the second input terminal; the second input terminal is a second carry signal output terminal of an adjacent previous stage of driving circuit; the second input voltage terminal is the second carry signal output terminal of the adjacent previous stage of driving circuit, a dth driving signal output terminal included in the adjacent previous stage of driving circuit or the third voltage terminal; d is a positive integer less than or equal to M.

Optionally, the second carry clock signal terminal is a dth clock signal terminal among the M clock signal terminals; the second pull-down sub-circuit is further electrically connected to the second input voltage terminal, and is used to control to connect the second pull-down node and the first voltage terminal under the control of the second input voltage provided by the second input voltage terminal; the second input sub-circuit is also electrically connected to the frame reset terminal, and is also used to control to connect the second pull-up node and the first voltage terminal under the control of the frame reset signal provided by the frame reset terminal.

Optionally, the driving circuit further comprises M capacitors; a first terminal of an mth capacitor among the M capacitors is electrically connected to the second pull-up node, and a second terminal of the mth capacitor among the M capacitors is connected to the (N+m)th driving signal output terminal.

Optionally, the first pull-down sub-circuit further comprises a tenth transistor; a control electrode of the tenth transistor is electrically connected to the second pull-down node, a first electrode of the tenth transistor is electrically connected to the first pull-up node, and a second electrode of the tenth transistor is electrically connected to the first voltage terminal; the first pull-down node control sub-circuit further includes an eleventh transistor; a control electrode of the eleventh transistor is electrically connected to the second pull-up node, a first electrode of the eleventh transistor is electrically connected to the first pull-down control node, and a second electrode of the eleventh transistor is electrically connected to the first voltage terminal.

Optionally, the nth output reset sub-circuit further comprises an nth reset transistor; a control electrode of the nth reset transistor is electrically connected to the second pull-down node, a first electrode of the nth reset transistor is electrically connected to the nth driving signal output terminal, and a second electrode of the nth reset transistor is electrically connected to the second voltage terminal.

Optionally, the first carry reset sub-circuit further comprises a second carry reset transistor; a control electrode of the second carry reset transistor is electrically connected to the second pull-down node, a first electrode of the second carry reset transistor is electrically connected to the first carry signal output terminal, and a second electrode of the second carry reset transistor is electrically connected to the first voltage terminal.

Optionally, the second pull-down sub-circuit comprises a twelfth transistor; a control electrode of the twelfth transistor is electrically connected to the first pull-down node, a first electrode of the twelfth transistor is electrically connected to the second pull-up node, and a second electrode of the twelfth transistor is electrically connected to the first voltage terminal; the second pull-down node control sub-circuit includes a thirteenth transistor; a control electrode of the thirteenth transistor is electrically connected to the first pull-up node, a first electrode of the thirteenth transistor is electrically connected to the second pull-down control node, and a second electrode of the thirteenth transistor is electrically connected to the first voltage terminal.

Optionally, the (N+m)th output reset sub-circuit comprises an (N+m)th reset transistor; a control electrode of the (N+m)th reset transistor is electrically connected to the first pull-down node, a first electrode of the (N+m)th reset transistor is electrically connected to the (N+m)th driving signal output terminal, and a second electrode of the (N+m)th reset transistor is electrically connected to the second voltage terminal.

Optionally, the second carry reset sub-circuit comprises a third carry reset transistor and a fourth carry reset transistor; a control electrode of the third carry reset transistor is electrically connected to the second pull-down node, a first electrode of the third carry reset transistor is electrically connected to the second carry signal output terminal, and a second electrode of the third carry reset transistor is electrically connected to the first voltage terminal; a control electrode of the fourth carry reset transistor is electrically connected to the first pull-down node, a first electrode of the fourth carry reset transistor is electrically connected to the second carry signal output terminal, and a second electrode of the fourth carry reset transistor is electrically connected to the first voltage terminal.

Optionally, the driving circuit further comprises a second on-off control sub-circuit; the second on-off control sub-circuit is electrically connected to a touch enable terminal, a second connection node and the second pull-up node, and is configured to control to connect or disconnect the second connection node and the second pull-up node under the control of a touch enable signal provided by the touch enable terminal.

Optionally, the second on-off control sub-circuit comprises a second on-off control transistor; a control electrode of the second on-off control transistor is electrically connected to the touch enable terminal, a first electrode of the second on-off control transistor is connected to the second pull-up node, and a second electrode of the second on-off control transistor is electrically connected to the second connection node.

Optionally, the display driving includes a second output capacitor; a first terminal of the second output capacitor is electrically connected to the second pull-up node, and a second terminal of the second output capacitor is electrically connected to one of the M driving signal output terminals.

In a second aspect, an embodiment of the present disclosure provides a display device comprising the display driving circuit.

Optionally, the display device further includes a plurality of rows of gate lines, a plurality of columns of data lines, and a plurality of rows and a plurality of columns of pixel circuits; wherein the pixel circuit includes a display control transistor and a pixel electrode; a gate electrode of the display control transistor is electrically connected to the gate line, a first electrode of the display control transistor is electrically connected to the data line, and a second electrode of the display control transistor is electrically connected to the pixel electrode; the pixel electrode has a plurality of slits; an angle between slit directions of two pixel electrodes included in a same pixel electrode group is greater than 90 degrees and less than 180 degrees; the pixel electrode group is arranged in a display area formed by adjacent rows of gate lines and adjacent columns of data lines.

Optionally, two rows of gate lines are arranged between two rows of adjacent pixel electrodes; a gate electrode of one of the two transistors electrically connected to a same column of data line is electrically connected to one of the two rows of gate lines, and a gate electrode of the other of the two transistor electrically connected to the same column of data lines is electrically connected to the other of the two rows of gate lines; a width along a first direction of a conductive connection portion between the two transistors electrically connected to the same column of data line and the column of data line is greater than a minimum width of the data line along the first direction; the first direction is an extending direction of the gate lines.

Optionally, the display device further includes a plurality of rows and a plurality of columns of common electrodes; wherein two adjacent rows of common electrodes are electrically connected by a crossing line, and the crossing line is arranged on a same layer as the pixel electrode.

Optionally, pixel electrodes corresponding to two ends of the crossing line have an avoiding portion.

Optionally, a line width of the gate line is smaller than a maximum line width of the gate line at an overlapping position between the crossing line and the gate line.

DETAILED DESCRIPTION

Figure 1:
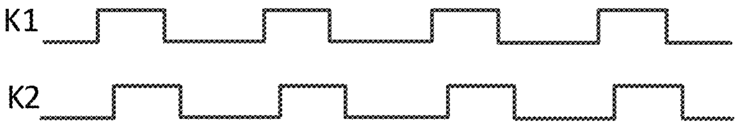
FIG. 1 is a waveform diagram of a first clock signal and a second clock signal.

The following will clearly and completely describe the technical solutions in the embodiments of the present disclosure with reference to the accompanying drawings. Apparently, the described embodiments are only some of the embodiments of the present disclosure, not all of them. Based on the embodiments in the present disclosure, all other embodiments obtained by persons of ordinary skill in the art without making creative efforts belong to the protection scope of the present disclosure.

The transistors used in all the embodiments of the present disclosure may be triodes, thin film transistors or field effect transistors or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a triode, the control electrode can be a base, the first electrode can be a collector, and the second electrode can be an emitter; or, the control electrode can be a base electrode, the first electrode may be an emitter, and the second electrode may be a collector.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

The display driving circuit described in the embodiment of the present disclosure includes two gate driving circuits, and the two gate driving circuits are respectively arranged on opposite sides of the display panel; the gate driving circuit includes a plurality of cascaded driving circuits;

The driving circuit includes N clock signal terminals, N output sub-circuits and N driving signal output terminals; N is an integer greater than or equal to 2; the N output sub-circuits share a first pull-up node;

The nth output sub-circuit is used to control to output an nth driving signal through an nth driving signal output terminal according to an nth clock signal provided by an nth clock signal terminal under the control of a potential of the first pull-up node; n is a positive integer less than or equal to N;

An ith driving signal output terminal of one of the two driving circuits is electrically connected to an (i+j)th driving signal output terminal of the other of the two driving circuits, and both i and j are positive integers, i is a positive integer less than or equal to N, jis a positive integer less than or equal to N, and i+j is a positive integer less than or equal to N;

When a potential of an ith clock signal provided by the ith clock signal terminal among the N clock signal terminals jumps from an invalid level to a valid level, a potential of the first pull-up node is a first voltage value, when the potential of the (i+j)th clock signal provided by the (i+j)th clock signal terminal among the N clock signal terminals jumps from an invalid level to a valid level, the potential of the first pull-up node is a second voltage value; the first voltage value is not equal to the second voltage value;

The time period during which the potential of the ith clock signal continues to be at a valid level and the time period during which the potential of the (i+j)th clock signal continues to be at a valid level at least partially overlap;

A time point when the potential of the ith clock signal junmps from a valid level to an invalid level is different from a time point when the potential of the (i+j)th clock signal jumps from a valid level to an invalid level.

In the display driving circuit described in the embodiment of the present disclosure, the driving capabilities of the driving signals output by different driving signal output terminals included in the same driving circuit are different, and the ith driving signal output terminal of one of the two driving circuits is electrically connected to the (i+j)th driving signal output terminal of the other of the two driving circuits to form a complement, so that the driving ability of the driving signal received by each row of gate line (the left terminal of the gate line can be connected to the ith driving signal output terminal, and the right terminal of the gate line can be electrically connected to the (i+j)th driving signal output terminal) is roughly the same, and the display quality of the display screen is improved.

In at least one embodiment of the present disclosure, if the N output sub-circuits share the first pull-up node, the number of transistors for controlling the potential of the pull-up node is reduced, which is beneficial to realize a narrow frame.

In at least one embodiment of the present disclosure, when the transistor controlled by the driving signal is an n-type transistor, the valid level may be a high level, and the invalid level may be a low level; or, when the transistor controlled by the driving signal is a p-type transistor, the valid level may be a low level, and the invalid level may be a high level; but not limited to this.

In at least one embodiment of the present disclosure, the ratio between the first voltage value and the second voltage value may be greater than or equal to 0.4 and less than or equal to 1, for example, the ratio between the first voltage value and the second voltage value may be 0.5, 0.52, 0.55, 0.57, 0.6, 0.65, 0.62, 0.67, 0.7, 0.72, 0.75 or 0.8, 0.82, 0.85, 0.9, 0.92, 0.95, etc., but not limited thereto.

In at least one embodiment of the present disclosure, the structure of the driving circuits included in the gate driving circuits respectively arranged on opposite sides of the display panel may be the same, and the first gate driving circuit may be arranged on the first side of the display panel, the second gate driving circuit may be arranged on the second side of the display panel, and the first side and the second side may be two opposite sides. At this time, the (i+j)th clock signal may be the (i+j)th clock signal among the N clock signals connected to the first gate driving circuit, or may be the (i+j)th clock signal among the N clock signals connected to the second gate driving circuit.

Optionally, the first side may be the left side, and the second side may be the right side, but not limited thereto.

In at least one embodiment of the present disclosure, it is illustrated by taking N equal to 2 as an example, but in actual operation, N may also be any integer greater than 2, such as 3, 4, 5 and so on.

In at least one embodiment of the present disclosure, when the potential of the ith clock signal jumps from a valid level to an invalid level, the potential of the first pull-up node is a third voltage value; when the potential of the (i+j)th clock signal jumps from a valid level to an invalid level, the potential of the first pull-up node is a fourth voltage value;

The third voltage value is not equal to the fourth voltage value.

Optionally, the ratio between the fourth voltage value and the third voltage value may be greater than or equal to 0.4 and less than or equal to 1, for example, the ratio between the fourth voltage value and the third voltage value may be 0.5, 0.55, 0.6, 0.65 or 0.7, 0.75, 0.8, 0.85, 0.9, 0.95, but not limited thereto.

In at least one embodiment of the present disclosure, when the potential of the ith clock signal jumps from an invalid level to a valid level, within a first time period, the potential of the first pull-up node rises by a first potential height;

When the potential of the (i+j)th clock signal jumps from an invalid level to a valid level, within a second time, the potential of the first pull-up node rises by a second potential height;

The first potential height is not equal to the second potential height, and/or, the first time is not equal to the second time.

Optionally, the ratio between the second potential height and the first potential height may be greater than or equal to 0.5 and less than or equal to 4, for example, the ratio between the second potential height and the first potential height can be 0.5, 1, 1.5, 2, 2.4, 2.8, 3, 3.2, 3.6 or 4.

Optionally, the ratio between the second time and the first time may be greater than or equal to 1 and less than or equal to 4, for example, the ratio between the second time and the first time may be 1.2, 1.4, 1.6, 2, 2.4, 2.5, 2.6, or 3, 3.4, 3.6, 3.8, etc., but not limited thereto.

In at least one embodiment of the present disclosure, when the potential of the ith clock signal jumps from a valid level to an invalid level, within a third time period, the potential of the first pull-up node drops by a third potential height;

When the potential of the (i+j)th clock signal jumps from a valid level to an invalid level, within a fourth time, the potential of the first pull-up node drops by a fourth potential height;

The third potential height is not equal to the fourth potential height, and/or, the third time is not equal to the fourth time.

Optionally, the ratio between the fourth potential height and the third potential height may be greater than or equal to 0.4 and less than or equal to 1.5, for example, the ratio between the fourth potential height and the third potential height may be 0.4, 0.6, 0.89, 0.7, 0.8, 0.9, 1, 1.2, 1.3, 1.4 or 1.5, but not limited thereto.

Optionally, the ratio between the fourth time and the third time may be greater than or equal to 1 and less than or equal to 5, for example, the ratio between the fourth time and the third time may be 1.5, 1.8, 2, 2.4, 2.8, 3, 3.2, 3.6, 3.8 or 4, 4.8, etc., but not limited thereto.

In at least one embodiment of the present disclosure, the driving circuit includes a capacitor arranged between an ath driving signal terminal and the first pull-up node, the first time is less than the second time, and the first potential height is smaller than the second potential height; a is an even number, and a is a positive integer; or;

The driving circuit includes a capacitor arranged between a bth driving signal terminal and the first pull-up node, the first time is greater than the second time, and the first potential height is greater than the second potential height; b is an odd number, and b is a positive integer.

In a specific implementation, the capacitor can be arranged between the output terminal of the even-numbered stage of driving signal and the first pull-up node, so as to reduce the pull-down effect on the potential of the first pull-up node when the output terminal of the odd-numbered row of driving signal is pulled down; or, The capacitors can be arranged between the odd-numbered stage of driving signal output terminal and the first pull-up node to reduce the pull-down effect on the potential of the first pull-up node when the odd-numbered row of driving signal output terminal is pulled down.

Optionally, the driving circuit includes a capacitor arranged between the ath driving signal terminal and the first pull-up node, the third time is shorter than the fourth time, and the third potential height is greater than the fourth potential height; a is an even number, and a is a positive integer; or;

The driving circuit includes a capacitor arranged between the bth driving signal terminal and the first pull-up node, the third time is greater than the fourth time, and the third potential height is less than the fourth potential height; b is an odd number, and b is a positive integer.

In at least one embodiment of the present disclosure, the driving circuit further includes a first input sub-circuit, a first pull-down sub-circuit, a first pull-down node control sub-circuit, and N output reset sub-circuits; the N output reset sub-circuits share the first pull-down node;

The first input sub-circuit is configured to control the potential of the first pull-up node under the control of the first input signal provided by the first input terminal;

The first pull-down sub-circuit is electrically connected to the first pull-up node, the first pull-down node, the first reset terminal and the first voltage terminal respectively, and is used to control to connect the first pull-up node and the first voltage terminal under the control of the potential of the first pull-down node, and control to connect the first pull-up node and the first voltage terminal under the control of the first reset signal provided by the first reset terminal;

The first pull-down node control sub-circuit is electrically connected to the first control voltage terminal, the first pull-up node, the first pull-down node and the first voltage terminal, and is configured to control the potential of the first pull-down node under the control of the first control voltage provided by the first control voltage terminal and the potential of the first pull-up node, according to the first voltage signal provided by the first voltage terminal;

The nth output reset sub-circuit is electrically connected to the first pull-down node, the second voltage terminal, and the nth driving signal output terminal, and is used to control to connect the nth driving signal output terminal and the second voltage terminal under the control of the potential of the first pull-down node.

In at least one embodiment of the present disclosure, the N output reset sub-circuits share the first pull-down node, so as to reduce the number of transistors controlling the potential of the pull-down node, which is beneficial to realize the narrow frame.

Figure 2:
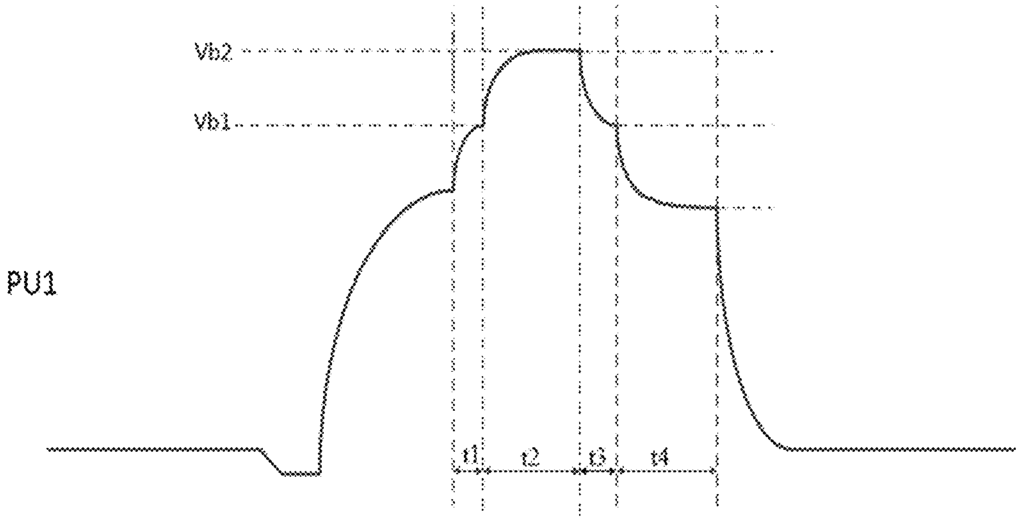
FIG. 2 is a waveform diagram of the potential of the first pull-up node.

In at least one embodiment of the present disclosure, the first driving signal output terminal of one of the two driving circuits is electrically connected to the second driving signal output terminal of the other of the two driving circuits; the one of the two driving circuits and the other of the two driving circuits are both connected to the first clock signal terminal and the second clock signal terminal;

As shown in FIG. 2, when the potential of the first clock signal provided by the first clock signal terminal K1 jumps from a low level to a high level, the potential of the first pull-up node PU1 is the first voltage value Vb1, when the potential of the second clock signal provided by the second clock signal terminal K2 jumps from a low level to a high level, the potential of the first pull-up node PU1 is the second voltage value Vb2; the first voltage value Vb1 and the second voltage values Vb2 are not equal;

As shown in FIG. 1, the time period during which the potential of the first clock signal continues to be at a high level and the time period during which the potential of the second clock signal continues to be at a high level at least partially overlap; the time point when the potential of the first clock signal jumps from a high level to low level is different from the time point when the potential of the second clock signal jumps from a high level to a low level.

In FIG. 2, the one labeled t1 is the first time, the one labeled t2 is the second time, the one labeled t3 is the third time, and the one labeled t4 is the fourth time.

The display driving circuit described in at least one embodiment of the present disclosure will be described below by taking N equal to 2 as an example.

Figure 3:
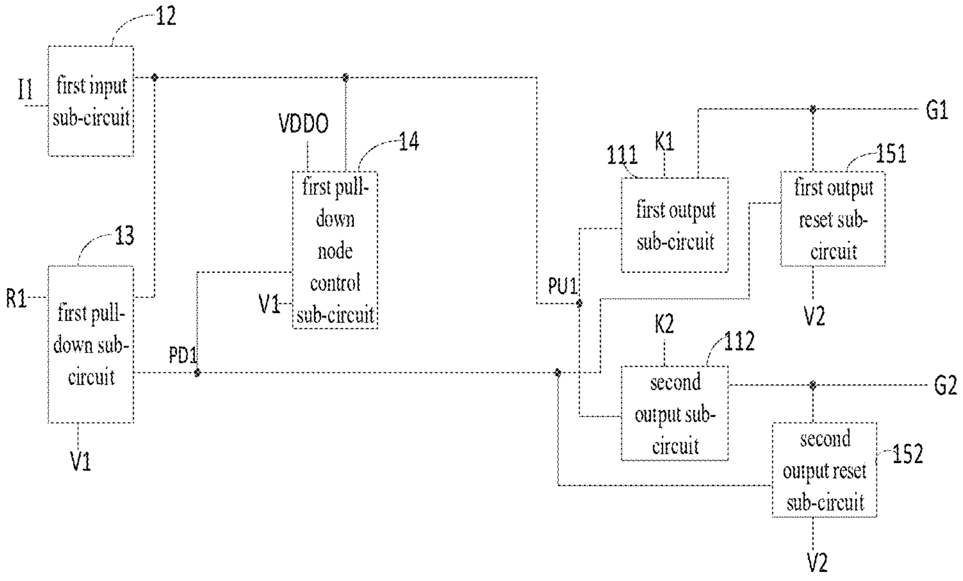
FIG. 3 is a structural diagram of a driving circuit in a display driving circuit according to at least one embodiment of the present disclosure.

As shown in FIG. 3, in at least one embodiment of the present disclosure, the driving circuit includes a first clock signal terminal K1, a second clock signal terminal K2, a first output sub-circuit 111, a second output sub-circuit 112, a first driving signal output terminal G1, a second driving signal output terminal G2;

The first output sub-circuit 111 and the second output sub-circuit 112 share the first pull-up node PU1;

The first output sub-circuit 111 is respectively electrically connected to the first pull-up node PU1, the first clock signal terminal K1, and the first driving signal output terminal G1, and is used to controls to output the first driving signal through the first driving signal output terminal G1 under the control of the potential of the first pull-up node PU1 according to the first clock signal provided by the first clock signal terminal K1;

The second output sub-circuit 112 is respectively electrically connected to the first pull-up node PU1, the second clock signal terminal K2, and the second driving signal output terminal G2, and is used to controls to output the second driving signal through the second driving signal output terminal G2 under the control of the potential of the first pull-up node PU1 according to the second clock signal provided by the second clock signal terminal K2;

The driving circuit also includes a first input sub-circuit 12, a first pull-down sub-circuit 13, a first pull-down node control sub-circuit 14, a first output reset sub-circuit 151 and a second output reset sub-circuit 152; the first output reset sub-circuit 151 and the second output reset sub-circuit 152 share the first pull-down node PD1;

The first input sub-circuit 12 is electrically connected to the first input terminal I1 and the first pull-up node PU1, and is used to control the potential of the first pull-up node PU1 under the control of the first input signal provided by the first input terminal I1;

The first pull-down sub-circuit 13 is respectively electrically connected to the first pull-up node PU1, the first pull-down node PD1, the first reset terminal R1 and the first voltage terminal V1, is configured to control to connect the first pull-up node PU1 and the first voltage terminal V1 under the control of the potential of the first pull-down node PD1, and control to connect the first pull-up node PU1 and the first voltage terminal V1 under the control of the first reset signal provided by the first reset terminal R1;

The first pull-down node control sub-circuit 14 is electrically connected to the first control voltage terminal VDDO, the first pull-up node PU1, the first pull-down node PD1, and the first voltage terminal V1, respectively, is configured to control the potential of the first pull-down node PD1 under the control of the first control voltage provided by the first control voltage terminal VDDO and the potential of the first pull-up node PU1 according to the first voltage signal provided by the first voltage terminal V1;

The first output reset sub-circuit 151 is respectively electrically connected to the first pull-down node PD1, the second voltage terminal V2 and the first driving signal output terminal G1, and is used to control to connect the first driving signal output terminal G1 and the second voltage terminal V2 under the control of the potential of the first pull-down node PD1;

The second output reset sub-circuit 152 is respectively electrically connected to the first pull-down node PD1, the second voltage terminal V2 and the second driving signal output terminal G2, I configured to control to connect the second driving signal output terminal G2 and the second voltage terminal V2 under the control of the potential of the first pull-down node PD1.

Optionally, the first voltage terminal may be a first low voltage terminal, and the second voltage terminal may be a second low voltage terminal. Optionally, the voltage value of the first low voltage signal provided by the first low voltage terminal is lower than the voltage value of the second low voltage signal provided by the second low voltage terminal, but not limited thereto.

In at least one embodiment of the present disclosure, the driving circuit further includes a first carry signal output terminal and a first carry output sub-circuit;

The first carry output sub-circuit is electrically connected to the first pull-up node, the first carry signal output terminal and the first carry clock signal terminal respectively, and is configured to control to connect the first carry signal output terminal and the first carry clock signal terminal under the control of the potential of the first pull-up node.

In a specific implementation, the first carry output sub-circuit is used to control the first carry signal output terminal to output a first carry signal, and the first carry signal output terminal can be used for cascading.

Figure 4:
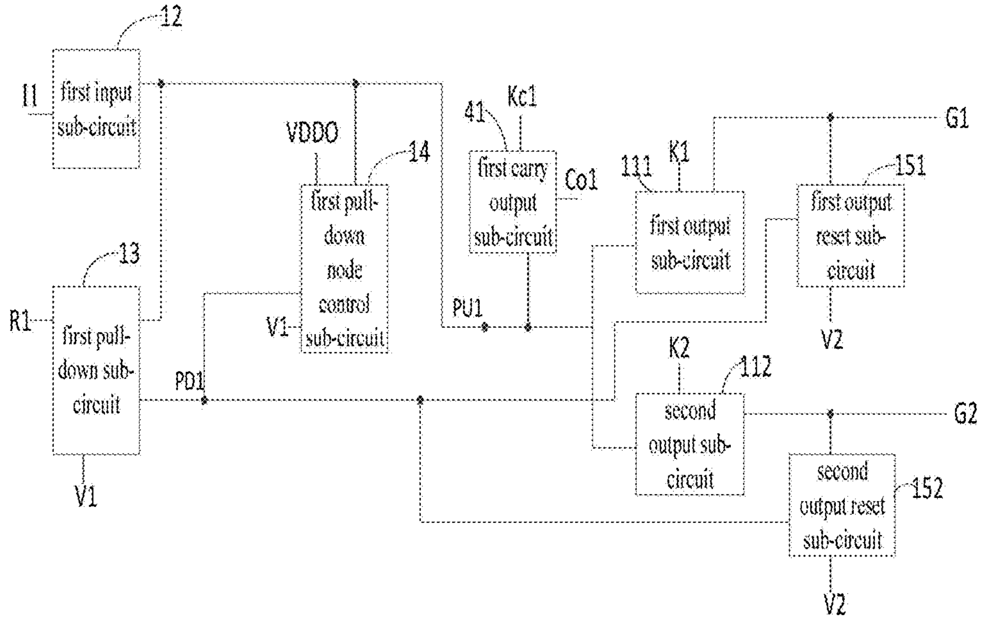
FIG. 4 is a structural diagram of the driving circuit according to at least embodiment.

As shown in FIG. 4, on the basis of the driving circuit shown in FIG. 3, the driving circuit further includes a first carry signal output terminal Co1 and a first carry output sub-circuit 41;

The first carry output sub-circuit 41 is electrically connected to the first pull-up node PU1, the first carry signal output terminal Co1 and the first carry clock signal terminal Kc1, is configured to control to electrically connect the first carry signal output terminal Co1 and the first carry clock signal terminal Kc1 under the control of the potential of first pull-up PU1.

In at least one embodiment of the present disclosure, the first carry clock signal terminal Kc1 may be different from the clock signal terminal among the N clock signal terminals, that is, an independent carry clock signal terminal is used for carry, so that the carry can be independently controlled.

Optionally, the driving circuit further includes a first carry reset sub-circuit;

The first carry reset sub-circuit is electrically connected to the first pull-down node, the first carry signal output terminal and the first voltage terminal, and is used to control to connect the first carry signal output terminal and the first voltage terminal under the control of the potential of the first pull-down node, so as to reset the potential of the first carry signal output by the first carry signal output terminal.

Figure 5:
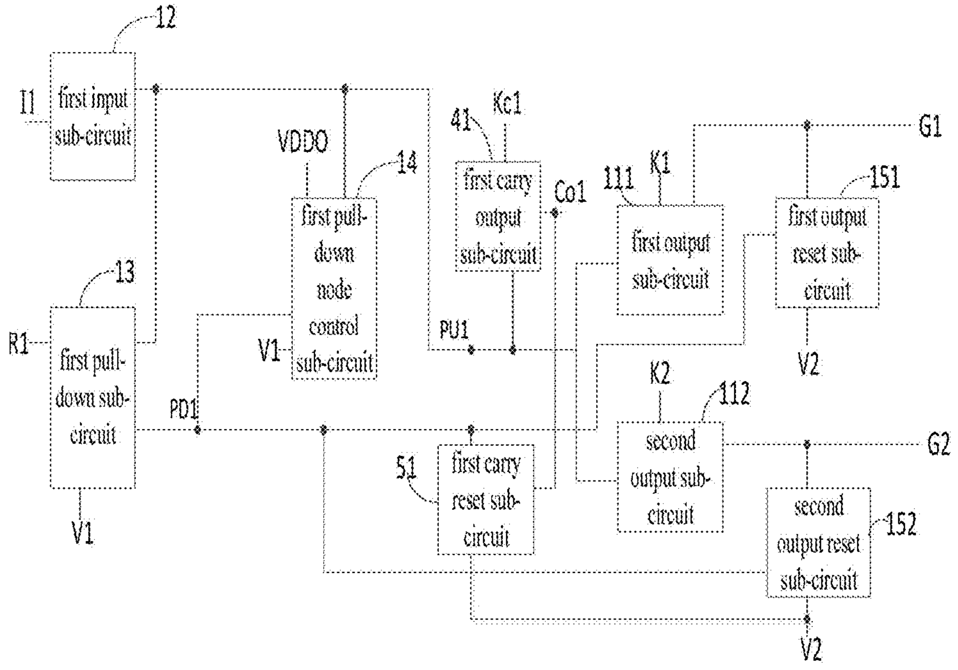
FIG. 5 is a structural diagram of the driving circuit according to at least embodiment.

As shown in FIG. 5, on the basis of the driving circuit shown in FIG. 4, the driving circuit further includes a first carry reset sub-circuit 51;

The first carry reset sub-circuit 51 is respectively electrically connected to the first pull-down node PD1, the first carry signal output terminal Co1 and the first voltage terminal V1, and is configured to control to connect the first carry signal output terminal Co1 and the first voltage terminal V1 under the control of the potential of the first pull-down node PD1, so as to reset the potential of the first carry signal output by the first carry signal output terminal Co1.

In at least one embodiment of the present disclosure, the first input sub-circuit is respectively electrically connected to the first input terminal, the first input voltage terminal and the first pull-up node, is configured to control to connect the first pull-up node and the first input voltage terminal under the control of the first input signal provided by the first input terminal;

The first input terminal is the first carry signal output terminal of the adjacent previous stage of driving circuit;

The first input voltage terminal is the first carry signal output terminal of the adjacent previous stage of driving circuit, the cth driving signal output terminal included in the adjacent previous stage of driving circuit or the third voltage terminal; c is a positive integer less than or equal to N. It should be noted that the adjacent previous stage may refer to one adjacent previous stage, or several previous stages, such as two previous stages, three previous stages, four previous stages, five previous stages, etc., which is not limited here.

In specific implementation, the first input terminal may be the first carry signal output terminal of the adjacent previous stage of driving circuit, the first input voltage terminal may be the first carry signal output terminal of the adjacent previous stage of driving circuit, the cth driving signal output terminal included in the adjacent previous stage of driving circuit or the third voltage terminal.

Figure 6:
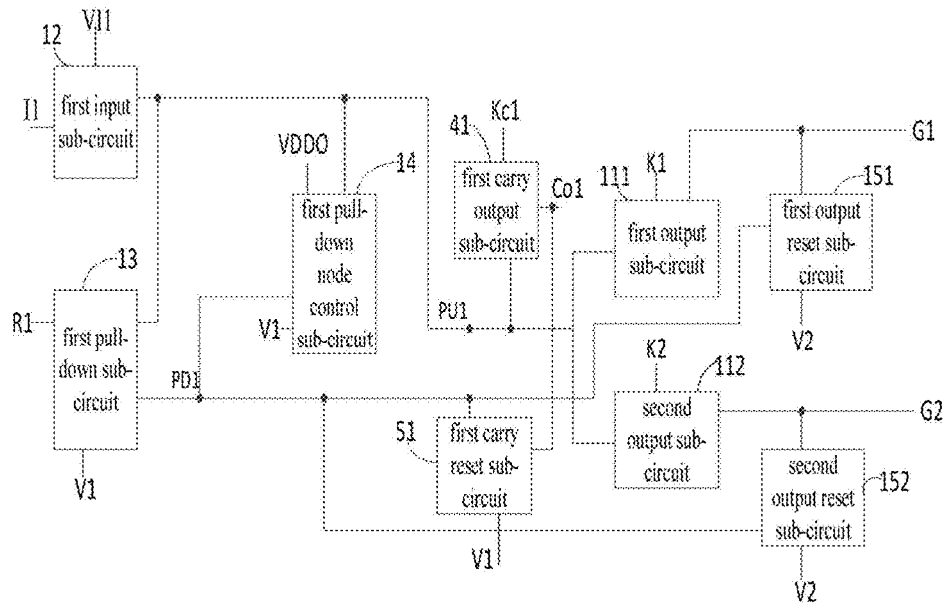
FIG. 6 is a structural diagram of the driving circuit according to at least embodiment.

As shown in FIG. 6, on the basis of the driving circuit shown in FIG. 5, the first input sub-circuit 12 is connected to the first input terminal I1, the first input voltage terminal VI1 and the first pull-up node PU1, is configured to control to connect the first pull-up node PU1 and the first input voltage terminal VI1 under the control of the first input signal provided by the first input terminal I1.

Optionally, the first carry clock signal terminal is the cth clock signal terminal among the N clock signal terminals; that is, one of the N clock signal terminals can be multiplexed as the first carry clock signal terminal;

The first input voltage terminal is the first carry signal output terminal of the adjacent previous stage of driving circuit or the cth driving signal output terminal included in the adjacent previous stage of driving circuit.

In at least one embodiment of the present disclosure, the first carry clock signal terminal may be one of the N clock signal terminals, and at this time, the first input voltage terminal may be the first carry signal output terminal of the adjacent previous stage of driving circuit or the cth driving signal output terminal included in the adjacent previous stage of driving circuit.

In at least one embodiment of the present disclosure, the first pull-down sub-circuit may also be electrically connected to the first input voltage terminal, is configured to control to connect the first pull-down node and the first voltage terminal under the control of the first input voltage provided by the first input voltage terminal;

The first input sub-circuit can also be electrically connected to the frame reset terminal, and is also configured to control to connect the first pull-up node and the first voltage terminal under the control of the frame reset signal provided by the frame reset terminal.

Figure 7:
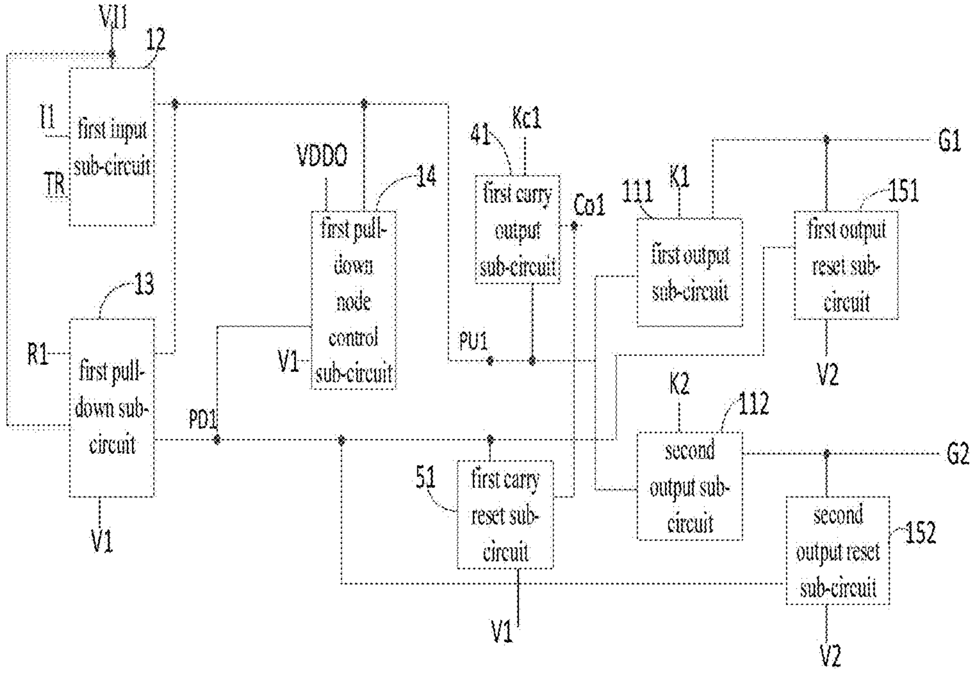
FIG. 7 is a structural diagram of the driving circuit according to at least embodiment.

As shown in FIG. 7, on the basis of the driving circuit shown in FIG. 6, the first pull-down sub-circuit 13 can also be electrically connected to the first input voltage terminal VI1, is configured to control to connect the first pull-down node PD1 and the first voltage terminal V1 under the control of the first input voltage provided by the first input voltage terminal VI1, so as to reset the potential of the first pull-down node PD1;

The first input sub-circuit 12 can also be electrically connected to the frame reset terminal TR, and is also used to control to connect the first pull-up node PU1 and the first pull-up node PU1 under the control of the frame reset signal provided by the frame reset terminal TR, so as to reset the potential of the first pull-up node PU1.

The display driving circuit described in at least one embodiment of the present disclosure may further include N capacitors;

The first terminal of the nth capacitor among the N capacitors is electrically connected to the first pull-up node, and the second terminal of the nth capacitor among the N capacitors is electrically connected to the nth driving signal output terminal.

In at least one embodiment of the present disclosure, the display driving circuit may further include N capacitors, and one capacitor may be respectively provided at each driving signal output terminal and the first pull-up node.

Optionally, the first input sub-circuit includes a first transistor, the first pull-down sub-circuit includes a second transistor and a third transistor; the first pull-down node control sub-circuit includes a fourth transistor, a fifth a transistor, a sixth transistor and a seventh transistor;

A control electrode of the first transistor is electrically connected to the first input terminal, a first electrode of the first transistor is electrically connected to the first input voltage terminal, and a second electrode of the first transistor is electrically connected to the first pull-up node;

A control electrode of the second transistor is electrically connected to the first reset terminal, a first electrode of the second transistor is electrically connected to the first pull-up node, and a second electrode of the second transistor is electrically connected to the first voltage terminal;

A control electrode of the third transistor is electrically connected to the first pull-down node, a first electrode of the third transistor is electrically connected to the first pull-up node, and a second electrode of the third transistor is electrically connected to the first voltage terminal;

Both a control electrode of the fourth transistor and a first electrode of the fourth transistor are electrically connected to the first control voltage terminal, and a second electrode of the fourth transistor is electrically connected to the first pull-down control node;

A control electrode of the fifth transistor is electrically connected to the first pull-down control node, a first electrode of the fifth transistor is electrically connected to the first control voltage terminal, and a second electrode of the fifth transistor is electrically connected to the first pull-down node;

A control electrode of the sixth transistor is electrically connected to the first pull-up node, a first electrode of the sixth transistor is electrically connected to the first pull-down node, and a second electrode of the sixth transistor is electrically connected to the first voltage terminal;

A control electrode of the seventh transistor is electrically connected to the first pull-up node, a first electrode of the seventh transistor is electrically connected to the first pull-down control node, and a second electrode of the seventh transistor is electrically connected to the first voltage terminal.

Optionally, the first pull-down sub-circuit includes an eighth transistor, and the first input sub-circuit further includes a ninth transistor;

A control electrode of the eighth transistor is electrically connected to the first input voltage terminal, a first electrode of the eighth transistor is electrically connected to the first pull-down node, and a second electrode of the eighth transistor is electrically connected to the first voltage terminal;

A control electrode of the ninth transistor is electrically connected to the frame reset terminal, a first electrode of the ninth transistor is electrically connected to the first pull-up node, and a second electrode of the ninth transistor is electrically connected to the first voltage terminal.

Optionally, the nth output sub-circuit includes an nth output transistor;

A control electrode of the nth output transistor is electrically connected to the first pull-up node, a first electrode of the nth output transistor is electrically connected to the nth clock signal terminal, and a second electrode of the nth output transistor is electrically connected to the nth driving signal output terminal;

The first carry output sub-circuit includes a first carry output transistor;

A control electrode of the first carry output transistor is electrically connected to the first pull-up node, a first electrode of the first carry output transistor is electrically connected to the first carry clock signal terminal, and a second electrode of the first carry output transistor is electrically connected to the first carry signal output terminal;

The nth output reset sub-circuit includes an nth output reset transistor;

A control electrode of the nth output reset transistor is electrically connected to the first pull-down node, a first electrode of the nth output reset transistor is electrically connected to the nth driving signal output terminal, and a second electrode of the nth output reset transistor is electrically connected to the second voltage terminal.

Optionally, the first carry reset sub-circuit includes a first carry reset transistor;

A control electrode of the first carry reset transistor is electrically connected to the first pull-down node, a first electrode of the first carry reset transistor is electrically connected to the first carry signal output terminal, and a second electrode of the first carry reset transistor is electrically connected to the first voltage terminal.

Figure 8:
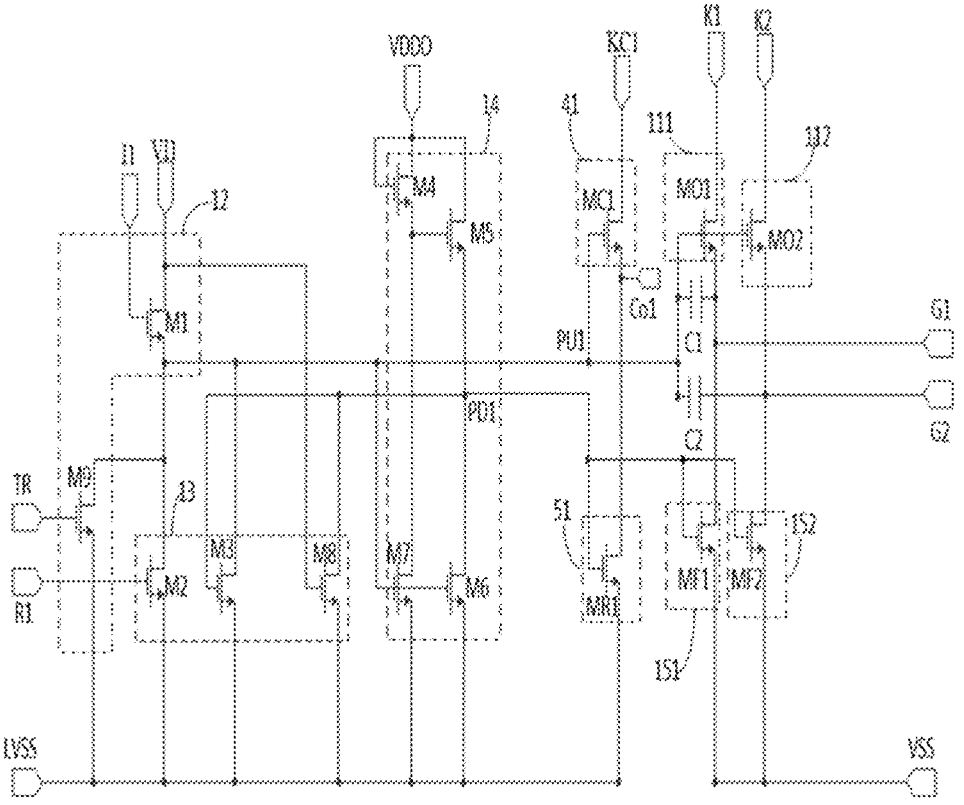
FIG. 8 is a circuit diagram of the driving circuit according to at least embodiment.

As shown in FIG. 8, on the basis of the driving circuit shown in FIG. 7, The first input sub-circuit 12 includes a first transistor M1, the first pull-down sub-circuit 13 includes a second transistor M2 and a third transistor M3; the first pull-down node control sub-circuit 14 includes a fourth transistor M4, a fifth transistor M5, a sixth transistor M6 and a seventh transistor M7; the driving circuit also includes a first capacitor C1 and a second capacitor C2;

The gate electrode of the first transistor M1 is electrically connected to the first input terminal I1, the source electrode of the first transistor M1 is electrically connected to the first input voltage terminal VI1, and the drain electrode of the first transistor M1 is electrically connected to the first pull-up node PU1;

The gate electrode of the second transistor M2 is electrically connected to the first reset terminal R1, the source electrode of the second transistor M2 is electrically connected to the first pull-up node PU1, and the drain electrode of the second transistor M2 is electrically connected to the first low voltage terminal LVSS;

The gate electrode of the third transistor M3 is electrically connected to the first pull-down node PD1, the source electrode of the third transistor M3 is electrically connected to the first pull-up node PU1, and the drain electrode of the third transistor M3 is electrically connected to the first low voltage terminal LVSS;

Both the gate electrode of the fourth transistor M4 and the source electrode of the fourth transistor M4 are electrically connected to the first control voltage terminal VDDO, and the drain electrode of the fourth transistor M4 is electrically connected to the first pull-down control node;

The gate electrode of the fifth transistor M5 is electrically connected to the first pull-down control node, the source electrode of the fifth transistor M5 is electrically connected to the first control voltage terminal VDDO, and the drain electrode of the fifth transistor M5 is electrically connected to the first pull-down node PD1;

The gate electrode of the sixth transistor M6 is electrically connected to the first pull-up node PU1, the source electrode of the sixth transistor M6 is electrically connected to the first pull-down node PD1, and the drain electrode of the sixth transistor M6 is electrically connected to the first low voltage terminal LVSS;

The gate electrode of the seventh transistor M7 is electrically connected to the first pull-up node PU1, the source electrode of the seventh transistor M7 is electrically connected to the first pull-down control node, and the drain electrode of the seventh transistor M7 is electrically connected to the first low voltage terminal LVSS;

The first pull-down sub-circuit 13 includes an eighth transistor M8, and the first input sub-circuit 12 also includes a ninth transistor M9;

The gate electrode of the eighth transistor M8 is electrically connected to the first input voltage terminal VI1, the source electrode of the eighth transistor M8 is electrically connected to the first pull-down node PD1, and the drain electrode of the eighth transistor M8 is electrically connected to the first low voltage terminal LVSS;

The gate electrode of the ninth transistor M9 is electrically connected to the frame reset terminal TR, the source electrode of the ninth transistor M9 is electrically connected to the first pull-up node PU1, and the drain electrode of the ninth transistor M9 is electrically connected to the first low voltage terminal LVSS;

The first output sub-circuit 111 includes a first output transistor MO1; the second output sub-circuit 112 includes a second output transistor MO2;

The gate electrode of the first output transistor MO1 is electrically connected to the first pull-up node PU1, the source electrode of the first output transistor MO1 is electrically connected to the first clock signal terminal K1, and the drain electrode of the first output transistor MO1 is electrically connected to the first driving signal output terminal G1;

The gate electrode of the second output transistor MO2 is electrically connected to the first pull-up node PU1, the source electrode of the second output transistor MO2 is electrically connected to the second clock signal terminal K2, and the drain electrode of the second output transistor MO2 is electrically connected to the second driving signal output terminal G2;

The first carry output sub-circuit 41 includes a first carry output transistor MC1;

The gate electrode of the first carry output transistor MC1 is electrically connected to the first pull-up node PU1, the source electrode of the first carry output transistor MC1 is electrically connected to the first carry clock signal terminal KC1, and the drain electrode of the first carry output transistor MC1 is electrically connected to the first carry signal output terminal Co1;

The first output reset sub-circuit 151 includes a first output reset transistor MF1; the second output reset sub-circuit 152 includes a second output reset transistor MF2;

The gate electrode of the first output reset transistor MF1 is electrically connected to the first pull-down node PD1, the source electrode of the first output reset transistor MF1 is electrically connected to the first driving signal output terminal G1, and the drain electrode of the first output reset transistor MF1 is electrically connected to the second low voltage terminal VSS;

The gate electrode of the second output reset transistor MF2 is electrically connected to the first pull-down node PD1, the source electrode of the second output reset transistor MF2 is electrically connected to the second driving signal output terminal G2, and the drain electrode of the second output reset transistor MF2 is electrically connected to the second low voltage terminal VSS;

The first carry reset sub-circuit 51 includes a first carry reset transistor MR1;

The gate electrode of the first carry reset transistor MR1 is electrically connected to the first pull-down node PD1, the source electrode of the first carry reset transistor MR1 is electrically connected to the first carry signal output terminal Co1, and the drain electrode of the first carry reset transistor MR1 is electrically connected to the first low voltage terminal LVSS;

The first terminal of the first capacitor C1 is electrically connected to the first pull-up node PU1, and the second terminal of the first capacitor C1 is electrically connected to the first driving signal output terminal G1;

A first terminal of the second capacitor C2 is electrically connected to the first pull-up node PU1, and a second terminal of the second capacitor C2 is electrically connected to the second driving signal output terminal G2.

In at least one embodiment of the driving circuit shown in FIG. 8, all transistors may be n-type transistors, but not limited thereto.

In at least one embodiment of the driving circuit shown in FIG. 8, the gate electrode of the first transistor M1 and the source electrode of the first transistor M1 may be connected to different signals, but not limited thereto; during operation, the gate electrode of the first transistor M1 and the source electrode of the first transistor M1 can also be connected to the same signal.

In at least one embodiment of the present disclosure, the first input terminal I1 may be a first carry signal output terminal of an adjacent previous stage of driving circuit;

According to a specific implementation manner, the first input voltage terminal VI1 may be a first driving signal output terminal of an adjacent previous stage of driving circuit;

According to another specific implementation, the first input voltage terminal VI1 may be a high voltage terminal;

According to yet another specific implementation, the first input voltage terminal VI1 may be a first carry signal output terminal of an adjacent previous stage of driving circuit;

Optionally, the "adjacent previous stage" here may be one adjacent previous stage or several adjacent previous stages, which are not limited here.

In at least one embodiment of the present disclosure, when the first input terminal I1 is the first carry signal output terminal of the adjacent previous stage of driving circuit, the first input voltage terminal VI1 is the first driving signal output terminal of the adjacent previous stage of driving circuit, the low voltage value of the signal provided by the first carry signal output terminal of the adjacent previous stage of driving circuit can be controlled to a volt, and the low voltage value of the signal provided by the first driving signal output terminal of the adjacent previous stage of driving circuit is b volt, a can be set to be smaller than b, so that when both the gate electrode of M1 and the source electrode of M1 are connected to a low voltage signal, the gate-source voltage of M1 is a negative value, so that the leakage current of M1 is small.

In at least one embodiment of the present disclosure, when the first input voltage terminal VI1 can be a high voltage terminal, during the time period when the potential of the first pull-up node PU1 continuous to be a high level, the leakage current of M1 can continue to charge the capacitor to achieve the compensation effect.

In at least one embodiment of the present disclosure, when the first input voltage terminal VI1 is a first carry signal output terminal of an adjacent previous stage of driving circuit, the gate electrode of M1 and the source electrode of M1 may be electrically connected to each other.

Figure 9:
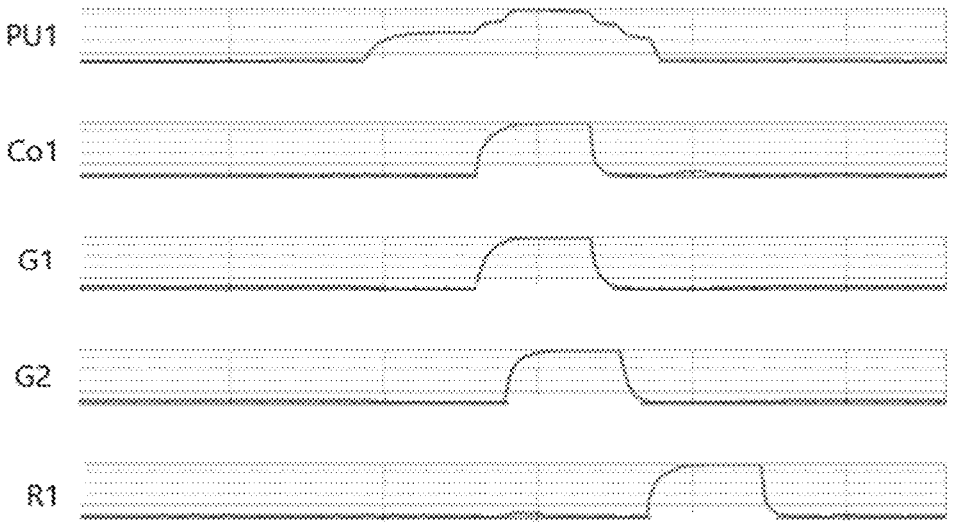
FIG. 9 is a working timing diagram of the driving circuit shown in FIG. 8.

FIG. 9 is a working timing diagram of the driving circuit shown in FIG. 8 of at least one embodiment of the present disclosure.

When the driving circuit shown in FIG. 8 of at least one embodiment of the present disclosure is in operation, when I1 is electrically connected to the first carry signal output terminal of the adjacent previous stage of driving circuit, VI1 is connected to the first driving signal output terminal of the adjacent previous stage of driving circuit;

When I1 provides a high voltage signal, M1 is turned on to pull up the potential of PU1 to a high voltage. At this time, K1, K2, and KC1 all provide a low voltage signal, so G1, G2, and Co1 all output a low voltage signal; M4 is turned on, M6 and M7 are turned on to control the potential of PD1 to be a low voltage, and the transistors whose gate electrodes are electrically connected to PD1 are turned off;

The potential of the first clock signal provided by K1 jumps from a low level to a high level, and the potential of PU1 rises to a higher potential. Within the first time t1, the potential of the first pull-up node PU1 rises by a first potential height, the potential of the first pull-up node PU1 becomes a first voltage value Vb1;

The potential of the second clock signal provided by K2 jumps from a low level to a high level, and the potential of PU1 rises to a higher potential, and within the second time t2, the potential of the first pull-up node PU1 rises a second potential height, the potential of the first pull-up node PU1 becomes a second voltage value Vb2;

The potential of the first clock signal provided by K1 jumps from a high level to a low level, the potential of PU1 is reduced to a lower potential, and within the third time t3, the potential of the first pull-up node PU1 drops by a third potential height, the potential of the first pull-up node PU1 becomes a third voltage value Vb3;

The potential of the second clock signal provided by K2 jumps from a high level to a low level, the potential of PU1 is reduced to a lower potential, and within the fourth time t4, the potential of the first pull-up node PU1 drops by a fourth potential height, the potential of the first pull-up node PU1 becomes a fourth voltage value Vb4, at this time, the potential of the first pull-up node PU1 can be at a low level;

When the potential of PU1 is a high voltage, MO1, MO2 and MC1 are turned on, G1 and K1 are connected, G2 and K2 are connected, Co1 and KC1 are connected, G1 outputs the corresponding first driving signal, and G2 outputs the corresponding second driving signal, Co1 outputs the corresponding first carry signal;

When the potential of PU1 is a low voltage, M4 is turned on, M6 and M7 are turned off, the potential of the first pull-down control node is a high voltage, M5 is turned on, the potential of PD1 is a high voltage, MF1, MF2 and MR1 are turned on, G1, G2 and Co1 output a low level.

In at least one embodiment of the driving circuit shown in FIG. 8, a first capacitor C1 is set between PU1 and G1, and a second capacitor C2 is set between PU1 and G2;

In actual operation, a capacitor may be provided only between PU1 and G2, or a capacitor may be provided only between PU1 and G1.

Figure 10:
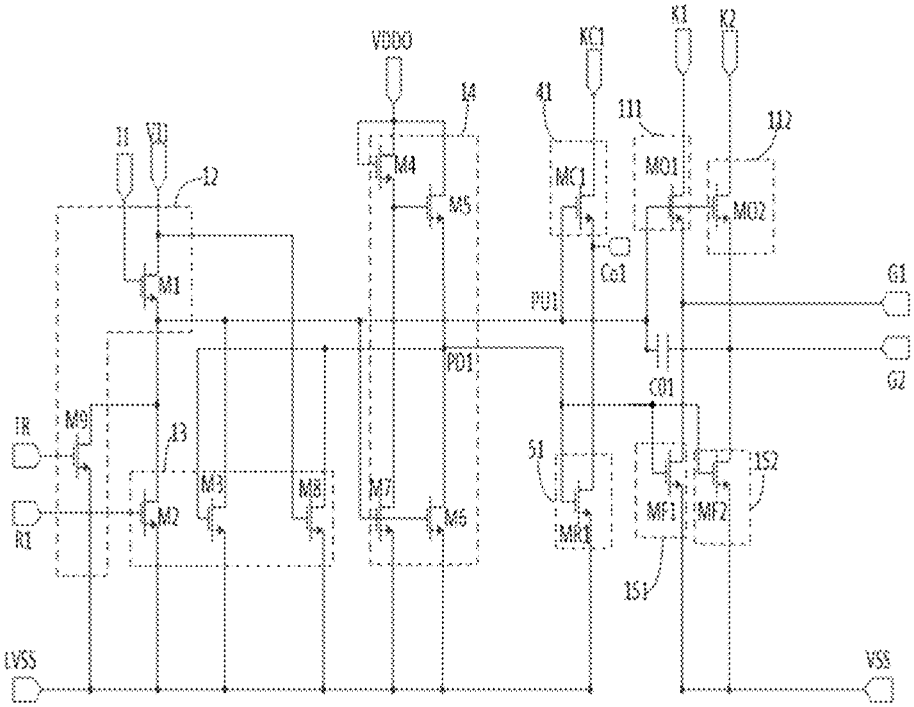
FIG. 10 is a circuit diagram of the driving circuit according to at least embodiment.

The difference between at least one embodiment of the driving circuit shown in FIG. 10 and at least one embodiment of the driving circuit shown in FIG. 8 is that there is no capacitor between PU1 and G1; and the output capacitor CO1 is set between PU1 and G2.

Figure 11:
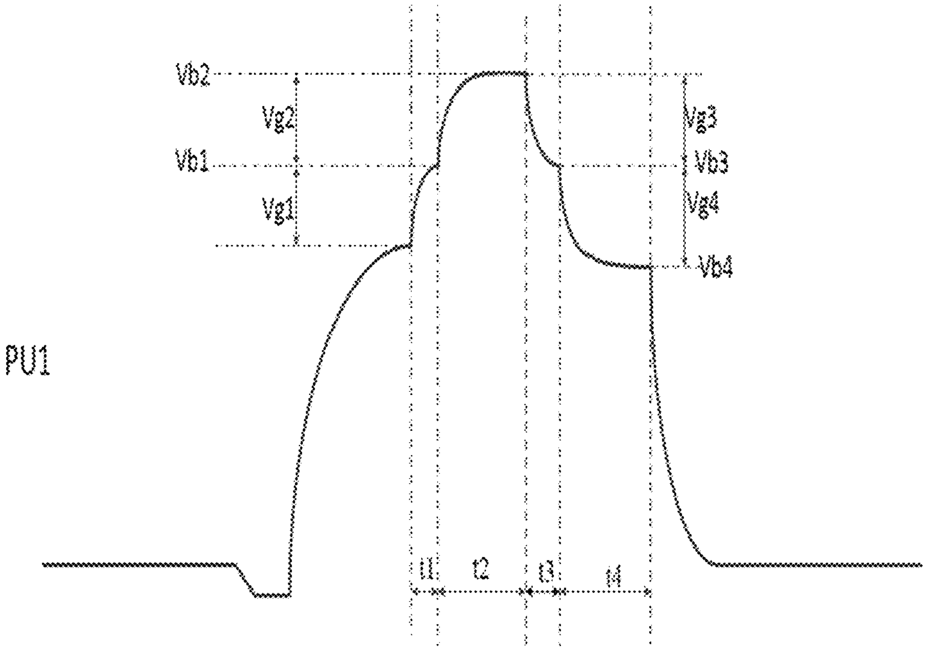
FIG. 11 is a waveform diagram of the potential of the first pull-up node PU1 when the driving circuit shown in FIG. 10 is in operation according to at least one embodiment of the present disclosure.

When at least one embodiment of the driving circuit shown in FIG. 10 of the present disclosure is in operation, when I1 is electrically connected to the first carry signal output terminal of the adjacent previous stage of driving circuit, VI1 is connected to the first driving signal output terminal of the adjacent previous stage of driving circuit;

When I1 provides a high voltage signal, M1 is turned on, as shown in FIG. 11, to pull up the potential of PU1 to a high voltage. At this time, K1, K2, and KC1 all provide a low voltage signal, so G1, G2 and Co1 all output a low voltage signal; M4 is turned on, M6 and M7 are turned on to control the potential of PD1 to be a low voltage, and the transistors whose gate electrodes are electrically connected to PD1 are all turned off;

The potential of the first clock signal provided by K1 jumps from a low level to a high level, as shown in FIG. 11, the potential of PU1 is raised to a higher potential, and within the first time t1, the potential of the first pull-up node PU1 rises by a first potential height Vg1, and the potential of the first pull-up node PU1 becomes a first voltage value Vb1;

The potential of the second clock signal provided by K2 jumps from a low level to a high level. As shown in FIG. 11, the potential of PU1 is raised to a higher potential, within the second time t2, the potential of the pull-up node PU1 rises by a second potential height Vg2, and the potential of the first pull-up node PU1 becomes a second voltage value Vb2;

The potential of the first clock signal provided by K1 jumps from a high level to a low level. As shown in FIG. 11, the potential of PU1 is reduced to a lower potential, within the third time t3, the potential of the pull-up node PU1 drops by a third potential height Vg3, and the potential of the first pull-up node PU1 becomes a third voltage value Vb3;

The potential of the second clock signal provided by K2 jumps from a high level to a low level. As shown in FIG. 11, the potential of PU1 is lowered to a lower potential, within the third time t4, the potential of the pull-up node PU1 drops by a fourth potential height Vg4, and the potential of the first pull-up node PU1 becomes a fourth voltage value Vb4, at this time, the potential of the first pull-up node PU1 may be at a low level;

When the potential of PU1 is a high voltage, MO1, MO2 and MC1 are turned on, G1 and K1 are connected, G2 and K2 are connected, Co1 and KC1 are connected, G1 outputs the corresponding first driving signal, and G2 outputs the corresponding second driving signal, Co1 outputs the corresponding first carry signal;

When the potential of PU1 is a low voltage, M4 is turned on, M6 and M7 are turned off, the potential of the first pull-down control node is a high voltage, M5 is turned on, the potential of PD1 is a high voltage, MF1, MF2 and MR1 are turned on, G1, G2 and Co1 output a low level.

When at least one embodiment of the driving circuit shown in FIG. 10 of the present disclosure is in operation, t1 can be greater than or equal to 2 us and less than or equal to 6 us, t2 can be greater than or equal to 5 us and less than or equal to 14 us, t3 can be greater than or equal to 2 us and less than or equal to 6 us, t4 can be greater than or equal to 5 us and less than or equal to 14 us;

Vb1 can be greater than or equal to 18V and less than or equal to 30V, Vb2 can be greater than or equal to 30V and less than or equal to 36V, Vb3 can be greater than or equal to 18V and less than or equal to 30V, Vb4 can be greater than or equal to 13V and less than or equal to 20V;

Vg1 can be greater than or equal to 2V and less than or equal to 12V, Vg2 can be greater than or equal to 6V and less than or equal to 18V, Vg3 can be greater than or equal to 6V and less than or equal to 18V, Vg4 can be greater than or equal to 2V and less than or equal to 17V; but not limited to this.

In at least one embodiment of the present disclosure, the first potential height Vg1 may be smaller than the second potential height Vg2, and the third potential height Vg3 may be greater than the fourth potential height Vg4; or;

The first potential height Vg1 may be greater than the second potential height Vg2, and the third potential height Vg3 may be smaller than the fourth potential height Vg4; or, The first potential height Vg1 may be equal to the second potential height Vg2, and the third potential height Vg3 may be equal to the fourth potential height Vg4.

In at least one embodiment of the present disclosure, the first time t1 may be less than the second time t2, and the third time t3 may be less than the fourth time t4; or, The first time t1 may be less than the second time t2, and the third time t3 may be less than the fourth time t4; or, The first time t1 may be greater than the second time t2, and the third time t3 may be greater than the fourth time t4; or, The first time t1 may be equal to the second time t2, and the third time t3 may be equal to the fourth time t4.

In at least one embodiment of the present disclosure, the ratio between the first voltage value Vb1 and the second voltage value Vb2 may be greater than or equal to 0.5 and less than or equal to 0.9;

The ratio between the fourth voltage value Vb4 and the third voltage value Vb3 may be greater than or equal to 0.4 and less than or equal to 0.9; but not limited to this.

In at least one embodiment of the present disclosure, the driving circuit further includes a first on-off control sub-circuit;

The first on-off control sub-circuit is electrically connected to a touch enable terminal, a first connection node and the first pull-up node respectively, and is configured to control to connect or disconnect the first connection node and the first pull-up node under the control of a touch enable signal provided by the touch enable terminal.

Optionally, the first on-off control sub-circuit includes a first on-off control transistor;

A control electrode of the first on-off control transistor is electrically connected to the touch enable terminal, a first electrode of the first on-off control transistor is connected to the first pull-up node, and a second electrode of the first on-off control transistor is electrically connected to the first connection node.

Figure 12:
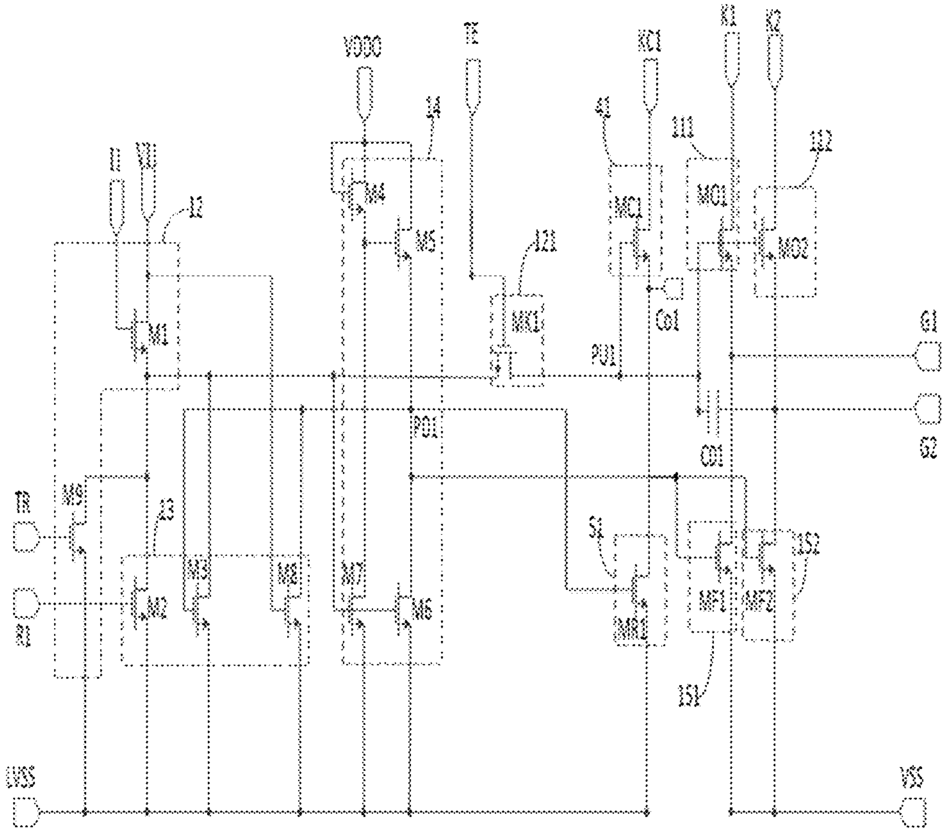
FIG. 12 is a circuit diagram of the driving circuit according to at least one embodiment of the present disclosure.

As shown in FIG. 12, on the basis of at least one embodiment of the driving circuit shown in FIG. 10, the driving circuit further includes a first on-off control sub-circuit 121; the first on-off control sub-circuit includes a first on-off control transistor MK1;

The gate electrode of the first on-off control transistor MK1 is electrically connected to the touch enable terminal TE, the source electrode of the first on-off control transistor MK1 is connected to the first pull-up node PU1, and the second electrode of the first on-off control transistor is electrically connected to the first connection node.

The drain electrode of the first transistor M1 is electrically connected to the first connection node.

On the basis of at least one embodiment of the driving circuit shown in FIG. 8, the driving circuit shown in FIG. 12 is added with a first on-off control transistor MK1;

In the normal display phase, TE provides a high level signal, and MK1 is turned on to ensure the charging and charge retention of PU1;

In the touch phase, TE provides a low level signal, MK1 is turned off, and the number of transistors that the leakage current of PU1 needs to pass through increases, the leakage current is smaller, and the voltage retention capacity of PU1 is stronger.

In at least one embodiment of the driving circuit shown in FIG. 8, FIG. 10, and FIG. 12, the source electrode of the first carry output transistor MC1 is electrically connected to the first carry clock signal terminal KC1, and the source electrode of the first output transistor MO1 is electrically connected to the first clock signal terminal K1, and the source electrode of the second output transistor MO2 is electrically connected to the second clock signal terminal K2; KC1, K1 and K2 are different clock signal terminals;

The gate driving circuit including the driving circuit may control predetermined stages of driving circuits to output corresponding driving signals, and may also control a plurality of stages of driving circuits included in the gate driving circuit to sequentially output corresponding driving signals.

In at least one embodiment of the present disclosure, the source electrode of the first carry output transistor may also be electrically connected to the first clock signal terminal or the second clock signal terminal, but not limited thereto.

Figure 13:
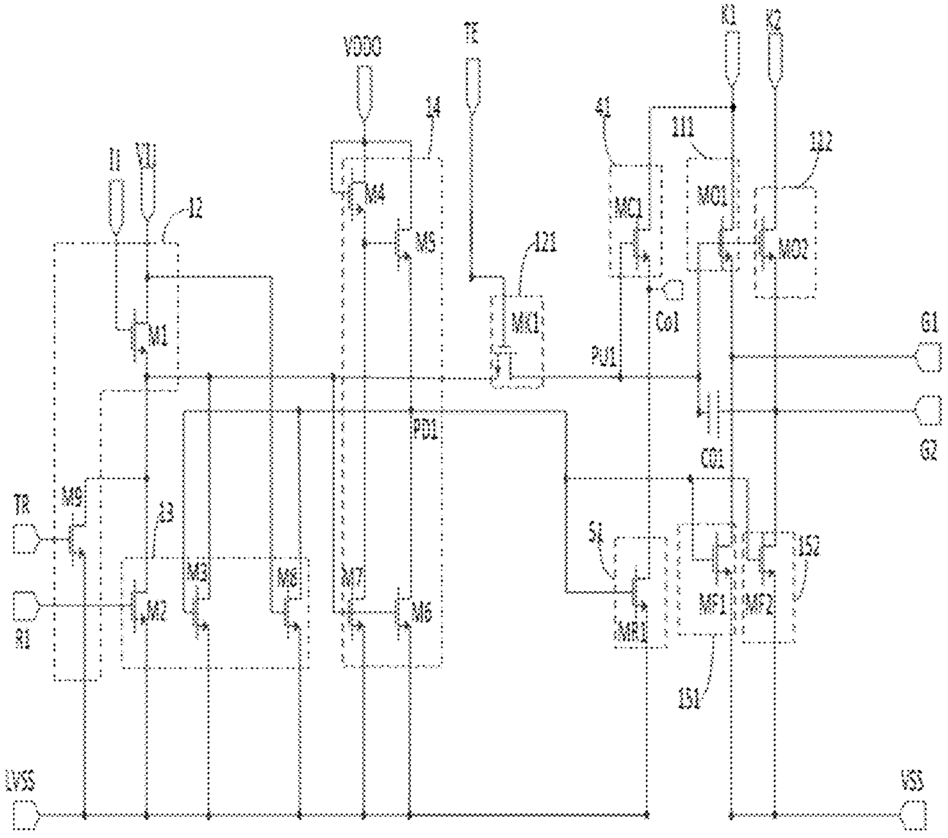
FIG. 13 is a circuit diagram of the driving circuit according to at least one embodiment of the present disclosure.

The difference between the driving circuit shown in FIG. 13 and the driving circuit shown in FIG. 12 is that: the source electrode of the first carry output transistor MC1 is electrically connected to the first clock signal terminal K1.

In at least one embodiment of the driving circuit shown in FIG. 13, the two output sub-circuits share the first pull-up node PU1, so the number of carry signal output terminals is reduced by half, and the first carry signal and the odd-numbered stage of driving signal output together. The size of M1 and the size of M2 can be increased to improve the charging and discharging capability of the first pull-up node PU1.

The display driving circuit described in at least one embodiment of the present disclosure may further include a first output capacitor;

A first terminal of the first output capacitor is electrically connected to the pull-up node circuit, and a second terminal of the first output capacitor is electrically connected to one of the N driving signal output terminals.

In at least one embodiment of the present disclosure, the driving circuit further includes M clock signal terminals, M output sub-circuits, a second carry output sub-circuit, M driving signal output terminals and a second carry signal output terminal; the M output sub-circuits share the second pull-up node;

The (N+m)th output sub-circuit is configured to output (N+m)th driving signal through the (N+m)th driving signal output terminal according to the (N+m)th clock signal provided by the (N+m)th clock signal terminal under the control of the potential of the second pull-up node, m is a positive integer less than or equal to M, and M is a positive integer greater than or equal to 2;

The second carry output sub-circuit is electrically connected to the second pull-up node, the second carry signal output terminal and the second carry clock signal terminal, and is configured to control to connect the second carry signal output terminal and the second carry clock signal terminal under the control of the potential of the second pull-up node.

In specific implementation, the driving circuit may also include M driving signal output terminals and a second carry signal output terminal, and M output sub-circuits respectively controlling the M driving signal output terminals, and the second carry output sub-circuit controlling the second carry signal output terminal, the M output sub-circuits share the second pull-up node.

In the following, M is equal to 2 as an example for illustration, but in actual operation, M may also be an integer greater than 2.

Figure 14:
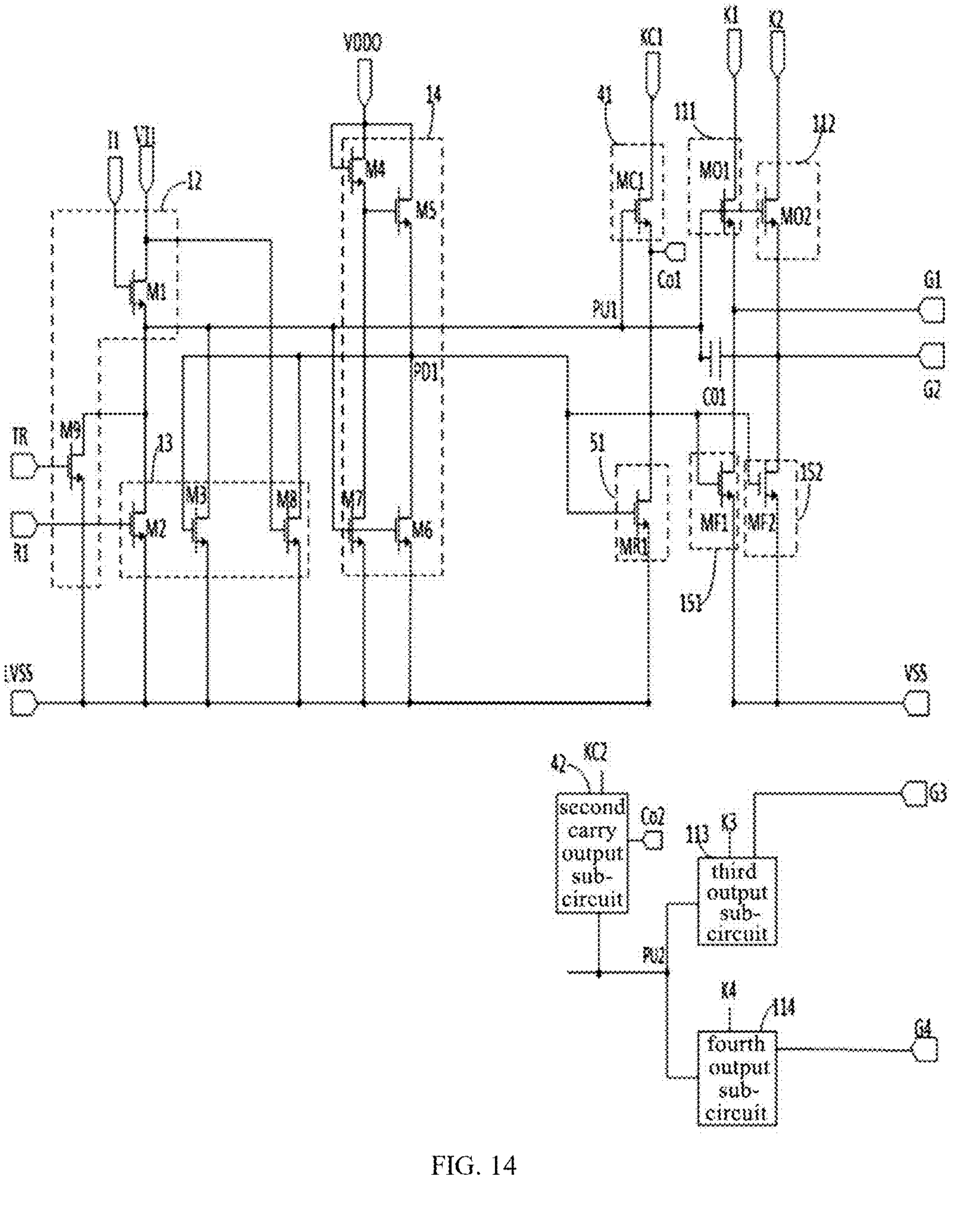
FIG. 14 is a circuit diagram of the driving circuit according to at least one embodiment of the present disclosure.

As shown in FIG. 14, on the basis of at least one embodiment of the driving circuit shown in FIG. 10, the driving circuit further includes a third clock signal terminal K3, a fourth clock signal terminal K4, a third output sub-circuit 113, a fourth output sub-circuit 114, a second carry output sub-circuit 42, a third driving signal output terminal G3, a fourth driving signal output terminal G4 and a second carry signal output terminal Co2; the third output sub-circuit 113 and the fourth output sub-circuit 114 share the second pull-up node PU2;

The third output sub-circuit 113 is respectively electrically connected to the second pull-up node PU2, the third clock signal terminal K3 and the third driving signal output terminal G3, and is used to control to connect the third driving signal output terminal G3 and the third clock signal terminal K3 under the control of the potential of the second pull-up node PU2;

The fourth output sub-circuit 114 is respectively electrically connected to the second pull-up node PU2, the fourth clock signal terminal K4 and the fourth driving signal output terminal G4, and is configured to control to connect the fourth driving signal output terminal G4 and the fourth clock signal terminal K4 under the control of the potential of the second pull-up node PU2;

The second carry output sub-circuit 42 is electrically connected to the second pull-up node PU2, the second carry signal output terminal Co2 and the second carry clock signal terminal KC2, respectively, is configured to control to connect the second carry signal output terminal Co2 and the second carry clock signal terminal Kc2 under the control of the potential of the second pull-up node PU2.

In at least one embodiment of the present disclosure, the driving circuit may further include M capacitors;

The first terminal of the mth capacitor among the M capacitors is electrically connected to the second pull-up node, and the second terminal of the mth capacitor among the M capacitors is connected to the (N+m)th driving signal output terminal.

In at least one embodiment of the present disclosure, the driving circuit further includes a second input sub-circuit, a second pull-down sub-circuit, a second pull-down node control sub-circuit, and M output reset sub-circuits; the M output reset sub-circuits share the second pull-down node;

The second input sub-circuit is configured to control the potential of the second pull-up node under the control of a second input signal provided by the second input terminal;

The second pull-down sub-circuit is respectively electrically connected to the second pull-up node, the second pull-down node, the second reset terminal and the first voltage terminal, and is used to control to connect the second pull-up node and the first voltage terminal under the control of the potential of the second pull-down node, and control to connect the second pull-up node and the first voltage terminal under the control of the second reset signal provided by the second reset terminal;

The second pull-down node control sub-circuit is electrically connected to the second control voltage terminal, the second pull-up node, the second pull-down node, and the first voltage terminal, is configured to control the potential of the second pull-down node under the control of the second control voltage provided by the second control voltage terminal and the potential of the second pull-up node according to the first voltage signal provided by the first voltage terminal;

The (N+m)th output reset sub-circuit is electrically connected to the second pull-down node, the second voltage terminal, and the (N+m)th driving signal output terminal, and is used to control to connect the (N+m)th driving signal output terminal and the second voltage terminal under the control of the potential of the second pull-down node.

Figure 15:
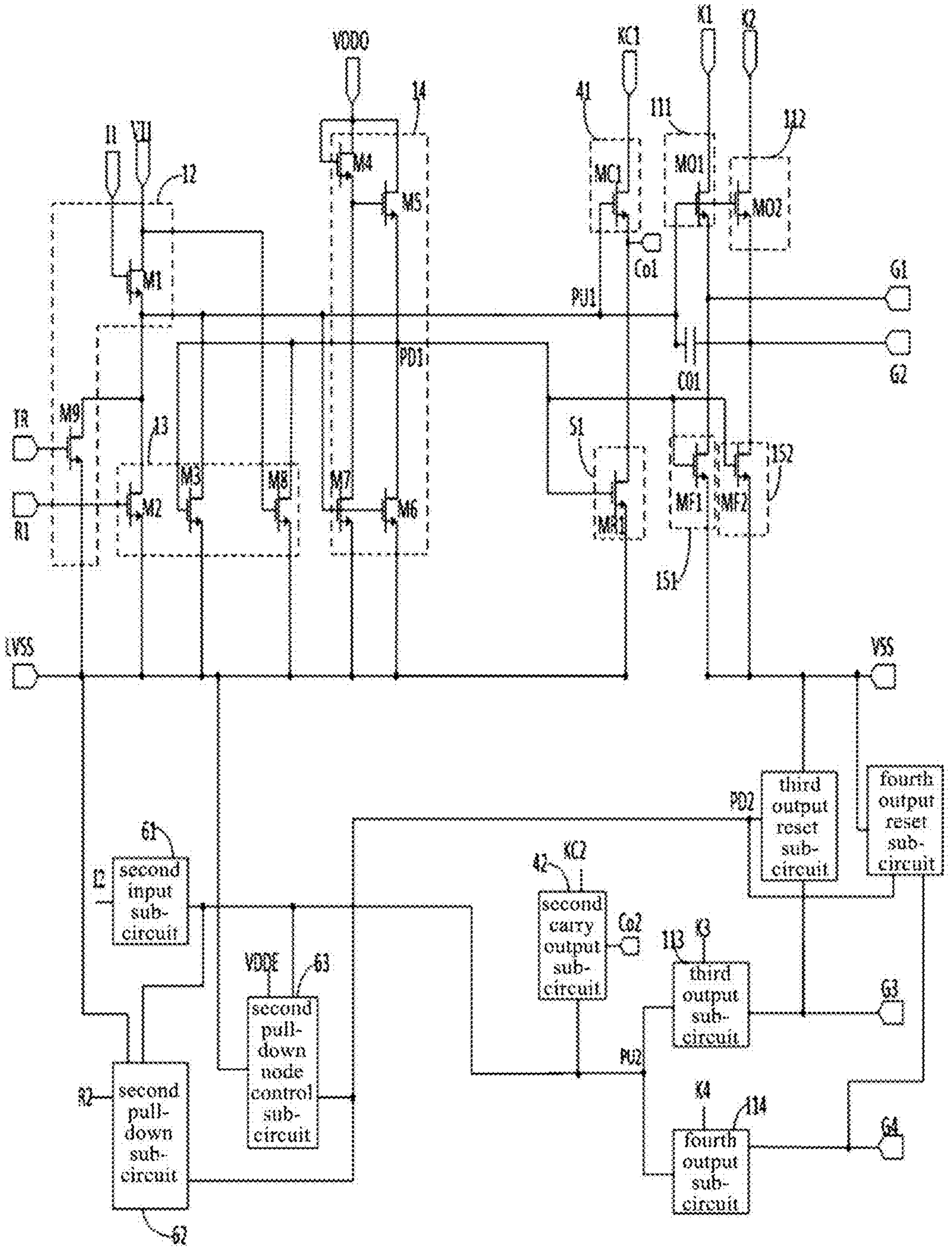
FIG. 15 is a circuit diagram of the driving circuit according to at least one embodiment of the present disclosure.

As shown in FIG. 15, on the basis of at least one embodiment of the driving circuit shown in FIG. 14, the driving circuit further includes a second input sub-circuit 61, a second pull-down sub-circuit 62, a second pull-down node control sub-circuit 63, a third output reset sub-circuit 153 and a fourth output reset sub-circuit 154; the third output reset sub-circuit 153 and the fourth output reset sub-circuit 154 share the second pull-down node PD2;

The second input sub-circuit 61 is electrically connected to the second input terminal I2 and the second pull-up node PU2, and is used to control the potential of the second pull-up node PU2 under the control of the second input signal provided by the second input terminal I2;

The second pull-down sub-circuit 62 is electrically connected to the second pull-up node PU2, the second pull-down node PD2, the second reset terminal R2 and the first low voltage terminal LVSS, respectively, is configured to control to connect the second pull-up node PU2 and the first low voltage terminal LVSS under the control of the potential of the second pull-down node PD2, and control to connect the second pull-up node PU2 and the first low voltage terminal LVSS under the control of the second reset signal provided by the second reset terminal R2;

The second pull-down node control sub-circuit 63 is electrically connected to the second control voltage terminal VDDE, the second pull-up node PU2, the second pull-down node PD2 and the first low voltage terminal LVSS, respectively, is configured to control of the potential of the second pull-down node PD2 under the control of the second control voltage provided by the second control voltage terminal VDDE and the potential of the second pull-up node PU2 according to the first low voltage signal provided by the first low voltage terminal LVSS;

The third output reset sub-circuit 153 is respectively electrically connected to the second pull-down node PD2, the second low voltage terminal VSS and the third driving signal output terminal G3, and is configured to control to connect the third driving signal output terminal G3 and the second low voltage terminal VSS under the control of the potential of the second pull-down node PD2;

The fourth output reset sub-circuit 154 is electrically connected to the second pull-down node PD2, the second low voltage terminal VSS, and the fourth driving signal output terminal G4, respectively, is configured to control to connect the fourth driving signal output terminal G4 and the second low voltage terminal VSS under the control of the potential of the second pull-down node PD2.

In at least one embodiment of the present disclosure, the driving circuit further includes a second carry reset sub-circuit;

The second carry reset sub-circuit is electrically connected to the second pull-down node, the second carry signal output terminal and the first voltage terminal, and is used to control to connect the second carry signal output terminal and the first voltage terminal under the control of the potential of the second pull-down node.

Figure 16:
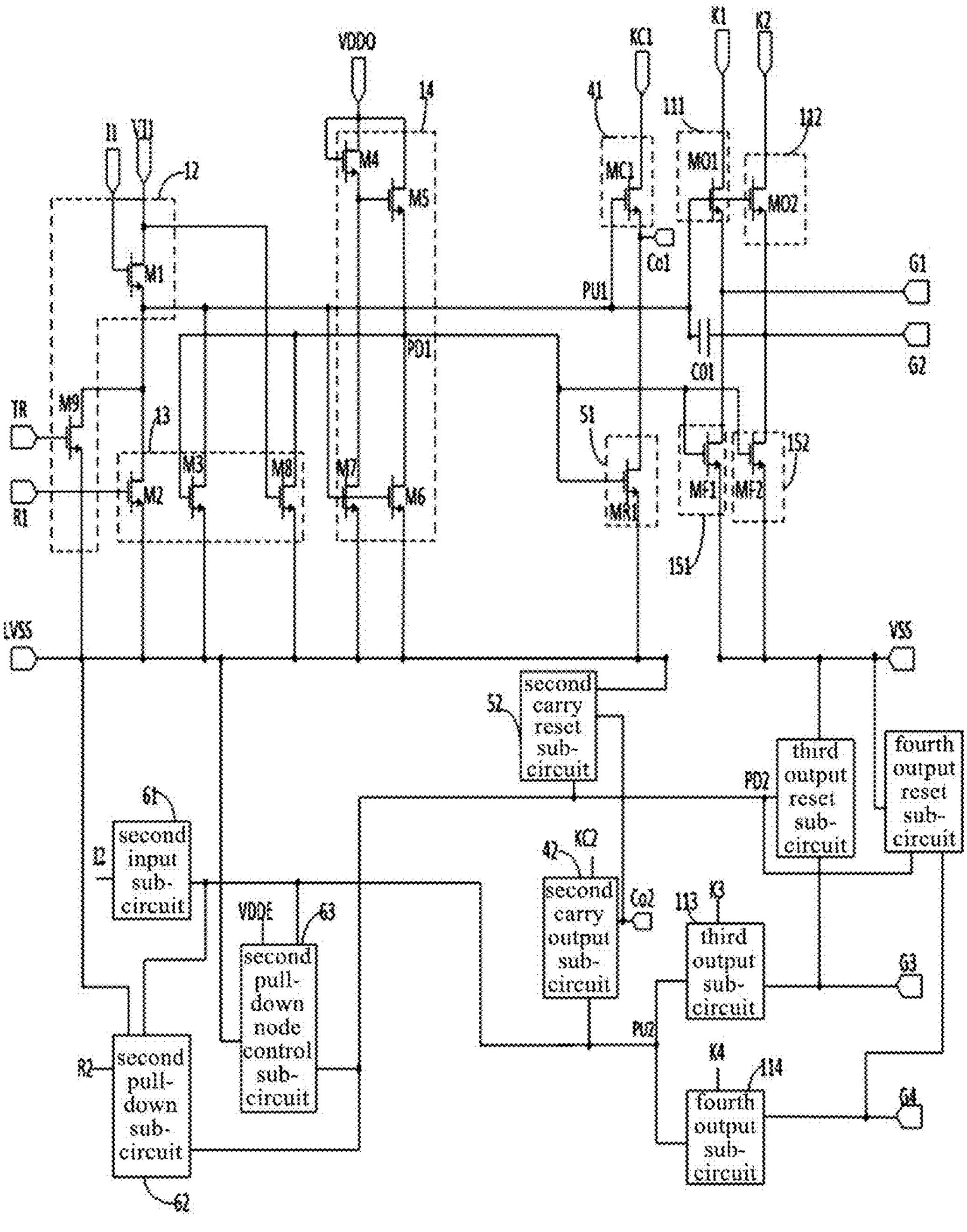
FIG. 16 is a circuit diagram of the driving circuit according to at least one embodiment of the present disclosure.

As shown in FIG. 16, on the basis of at least one embodiment of the driving circuit shown in FIG. 15, the driving circuit further includes a second carry reset sub-circuit 52;

The second carry reset sub-circuit 52 is electrically connected to the second pull-down node PD2, the second carry signal output terminal Co2 and the first low voltage terminal LVSS, respectively, is configured to control to connect the second carry signal output terminal Co2 and the first low voltage terminal LVSS under the control of the potential of the second pull-down node PD2.

In at least one embodiment of the present disclosure, the second input sub-circuit is respectively electrically connected to the second input terminal, the second input voltage terminal and the second pull-up node, is configured to control to connect the second pull-up node and the second input voltage terminal under the control of the second input signal provided by the second input terminal;

The second input terminal may be a second carry signal output terminal of an adjacent previous stage of driving circuit;

The second input voltage terminal may be the second carry signal output terminal of the adjacent previous stage of driving circuit, the dth driving signal output terminal included in the adjacent previous stage of driving circuit or the third voltage terminal; d is a positive integer less than or equal to M.

Figure 17:
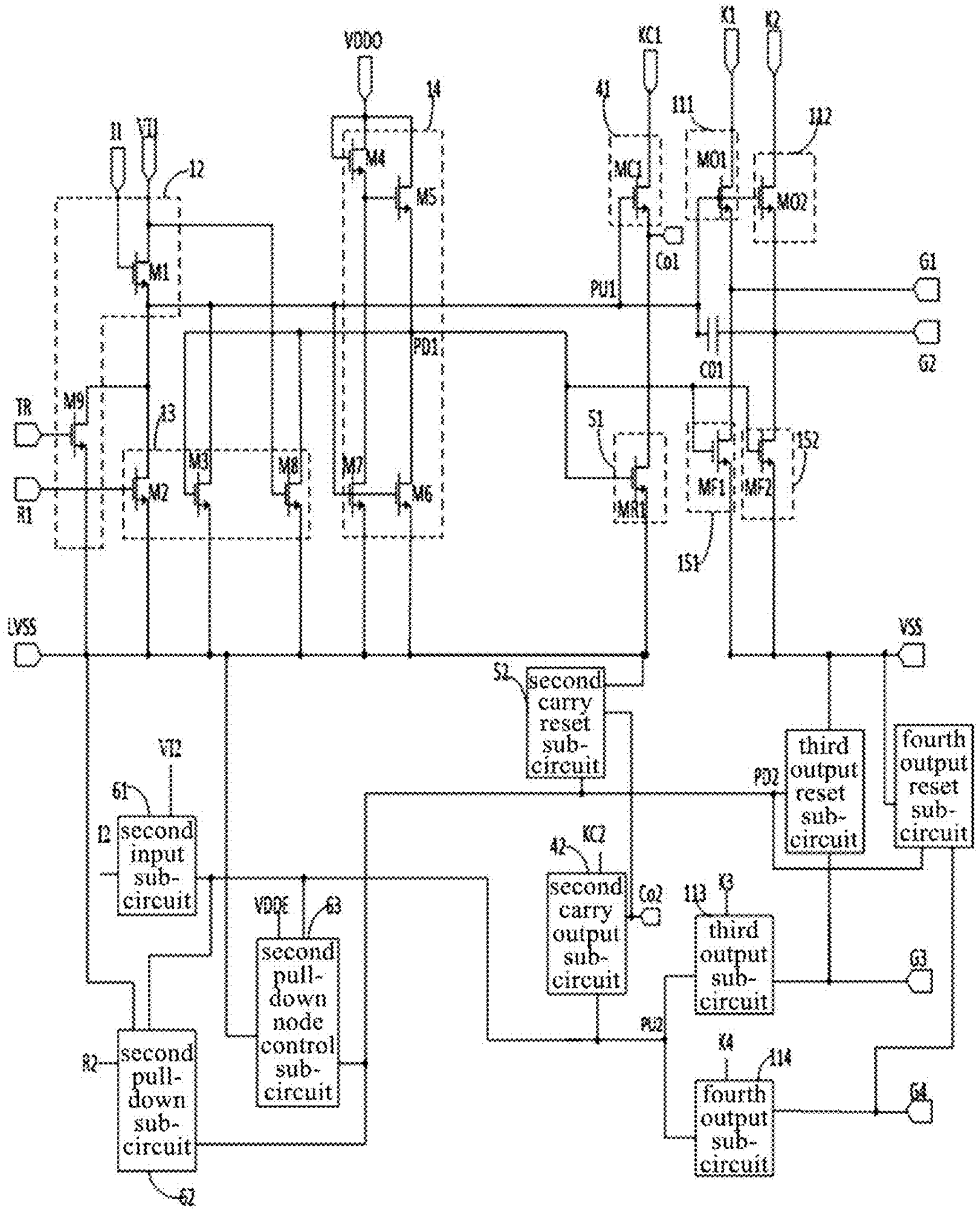
FIG. 17 is a circuit diagram of the driving circuit according to at least one embodiment of the present disclosure.

As shown in FIG. 17, on the basis of at least one embodiment of the driving circuit shown in FIG. 16, the second input sub-circuit 61 is also electrically connected to the second input voltage terminal VI2, is configured to control to connect the second pull-up node PU2 and the second input voltage terminal VI2 under the control of the second input signal provided by the second input terminal I2.

In at least one embodiment of the present disclosure, the second input terminal may be a second carry signal output terminal of an adjacent previous stage of driving circuit, and the second input voltage terminal and the second input terminal may be the same voltage terminal; or, the second input voltage terminal may be a different voltage terminal from the second input terminal.

When the second input voltage terminal may be a different voltage terminal from the second input terminal, The second input voltage terminal may be the first driving signal output terminal of an adjacent previous stage of driving circuit or the second driving signal output terminal of an adjacent previous stage of driving circuit; or, The second input voltage terminal may be a high voltage terminal; but not limited to this.

Optionally, the second carry clock signal terminal is a dth clock signal terminal among the M clock signal terminals.

In a specific implementation, the second carry clock signal terminal may also be one of the M clock signal terminals, so as to reduce the number of clock signal terminals.

In at least one embodiment of the present disclosure, the second pull-down sub-circuit is further electrically connected to the second input voltage terminal, and is used to control to connect the second pull-down node and the first voltage terminal under the control of the second input voltage provided by the second input voltage terminal, to control the potential of the second pull-down node;

The second input sub-circuit is also electrically connected to the frame reset terminal, and is also used to control to connect the second pull-up node and the first voltage terminal under the control of the frame reset signal provided by the frame reset terminal, to reset the potential of the second pull-up node.

Figure 18:
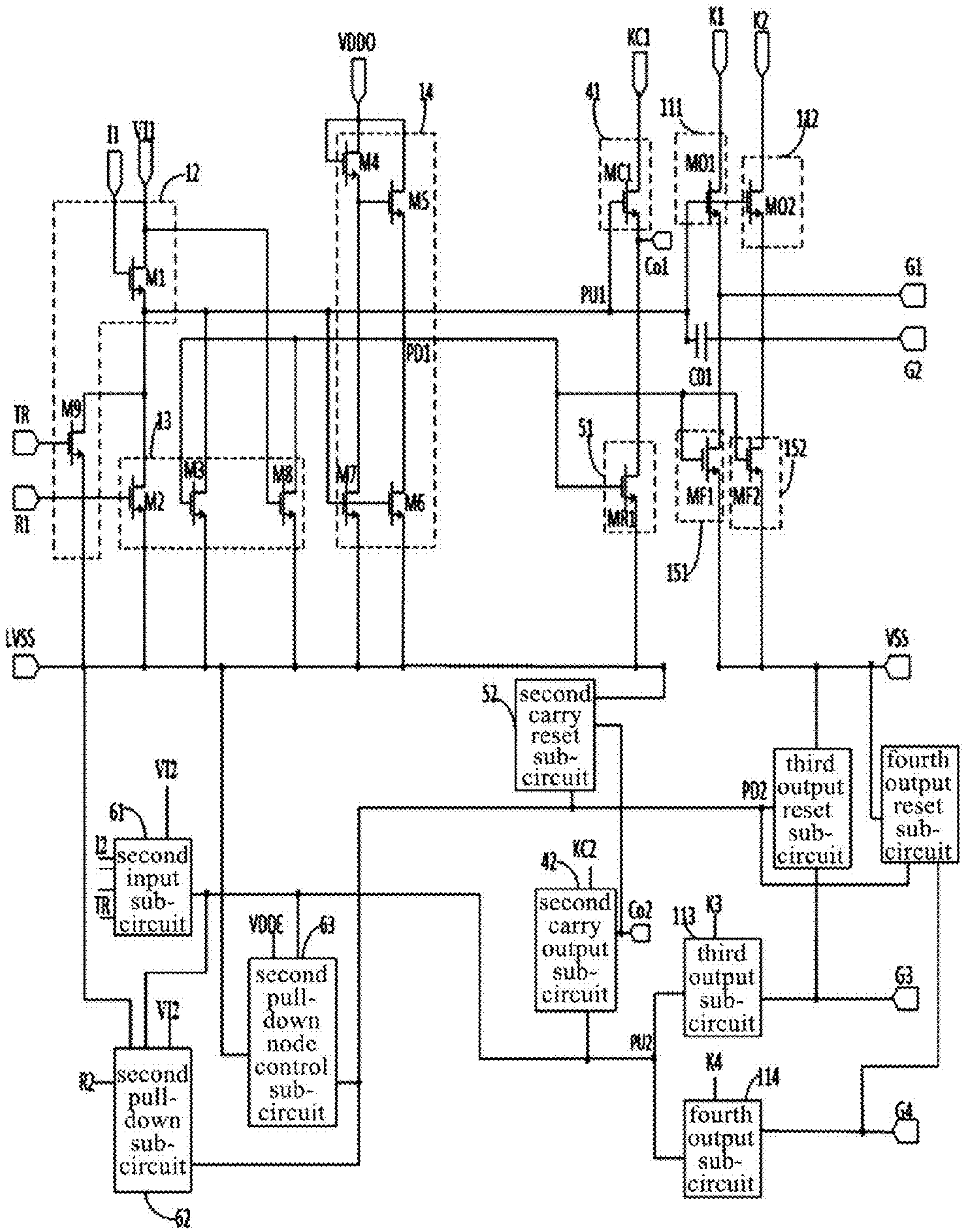
FIG. 18 is a circuit diagram of the driving circuit according to at least one embodiment of the present disclosure.

As shown in FIG. 18, on the basis of at least one embodiment of the driving circuit shown in FIG. 17, the second pull-down sub-circuit 62 is also electrically connected to the second input voltage terminal VI2, is configured to control to connect the second pull-down node PD2 and the first low voltage terminal LVSS under the control of the second input voltage provided by the second input voltage terminal VI2;

The second input sub-circuit 61 is also electrically connected to the frame reset terminal TR, and is also used to control to connect the second pull-up node PU2 and the first low voltage terminals LVSS under the control of the frame reset signal provided by the frame reset terminal TR, to reset the potential of the second pull-up node PU2.

In at least one embodiment of the present disclosure, the driving circuit may further include M capacitors;

The first terminal of the mth capacitor among the M capacitors is electrically connected to the second pull-up node, and the second terminal of the mth capacitor among the M capacitors is connected to the (N+m)th driving signal output terminal.

In specific implementation, the driving circuit may also include M capacitors, the first terminals of the M capacitors are all electrically connected to the second pull-up node, and the second terminals of the M capacitors are respectively connected to the M driving signal output terminals.

Optionally, the first pull-down sub-circuit further includes a tenth transistor;

A control electrode of the tenth transistor is electrically connected to the second pull-down node, a first electrode of the tenth transistor is electrically connected to the first pull-up node, and a second electrode of the tenth transistor is electrically connected to the first voltage terminal;

The first pull-down node control sub-circuit further includes an eleventh transistor;

A control electrode of the eleventh transistor is electrically connected to the second pull-up node, a first electrode of the eleventh transistor is electrically connected to the first pull-down control node, and a second electrode of the eleventh transistor is electrically connected to the first voltage terminal.

Optionally, the nth output reset sub-circuit further includes an nth reset transistor;

A control electrode of the nth reset transistor is electrically connected to the second pull-down node, a first electrode of the nth reset transistor is electrically connected to the nth driving signal output terminal, and a second electrode of the nth reset transistor is electrically connected to the second voltage terminal.

In at least one embodiment of the present disclosure, the first carry reset sub-circuit may further include a second carry reset transistor;

A control electrode of the second carry reset transistor is electrically connected to the second pull-down node, a first electrode of the second carry reset transistor is electrically connected to the first carry signal output terminal, and a second electrode of the second carry reset transistor is electrically connected to the first voltage terminal.

Figure 19:
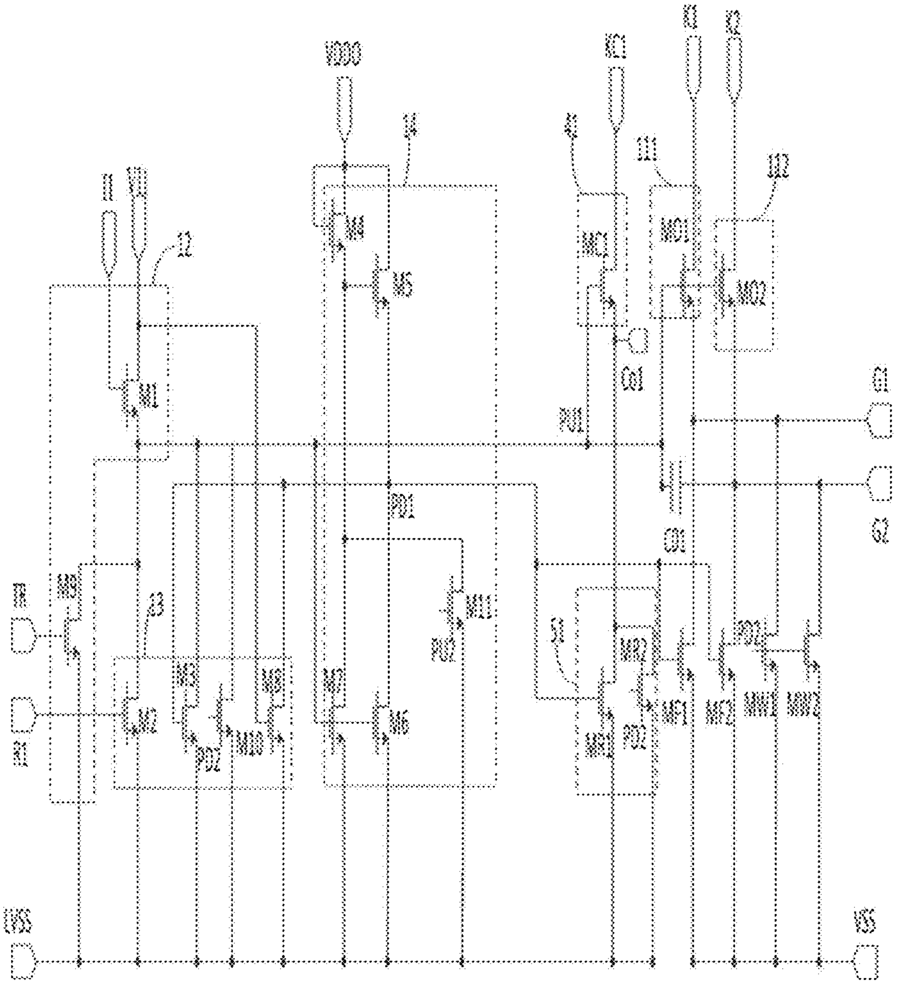
FIG. 19 is a circuit diagram of the driving circuit according to at least one embodiment of the present disclosure.

As shown in FIG. 19, on the basis of at least one embodiment of the driving circuit shown in FIG. 10, the first pull-down sub-circuit 13 further includes a tenth transistor M10;

The gate electrode of the tenth transistor M10 is electrically connected to the second pull-down node PD2, the source electrode of the tenth transistor M10 is electrically connected to the first pull-up node PU1, and the drain electrode of the tenth transistor M10 is electrically connected to the first low voltage terminal LVSS;

The first pull-down node control sub-circuit 14 further includes an eleventh transistor M11;

The gate electrode of the eleventh transistor M11 is electrically connected to the second pull-up node PU2, the source electrode of the eleventh transistor M11 is electrically connected to the first pull-down control node, and the drain electrode of the eleventh transistor M11 is electrically connected to the first low voltage terminal LVSS;

The first output reset sub-circuit further includes a first reset transistor MW1; the second output reset sub-circuit further includes a second reset transistor MW2;

The gate electrode of the first reset transistor MW1 is electrically connected to the second pull-down node PD2, the source electrode of the first reset transistor is electrically connected to the first driving signal output terminal G1, and the drain electrode of the nth reset transistor MW1 is electrically connected to the second low voltage terminal VSS;

The gate electrode of the second reset transistor MW2 is electrically connected to the second pull-down node PD2, the source electrode of the second reset transistor MW2 is electrically connected to the second driving signal output terminal G2, and the drain electrode of the second reset transistor MW2 is electrically connected to the second low voltage terminal VSS;

The first carry reset sub-circuit 51 may also include a second carry reset transistor MR2;

The gate electrode of the second carry reset transistor MR2 is electrically connected to the second pull-down node PD2, the source electrode of the second carry reset transistor MR2 is electrically connected to the first carry signal output terminal Co1, and the drain electrode of the second carry reset transistor MR2 is electrically connected to the first low voltage terminal LVSS.

Figure 20:
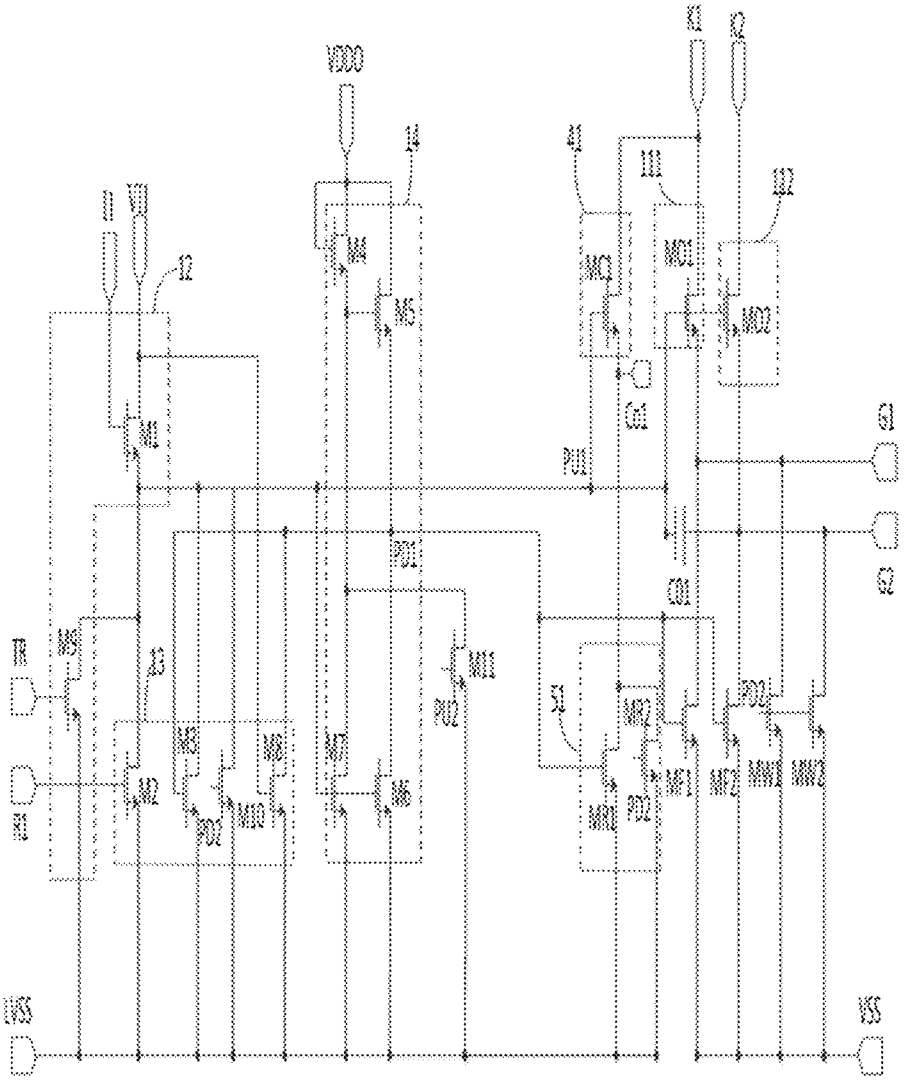
FIG. 20 is a circuit diagram of the driving circuit according to at least one embodiment of the present disclosure.

The difference between at least one embodiment of the driving circuit shown in FIG. 20 and at least one embodiment of the driving circuit shown in FIG. 19 is that: the source electrode of the first carry output transistor MC1 is electrically connected to the first clock signal terminal K1.

In at least one embodiment of the present disclosure, the second pull-down sub-circuit may include a twelfth transistor;

A control electrode of the twelfth transistor is electrically connected to the first pull-down node, a first electrode of the twelfth transistor is electrically connected to the second pull-up node, and a second electrode of the twelfth transistor is electrically connected to the first voltage terminal;

The second pull-down node control sub-circuit includes a thirteenth transistor;

A control electrode of the thirteenth transistor is electrically connected to the first pull-up node, a first electrode of the thirteenth transistor is electrically connected to the second pull-down control node, and a second electrode of the thirteenth transistor is electrically connected to the first voltage terminal.

Optionally, the (N+m)th output reset sub-circuit includes an (N+m)th reset transistor;

A control electrode of the (N+m)th reset transistor is electrically connected to the first pull-down node, a first electrode of the (N+m)th reset transistor is electrically connected to the (N+m)th driving signal output terminal, and a second electrode of the (N+m)th reset transistor is electrically connected to the second voltage terminal.

Optionally, the second carry reset sub-circuit includes a third carry reset transistor and a fourth carry reset transistor;

A control electrode of the third carry reset transistor is electrically connected to the second pull-down node, a first electrode of the third carry reset transistor is electrically connected to the second carry signal output terminal, and a second electrode of the third carry reset transistor is electrically connected to the first voltage terminal;

A control electrode of the fourth carry reset transistor is electrically connected to the first pull-down node, a first electrode of the fourth carry reset transistor is electrically connected to the second carry signal output terminal, and a second electrode of the fourth carry reset transistor is electrically connected to the first voltage terminal.

Optionally, the second input sub-circuit includes a fourteenth transistor, the second pull-down sub-circuit includes a fifteenth transistor and a sixteenth transistor; the second pull-down node control sub-circuit includes a seventeenth transistor, an eighteenth transistor, a nineteenth transistor, and a twentieth transistor;

A control electrode of the fourteenth transistor is electrically connected to the second input terminal, a first electrode of the fourteenth transistor is electrically connected to the second input voltage terminal, and a second electrode of the fourteenth transistor is electrically connected to the second pull-up node;

A control electrode of the fifteenth transistor is electrically connected to the second reset terminal, a first electrode of the fifteenth transistor is electrically connected to the second pull-up node, and a second electrode of the fifteenth transistor electrically connected to the first voltage terminal;

A control electrode of the sixteenth transistor is electrically connected to the second pull-down node, a first electrode of the sixteenth transistor is electrically connected to the second pull-up node, and a second electrode of the sixteenth transistor is electrically connected to the first voltage terminal;

A control electrode of the seventeenth transistor and a first electrode of the seventeenth transistor are both electrically connected to the second control voltage terminal, and a second electrode of the seventeenth transistor is electrically connected to the second pull-down control node;

A control electrode of the eighteenth transistor is electrically connected to the second pull-down control node, a first electrode of the eighteenth transistor is electrically connected to the second control voltage terminal, and a second electrode of the eighteenth transistor is electrically connected to the second pull-down node;

A control electrode of the nineteenth transistor is electrically connected to the second pull-up node, a first electrode of the nineteenth transistor is electrically connected to the second pull-down node, and a second electrode of the nineteenth transistor is electrically connected to the first voltage terminal;

A control electrode of the twentieth transistor is electrically connected to the second pull-up node, a first electrode of the twentieth transistor is electrically connected to the second pull-down control node, and a second electrode of the twentieth transistor is electrically connected to the first voltage terminal.

Optionally, the second pull-down sub-circuit includes a twenty-first transistor, and the second input sub-circuit further includes a twenty-second transistor;

A control electrode of the twenty-first transistor is electrically connected to the first input voltage terminal, a first electrode of the twenty-first transistor is electrically connected to the second pull-down node, and a second electrode of the twenty-first transistor is electrically connected to the first voltage terminal;

A control electrode of the twenty-second transistor is electrically connected to the frame reset terminal, a first electrode of the twenty-second transistor is electrically connected to the second pull-up node, and a second electrode of the twenty-second transistor is electrically connected to the first voltage terminal.

Optionally, the second pull-down node control sub-circuit further includes a twenty-third transistor and a twenty-fourth transistor;

A control electrode of the twenty-third transistor is electrically connected to the second pull-up node, a first electrode of the twenty-third transistor is electrically connected to the first pull-down node, and a second electrode of the twenty-third transistor is electrically connected to the first voltage terminal;

A control electrode of the twenty-fourth transistor is electrically connected to the second pull-up node, a first electrode of the twenty-fourth transistor is electrically connected to the second pull-down node, and a second electrode of the twenty-fourth transistor is electrically connected to the first voltage terminal.

Optionally, the (N+m)th output sub-circuit includes an (N+m)th output transistor;

A control electrode of the (N+m)th output transistor is electrically connected to the second pull-up node, a first electrode of the (N+m)th output transistor is electrically connected to the (N+m)th clock signal terminal, and a second electrode of the (N+m)th output transistor is electrically connected to the (N+m)th driving signal output terminal; The second carry output sub-circuit includes a second carry output transistor;

A control electrode of the second carry output transistor is electrically connected to the second pull-up node, a first electrode of the second carry output transistor is electrically connected to the second carry clock signal terminal, and a second electrode of the second carry output transistor is electrically connected to the second carry signal output terminal;

The (N+m)th output reset sub-circuit includes an (N+m)th output reset transistor;

A control electrode of the (N+m)th output reset transistor is electrically connected to the second pull-down node, and a first electrode of the (N+m)th output reset transistor is electrically connected to the (N+m)th driving signal output terminal, a second electrode of the (N+m)th output reset transistor is electrically connected to the second voltage terminal.

Figure 21:
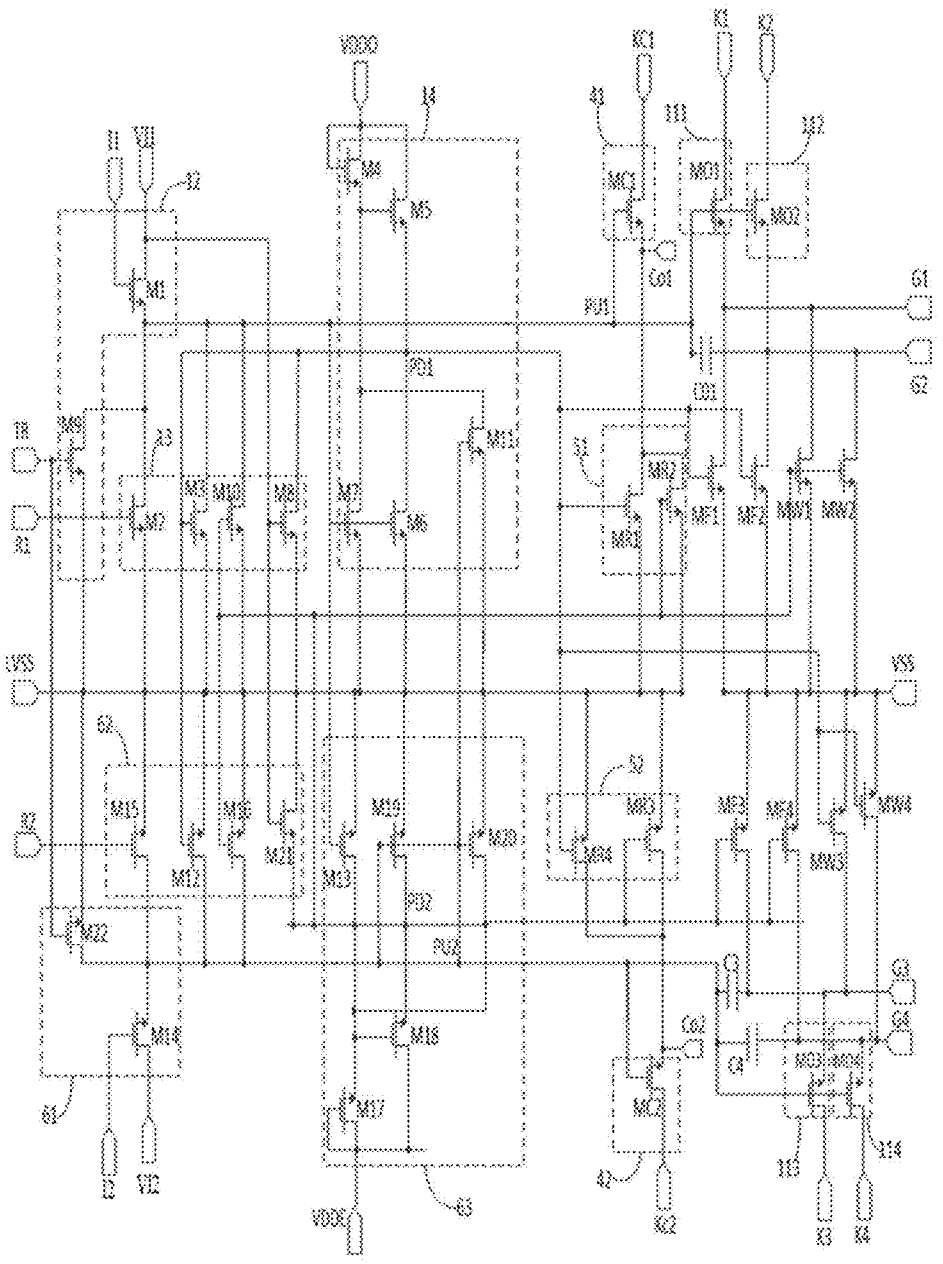
FIG. 21 is a circuit diagram of the driving circuit according to at least one embodiment of the present disclosure.

As shown in FIG. 21, on the basis of at least one embodiment of the driving circuit shown in FIG. 19, the second pull-down sub-circuit 62 may include a twelfth transistor M12; the driving circuit further includes a third capacitor C3 and a fourth capacitor C4;

The gate electrode of the twelfth transistor M12 is electrically connected to the first pull-down node PD1, the source electrode of the twelfth transistor M12 is electrically connected to the second pull-up node PU2, and the drain electrode of the twelfth transistor M12 is electrically connected to the first low voltage terminal LVSS;

The second pull-down node control sub-circuit 63 includes a thirteenth transistor M13;

The gate electrode of the thirteenth transistor M13 is electrically connected to the first pull-up node PU1, the source electrode of the thirteenth transistor M13 is electrically connected to the second pull-down control node, and the second electrode of the thirteenth transistor M13 is electrically connected to the first low voltage terminal LVSS;

The third output reset sub-circuit includes a third reset transistor MW3; the fourth output reset sub-circuit includes a fourth reset transistor MW4;

The gate electrode of the third reset transistor MW3 is electrically connected to the first pull-down node PD1, the source electrode of the third reset transistor MW3 is electrically connected to the third driving signal output terminal G3, and the drain electrode of the third reset transistor MW3 is electrically connected to the second low voltage terminal VSS;

The gate electrode of the fourth reset transistor MW4 is electrically connected to the first pull-down node PD1, the source electrode of the fourth reset transistor MW4 is electrically connected to the fourth driving signal output terminal G4, and the drain electrode of the fourth reset transistor MW4 is electrically connected to the second low voltage terminal VSS;

The second carry reset sub-circuit 52 includes a third carry reset transistor MR3 and a fourth carry reset transistor MR4;

The gate electrode of the third carry reset transistor MR3 is electrically connected to the second pull-down node PD2, the source electrode of the third carry reset transistor MR3 is electrically connected to the second carry signal output terminal Co2, and the drain electrode of the third carry reset transistor MR3 is electrically connected to the first low voltage terminal LVSS;

The gate electrode of the fourth carry reset transistor MR4 is electrically connected to the first pull-down node PD1, the source electrode of the fourth carry reset transistor MR4 is electrically connected to the second carry signal output terminal Co2, and the drain electrode of the fourth carry reset transistor MR4 is electrically connected to the first low voltage terminal LVSS;

The second input sub-circuit 61 includes a fourteenth transistor M14, the second pull-down sub-circuit 62 includes a fifteenth transistor M15 and a sixteenth transistor M16; the second pull-down node control sub-circuit 63 includes a seventeenth transistor M17, an eighteenth transistor M18, a nineteenth transistor M19 and a twentieth transistor M20;

The gate electrode of the fourteenth transistor M14 is electrically connected to the second input terminal I2, the source electrode of the fourteenth transistor M14 is electrically connected to the second input voltage terminal VI2, and the drain electrode of the fourteenth transistor M14 is electrically connected to the second pull-up node PU2;

The gate electrode of the fifteenth transistor M15 is electrically connected to the second reset terminal R2, the source electrode of the fifteenth transistor M15 is electrically connected to the second pull-up node PU2, and the drain electrode of the fifteenth transistor M15 is electrically connected to the first low voltage terminal LVSS;

The gate electrode of the sixteenth transistor M16 is electrically connected to the second pull-down node PD2, the source electrode of the sixteenth transistor M16 is electrically connected to the second pull-up node PU2, and the drain electrode of the sixteenth transistor M16 is electrically connected to the first low voltage terminal LVSS;

Both the gate electrode of the seventeenth transistor M17 and the source electrode of the seventeenth transistor M17 are electrically connected to the second control voltage terminal VDDE, and the drain electrode of the seventeenth transistor M17 is connected to the second pull-down control node;

The gate electrode of the eighteenth transistor M18 is electrically connected to the second pull-down control node, the source electrode of the eighteenth transistor M18 is electrically connected to the second control voltage terminal VDDE, and the drain electrode of the eighteenth transistor M18 is electrically connected to the second pull-down node PD2;

The gate electrode of the nineteenth transistor M19 is electrically connected to the second pull-up node PU2, the source electrode of the nineteenth transistor M19 is electrically connected to the second pull-down node PD2, and the drain electrode of the nineteenth transistor M19 is electrically connected to the first low voltage terminal LVSS;

The gate electrode of the twentieth transistor M20 is electrically connected to the second pull-up node PU2, the source electrode of the twentieth transistor M20 is electrically connected to the second pull-down control node, and the drain electrode of the twentieth transistor M20 is electrically connected to the first low voltage terminal LVSS;

The second pull-down sub-circuit 62 includes a twenty-first transistor M21, and the second input sub-circuit 61 also includes a twenty-second transistor M22;

The gate electrode of the twenty-first transistor M21 is electrically connected to the first input voltage terminal VI1, the source electrode of the twenty-first transistor M21 is electrically connected to the second pull-down node PD2, and the drain electrode of the twenty-first transistor M21 is electrically connected to the first low voltage terminal LVSS;

The gate electrode of the twenty-second transistor M22 is electrically connected to the frame reset terminal TR, the source electrode of the twenty-second transistor M22 is electrically connected to the second pull-up node PU2, and the drain electrode of the twenty-second transistor M22 is electrically connected to the first low voltage terminal LVSS;

The third output sub-circuit 113 includes a third output transistor MO3; the fourth output sub-circuit 114 includes a fourth output transistor MO4;

The gate electrode of the third output transistor MO3 is electrically connected to the second pull-up node PU2, the source electrode of the third output transistor MO3 is electrically connected to the third clock signal terminal K3, and the drain electrode of the third output transistor MO3 is electrically connected to the third driving signal output terminal G3;

The gate electrode of the fourth output transistor MO4 is electrically connected to the second pull-up node PU2, the source electrode of the fourth output transistor MO4 is electrically connected to the fourth clock signal terminal K4, and the drain electrode of the fourth output transistor MO4 is electrically connected to the fourth driving signal output terminal G4;

The second carry output sub-circuit 42 includes a second carry output transistor MC2;

The gate electrode of the second carry output transistor MC2 is electrically connected to the second pull-up node PU2, and the source electrode of the second carry output transistor MC2 is electrically connected to the second carry clock signal terminal Kc2. The drain electrode of the second carry output transistor MC2 is electrically connected to the second carry signal output terminal Co2;

The third output reset sub-circuit includes a third output reset transistor MF3; the fourth output reset sub-circuit includes a fourth output reset transistor MF4;

The gate electrode of the third output reset transistor MF3 is electrically connected to the second pull-down node PD2, the source electrode of the third output reset transistor MF3 is electrically connected to the third driving signal output terminal G3, and the drain electrode of the third output reset transistor MF3 is electrically connected to the second low voltage terminal VSS;

The gate electrode of the fourth output reset transistor MF4 is electrically connected to the second pull-down node PD2, the source electrode of the fourth output reset transistor MF4 is electrically connected to the fourth driving signal output terminal G4, and the drain electrode of the fourth output reset transistor MF4 is electrically connected to the second low voltage terminal VSS;

The first terminal of the third capacitor C3 is electrically connected to the second pull-up node PU2, and the second terminal of the third capacitor C3 is electrically connected to the third driving signal output terminal G3;

A first terminal of the fourth capacitor C4 is electrically connected to the second pull-up node PU2, and a second terminal of the fourth capacitor C4 is electrically connected to the fourth driving signal output terminal G4.

Figure 22:
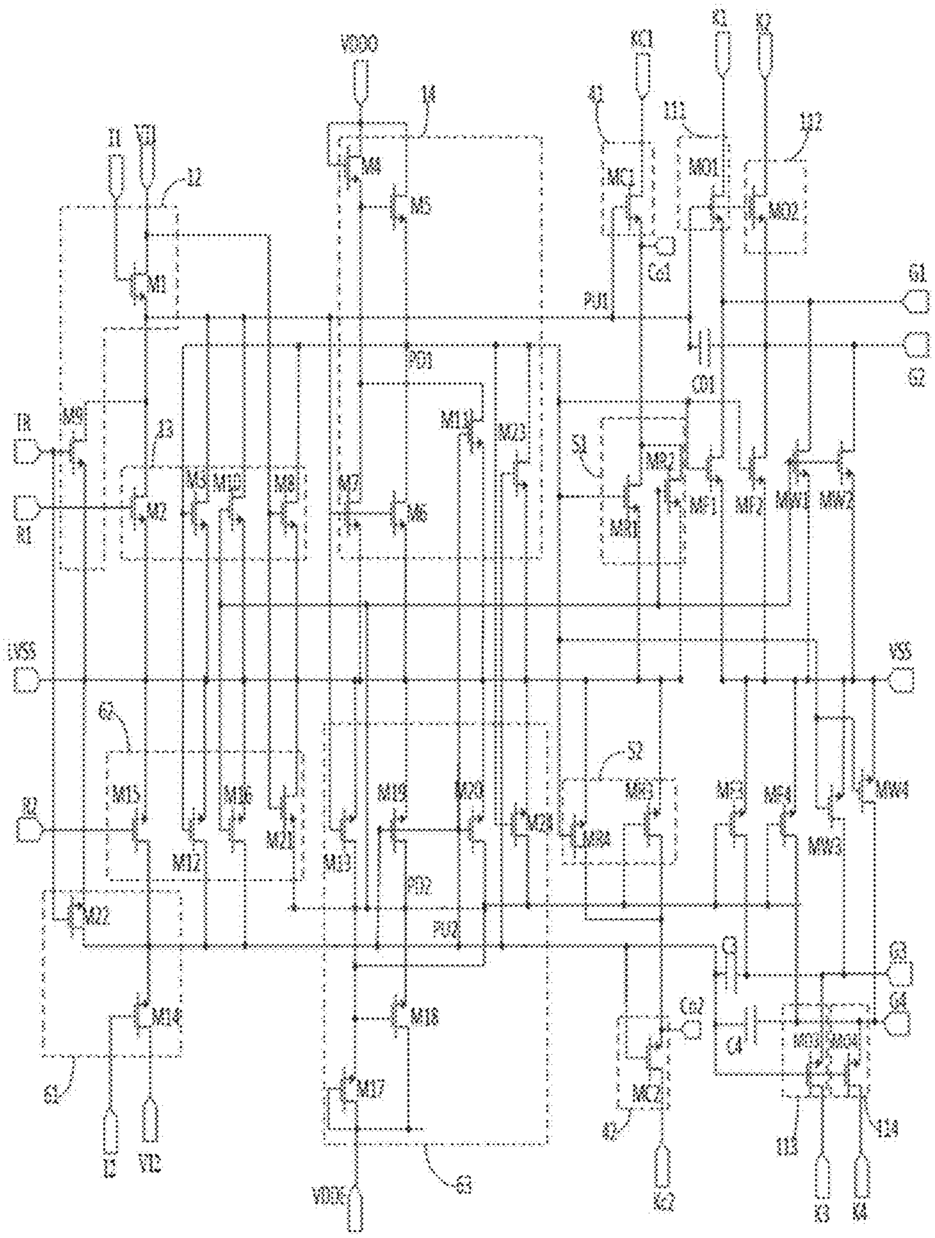
FIG. 22 is a circuit diagram of the driving circuit according to at least one embodiment of the present disclosure.

The difference between at least one embodiment of the driving circuit shown in FIG. 22 and at least one embodiment of the driving circuit shown in FIG. 21 is that the first pull-down node control sub-circuit 14 further includes a twenty-third transistor M23, so the second pull-down node control sub-circuit 63 also includes a twenty-fourth transistor M24;

The gate electrode of the twenty-third transistor M23 is electrically connected to the second pull-up node PU2, the source electrode of the twenty-third transistor M23 is electrically connected to the first pull-down node PD1, and the drain electrode of the twenty-third transistor M23 is electrically connected to the first low voltage terminal LVSS;

The gate electrode of the twenty-fourth transistor M24 is electrically connected to the first pull-up node PU1, the source electrode of the twenty-fourth transistor M24 is electrically connected to the second pull-down node PD2, and the drain electrode of the twenty-fourth transistor M24 is electrically connected to the first low voltage terminal LVSS.

At least one embodiment of the driving circuit shown in FIG. 22 is added with the twenty-third transistor M23 and the twenty-fourth transistor M24, and the second pull-up node PU2 is used to pull down the potential of the first pull-down node PD1, and the first pull-up node PU2 is used to pull down the potential of the second pull-down node PD2, which is used to reduce the noise of the first pull-down node PD1 after the first pull-up node PU1 is noise-reduced and the second pull-up node PU2 is not reset, and reduces the noise of the second pull-down node PD1 after the first pull-up node PU1 is lifted and the second pull-up node PU2 is not lifted.

Figure 23:
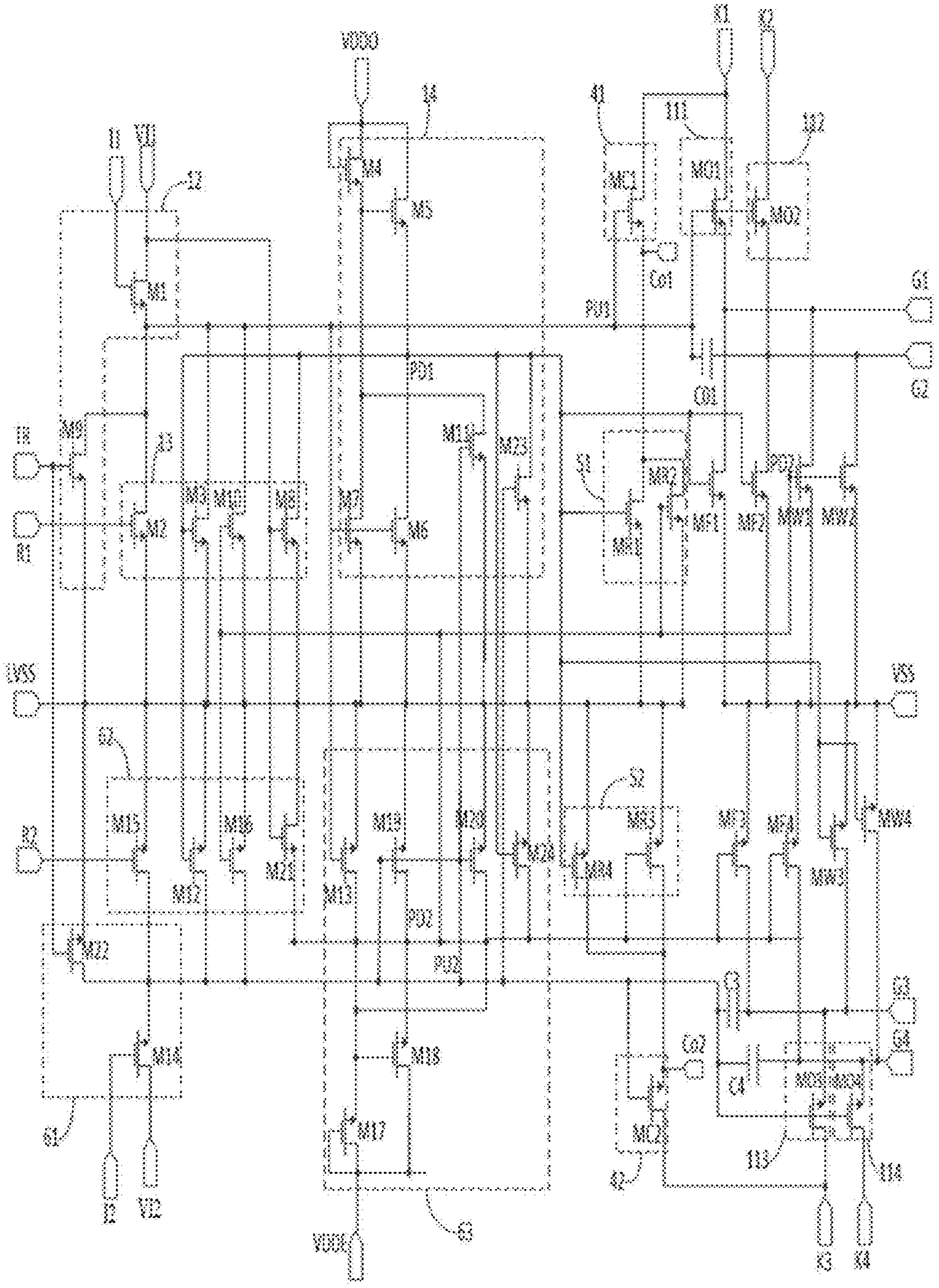
FIG. 23 is a circuit diagram of the driving circuit according to at least one embodiment of the present disclosure.

The difference between at least one embodiment of the driving circuit shown in FIG. 23 and at least one embodiment of the driving circuit shown in FIG. 22 is that: the source electrode of the first carry output transistor MC1 is electrically connected to the first clock signal terminal K1, the source electrode of the second carry output transistor MC2 is electrically connected to the third clock signal terminal K3.

Figure 24:
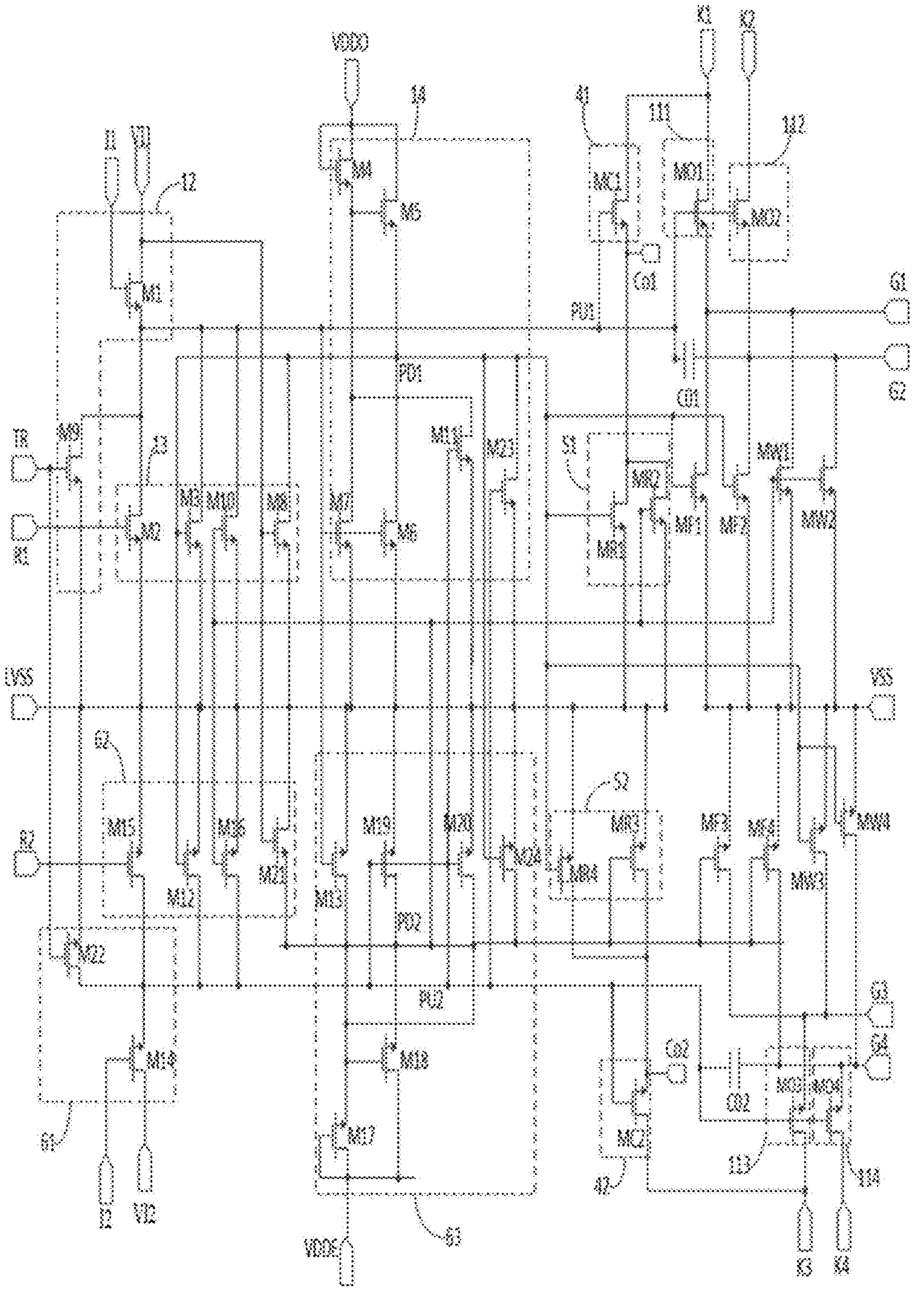
FIG. 24 is a circuit diagram of the driving circuit according to at least one embodiment of the present disclosure.

The difference between at least one embodiment of the driving circuit shown in FIG. 24 and at least one embodiment of the driving circuit shown in FIG. 23 is that there is no capacitor between the second pull-up node PU2 and the third driving signal output terminal G3;

A second output capacitor C02 is provided between the second pull-up node PU2 and the fourth driving signal output terminal G4.

In at least one embodiment of the present disclosure, the driving circuit may further include a second on-off control sub-circuit;

The second on-off control sub-circuit is electrically connected to the touch enable terminal, the second connection node and the second pull-up node, and is configured to control to connect or disconnect the second connection node and the second pull-up node under the control of the touch enable signal provided by the touch enable terminal.

Optionally, the second on-off control sub-circuit includes a second on-off control transistor;

A control electrode of the second on-off control transistor is electrically connected to the touch enable terminal, a first electrode of the second on-off control transistor is connected to the second pull-up node, and a second electrode of the second on-off control transistor is electrically connected to the second connection node.

Figure 25:
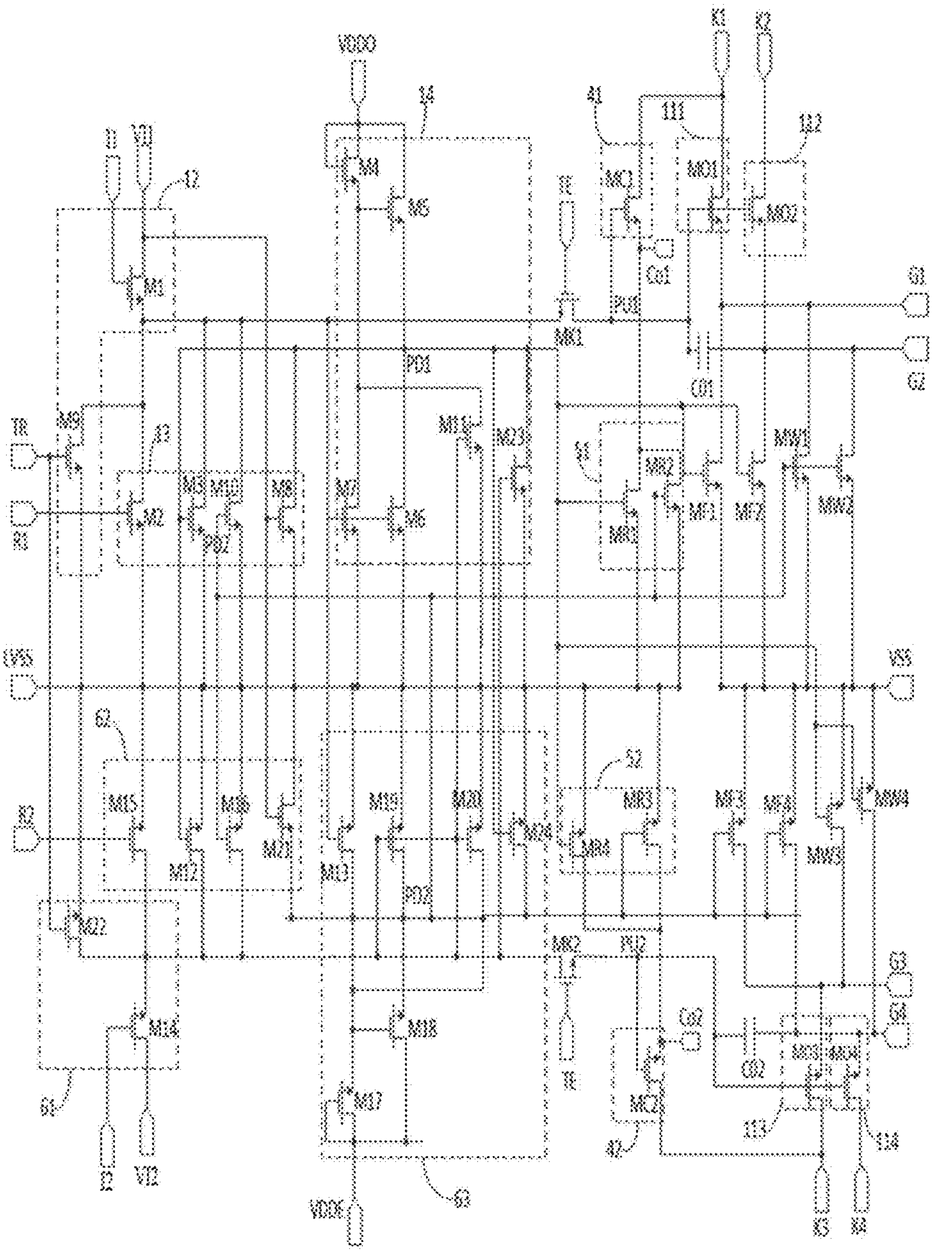
FIG. 25 is a circuit diagram of the driving circuit according to at least one embodiment of the present disclosure.

As shown in FIG. 25, on the basis of at least one embodiment of the driving circuit shown in FIG. 24, the driving circuit further includes a first on-off control sub-circuit and a second on-off control sub-circuit;

The first on-off sub-circuit includes a first on-off control transistor MK1;

The second on-off control sub-circuit includes a second on-off control transistor MK2;

The gate electrode of the first on-off control transistor MK1 is electrically connected to the touch enable terminal TE, the source electrode of the first on-off control transistor MK1 is connected to the first pull-up node PU1, and a second electrode of the first on-off control transistor MK1 is electrically connected to the first connection node;

The drain electrode of the first transistor M1 is electrically connected to the first connection node;

The gate electrode of the second on-off control transistor MK2 is electrically connected to the touch enable terminal TE, the source electrode of the second on-off control transistor MK2 is electrically connected to the second pull-up node PU2, and the drain electrode of the second on-off control transistor MK2 is electrically connected to the second connection node;

The second connection node is electrically connected to the drain electrode of the fourteenth transistor M14.

In at least one embodiment of the driving circuit shown in FIG. 25, a first on-off control transistor MK1 and a second on-off control transistor MK2 are added;

In the normal display phase, TE provides a high-level signal, and MK1 and MK2 are turned on to ensure that PU1 and PU2 are charged and maintained;

In the touch phase, TE provides a low-level signal, MK1 and MK2 are turned off, and the leakage current of PU1 and PU2 becomes smaller when the number of transistors is increased, and the voltage retention capacity of PU2 is stronger.

Figure 26:
FIG. 26 is a working timing diagram of the driving circuit shown in FIG. 25.

FIG. 26 is a working timing diagram of the driving circuit shown in FIG. 25.

The display driving circuit described in at least one embodiment of the present disclosure may further include a second output capacitor;

A first terminal of the second output capacitor is electrically connected to the second pull-up node, and a second terminal of the second output capacitor is electrically connected to one of the M driving signal output terminals.

Figure 27:
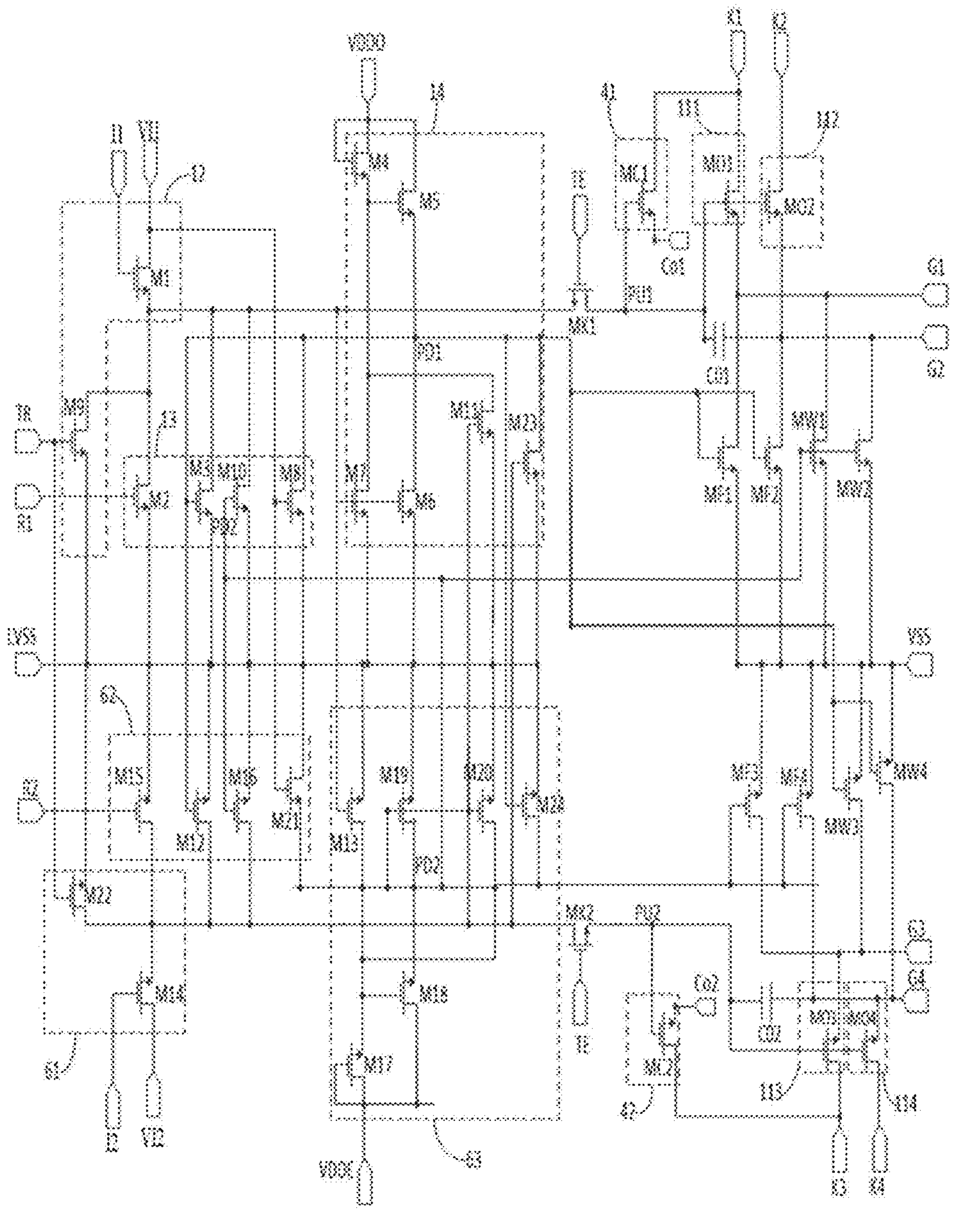
FIG. 27 is a circuit diagram of the driving circuit according to at least one embodiment of the present disclosure.

The difference between at least one embodiment of the driving circuit shown in FIG. 27 and at least one embodiment of the driving circuit shown in FIG. 25 is that MR1, MR2, MR3 and MR4 are not provided to reduce GOA layout, considering that the parasitic capacitance of the carry signal output terminal is small, the coupling pull noise is small, and the pull-down node is used for noise reduction of the pull-up node, which can eliminate the increasing of the potential of the pull-up node caused by the noise of the carry signal output terminal.

Figure 28:
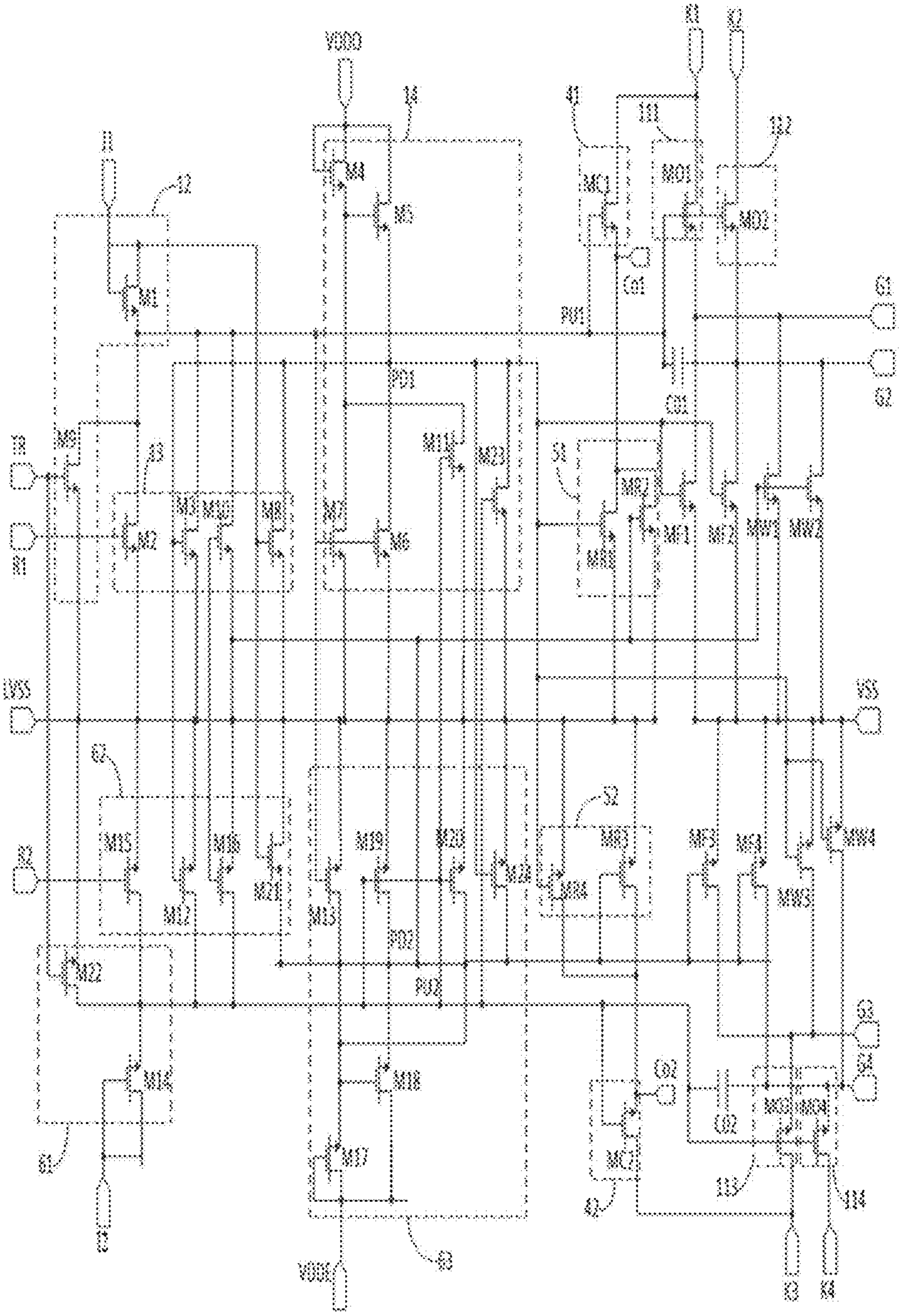
FIG. 28 is a circuit diagram of the driving circuit according to at least one embodiment of the present disclosure.

The difference between at least one embodiment of the driving circuit shown in FIG. 28 and at least one embodiment of the driving circuit shown in FIG. 24 is that: both the gate electrode of M1 and the source electrode of M1 are electrically connected to the first input terminal I1;

Both the gate electrode of M14 and the source electrode of M14 are electrically connected to the second input terminal I2.

In at least one embodiment of the present disclosure, since the four driving signal output terminals share a set of noise reduction units, the noise reduction load is relatively large, so it is necessary to increase the channel width of the fourth transistor M4, the channel width of the fifth transistor M5, the channel width of the seventeenth transistor M17 and the channel width of the eighteenth transistor M18, to improve the noise reduction capability.

In at least one embodiment of the present disclosure, the channel width of M4 and the channel width of M17 may be greater than 50 um, for example, the channel width of M4 and the channel width of M17 may be 60 um, 80 um, 90 um or 100 um, but not limited thereto;

The channel width of M5 and the channel width of M18 can be greater than 500 um, for example, the channel width of M5 and the channel width of M18 can be 550 um, 600 um, 700 um, 800 um or 900 um, but not limited thereto.

In at least one embodiment of the present disclosure, the channel width of M1 may be greater than 1500 um, for example, may be 1600 um, 1800 um, 2000 um or 2200 um;

The channel width of M2 may be greater than 800 um, for example, may be 800 um, 900 um, 1000 um or 1200 um;

The channel width of M3, the channel width of M10, the channel width of M12 and the channel width of M16 can be greater than 700 um, for example, can be 700 um, 800 um, 900 um, 1000 um or 1100 um;

The channel width of each output reset transistor and the channel width of each reset transistor may be greater than 700 um, for example, may be 700 um, 800 um, 900 um, 1000 um or 1100 um;

The channel width of each carry reset transistor may be greater than 320 um, for example, may be 340 um, 360 um or 400 um; but not limited to this.

Figure 29:
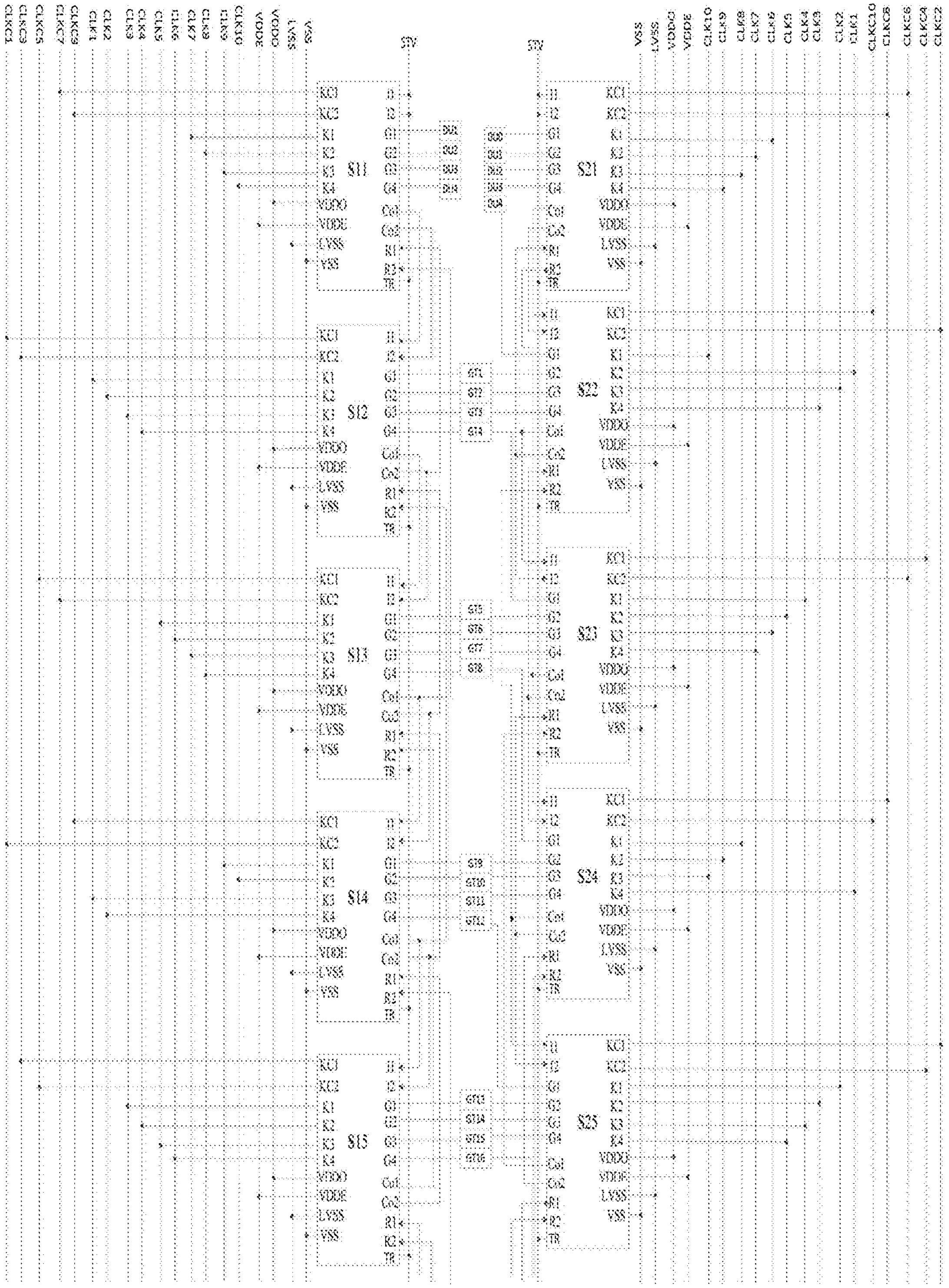
FIG. 29 is a structural diagram of a display driving circuit according to at least one embodiment of the present disclosure.

As shown in FIG. 29, the display driving circuit includes a first gate driving circuit and a second gate driving circuit;

The first gate driving circuit is arranged on the left side of the display panel, and the second gate driving circuit is arranged on the right side of the display panel;

The first gate driving circuit includes a plurality of cascaded first driving circuits, and the second gate driving circuit includes a plurality of cascaded second driving circuits;

The structure of the first driving circuit may be the same as that of the second driving circuit;

In FIG. 29, the one labeled S11 is the first stage of first driving circuit, the one labeled S12 is the second stage of the first driving circuit, the one labeled S13 is the third stage of first driving circuit, and the one labeled S14 is the fourth stage of first driving circuit, the one labeled S15 is the fifth stage of first driving circuit;

The one labeled S21 is the first stage of second driving circuit, the one labeled S22 is the second stage of second driving circuit, the one labeled S23 is the third stage of second driving circuit, and the one labeled S24 is the fourth stage of second driving circuit, the one labeled S25 is the fifth stage of second driving circuit;

The first driving signal output terminal of S12 is electrically connected to the second driving signal output terminal of S22; the first driving signal output terminal of S12 is electrically connected to the first row of gate line GT1;

The second driving signal output terminal of S12 is electrically connected to the third driving signal output terminal of S22; the second driving signal output terminal of S12 is electrically connected to the second row of gate line GT2;

The third driving signal output terminal of S12 is electrically connected to the fourth driving signal output terminal of S22; the third driving signal output terminal of S12 is electrically connected to the third row of gate line GT3;

The fourth driving signal output terminal of S12 is electrically connected to the first driving signal output terminal of S23; the fourth driving signal output terminal of S12 is electrically connected to the fourth row of gate line GT4;

The first driving signal output terminal of S13 is electrically connected to the second driving signal output terminal of S23; the first driving signal output terminal of S13 is electrically connected to the fifth row of gate line GT5;

The second driving signal output terminal of S13 is electrically connected to the third driving signal output terminal of S23; the second driving signal output terminal of S13 is electrically connected to the sixth row of gate line GT6;

The third driving signal output terminal of S13 is electrically connected to the fourth driving signal output terminal of S23; the third driving signal output terminal of S13 is electrically connected to the seventh row of gate line GT7;

The fourth driving signal output terminal of S13 is electrically connected to the first driving signal output terminal of S24; the fourth driving signal output terminal of S13 is electrically connected to the eighth row of gate line GT8;

The first driving signal output terminal of S14 is electrically connected to the second driving signal output terminal of S24; the first driving signal output terminal of S14 is electrically connected to the ninth row of gate line GT9;

The second driving signal output terminal of S14 is electrically connected to the third driving signal output terminal of S24; the second driving signal output terminal of S14 is electrically connected to the tenth row of gate line GT10;

The third driving signal output terminal of S14 is electrically connected to the fourth driving signal output terminal of S24; the third driving signal output terminal of S14 is electrically connected to the eleventh row of gate line GT11;

The fourth driving signal output terminal of S14 is electrically connected to the first driving signal output terminal of S25; the fourth driving signal output terminal of S14 is electrically connected to the twelfth row of gate line GT12;

The first driving signal output terminal of S15 is electrically connected to the second driving signal output terminal of S25; the first driving signal output terminal of S15 is electrically connected to the thirteenth row of gate line GT13;

The second driving signal output terminal of S15 is electrically connected to the third driving signal output terminal of S25; the second driving signal output terminal of S15 is electrically connected to the fourteenth row of gate line GT14;

The third driving signal output terminal of S15 is electrically connected to the fourth driving signal output terminal of S25; the third driving signal output terminal of S15 is electrically connected to the fifteenth row of gate lines GT15;

The fourth driving signal output terminal of S15 is electrically connected to the twelfth row of gate line GT12;

The first driving signal output terminal of S11 is electrically connected to the first row of dummy pixel circuit DU1, the second driving signal output terminal of S11 is electrically connected to the second row of dummy pixel circuit DU2, and the third driving signal output terminal of S11 is connected to the third row of dummy pixel circuit DU3, and the fourth driving signal output terminal of S11 is electrically connected to the fourth row of dummy pixel circuit DU4;

The first driving signal output terminal of S21 is electrically connected to the first row of dummy pixel circuit DU0;

The second driving signal output terminal of S21 is electrically connected to the first row of dummy pixel circuit DU1, the third driving signal output terminal of S21 is electrically connected to the second row of dummy pixel circuit DU2, and the fourth driving signal output terminal of S21 is connected to the third row of dummy pixel circuit DU3, and the first driving signal output terminal of S22 is electrically connected to the fourth row of dummy pixel circuit DU4;

In FIG. 29, the one labeled CLK1 is the first clock signal, the one labeled CLK2 is the second clock signal, the one labeled CLK3 is the third clock signal, the one labeled CLK4 is the fourth clock signal, and the one labeled CLK5 is the fifth clock signal, the one labeled CLK6 is the sixth clock signal, the one labeled CLK7 is the seventh clock signal, the one labeled CLK8 is the eighth clock signal, the one labeled CLK9 is the ninth clock signal, and the one labeled CLK10 is tenth clock signal;

The one labeled CLKC1 is the first carry clock signal, the one labeled CLKC2 is the second carry clock signal, the one labeled CLKC3 is the third carry clock signal, the one labeled CLKC4 is the fourth carry clock signal, and the one labeled CLKC5 is the fifth carry clock signal, the one labeled CLKC6 is the sixth carry clock signal, the one labeled CLKC7 is the seventh carry clock signal, the one labeled CLKC8 is the eighth carry clock signal, and the one labeled CLKC9 is the ninth carry clock signal, the one labeled CLKC10 is the tenth carry clock signal, The one labeled STV is the start signal terminal.

In at least one embodiment shown in FIG. 29, in the first driving circuit and the second driving circuit, the first electrode of the first carry output transistor is electrically connected to the first carry clock signal terminal, and the first electrode of the second carry output transistor is electrically connected to the second carry clock signal terminal.

When the display driving circuit shown in FIG. 29 of at least one embodiment of the present disclosure is in operation, the odd-numbered stage of driving signal output terminal and the even-numbered stage of driving signal output terminal output separately, and has the function of frequency multiplication display (HSR). Refer to FIG. 29 and FIG. 22, the circuit of the present disclosure may realize any row or at least part of the row display function, and the display power consumption can be reduced compared with the display of the entire screen. For example, for any row display or at least part of the row display, continuous carry clock signals are input to the carry clock signal terminal to ensures that the cascading relationship is normal, and for the first clock signal terminal K1, the second clock signal terminal K2 connected to G1 and G2, or the clock signals of other rows, only a valid clock signal needs to be given to the corresponding display row, for example, when displaying the entire screen, FIG. 30 shows the timing of the clock signal, and when displaying any row or part of display or only displaying odd-numbered rows, or only displaying even-numbered rows, when a corresponding row does not need to be displayed, the clock signal sets the valid level setting to an invalid level.

In the display driving circuit shown in FIG. 29 of at least one embodiment of the present disclosure, the carry clock signal and the clock signal for output are independent of each other, so that in the case of normal cascading, only part of the clock signal for output can be provided to control part of the driving signal output terminals of the driving circuit to output corresponding driving signals.

Figure 30:
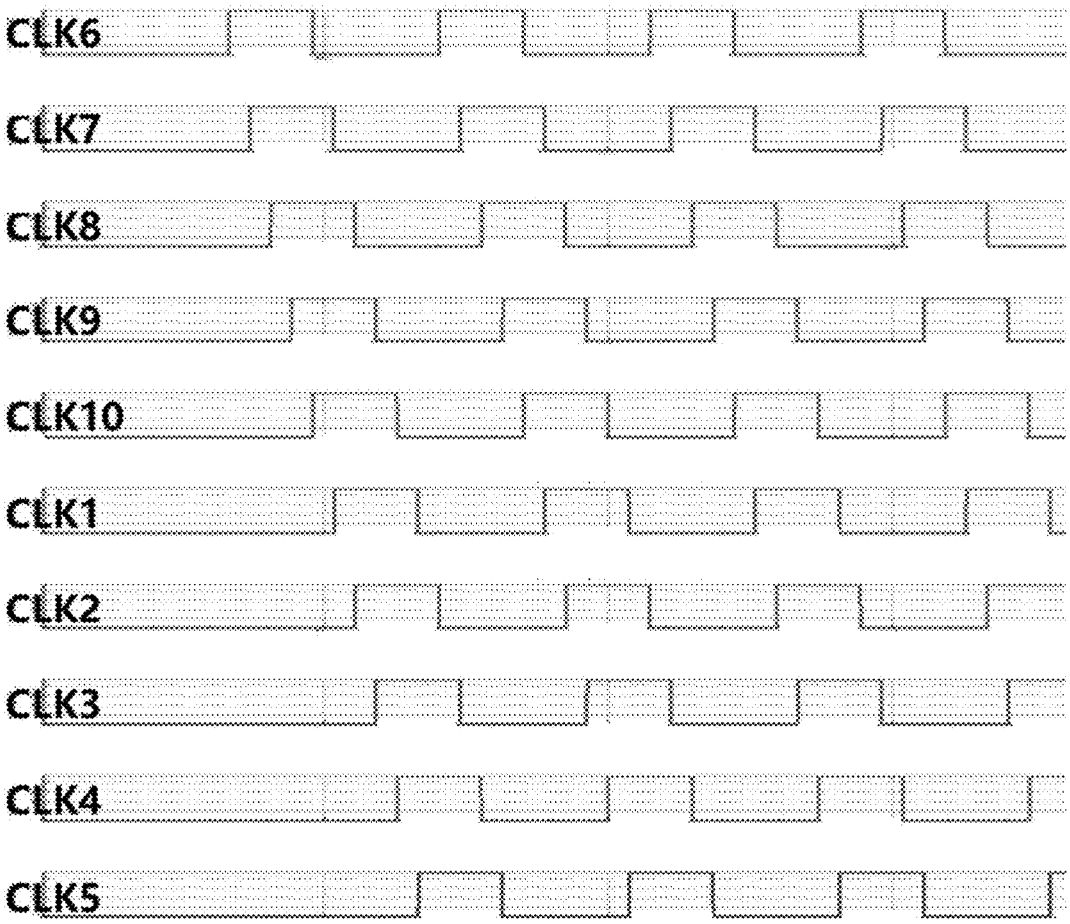
FIG. 30 is a waveform diagram of ten clock signals.

FIG. 30 shows waveform diagrams of the first clock signal CLK1, the second clock signal CLK2, the third clock signal CLK3, the fourth clock signal CLK4, the fifth clock signal CLK5, the sixth clock signal CLK6, the seventh clock signal CLK7, the eighth clock signal CLK8, the ninth clock signal CLK9 and the tenth clock signal CLK10.

Figure 31:
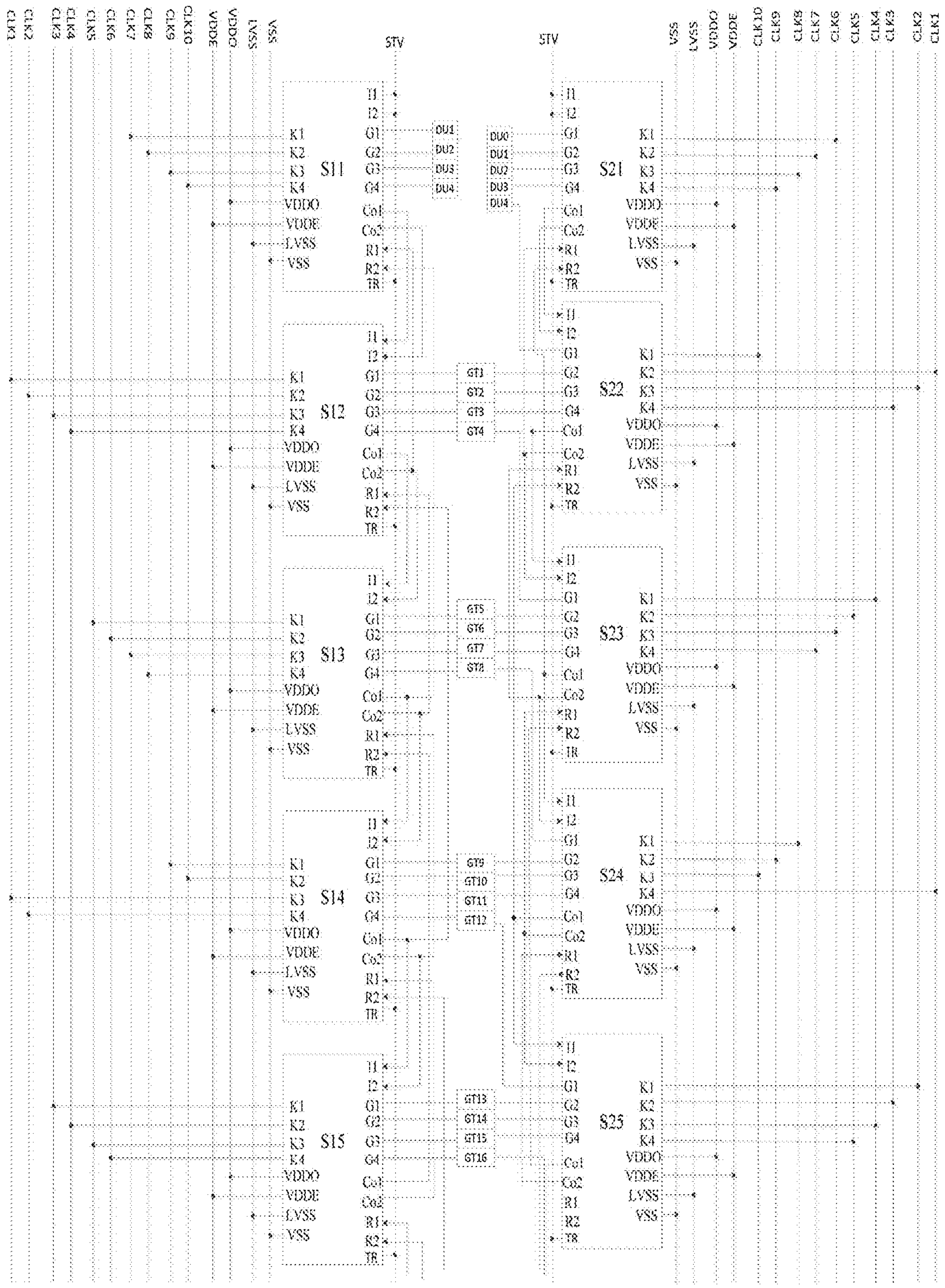
FIG. 31 is a structural diagram of a display driving circuit according to at least one embodiment of the present disclosure.

As shown in FIG. 31, the display driving circuit includes a first gate driving circuit and a second gate driving circuit;

The first gate driving circuit is arranged on the left side of the display panel, and the second gate driving circuit is arranged on the right side of the display panel;

The first gate driving circuit includes a plurality of cascaded first driving circuits, and the second gate driving circuit includes a plurality of cascaded second driving circuits;

The structure of the first driving circuit may be the same as that of the second driving circuit;

In FIG. 31, the one labeled S11 is the first stage of first driving circuit, the one labeled S12 is the second stage of first driving circuit, the one labeled S13 is the third stage of first driving circuit, and the one labeled S14 is the fourth stage of first driving circuit and the one labeled S15 is the fifth stage of first driving circuit;

The one labeled S21 is the first stage of second driving circuit, the one labeled S22 is the second stage of second driving circuit, the one labeled S23 is the third stage of second driving circuit, and the one labeled S24 is the fourth stage of second driving circuit, the one labeled S25 is the fifth stage of second driving circuit;

The first driving signal output terminal of S12 is electrically connected to the second driving signal output terminal of S22; the first driving signal output terminal of S12 is electrically connected to the first row of gate line GT1;

The second driving signal output terminal of S12 is electrically connected to the third driving signal output terminal of S22; the second driving signal output terminal of S12 is electrically connected to the second row of gate line GT2;

The third driving signal output terminal of S12 is electrically connected to the fourth driving signal output terminal of S22; the third driving signal output terminal of S12 is electrically connected to the third row of gate line GT3;

The fourth driving signal output terminal of S12 is electrically connected to the first driving signal output terminal of S23; the fourth driving signal output terminal of S12 is electrically connected to the fourth row of gate line GT4;

The first driving signal output terminal of S13 is electrically connected to the second driving signal output terminal of S23; the first driving signal output terminal of S13 is electrically connected to the fifth row of gate line GT5;

The second driving signal output terminal of S13 is electrically connected to the third driving signal output terminal of S23; the second driving signal output terminal of S13 is electrically connected to the sixth row of gate line GT6;

The third driving signal output terminal of S13 is electrically connected to the fourth driving signal output terminal of S23; the third driving signal output terminal of S13 is electrically connected to the seventh row of gate line GT7;

The fourth driving signal output terminal of S13 is electrically connected to the first driving signal output terminal of S24; the fourth driving signal output terminal of S13 is electrically connected to the eighth row of gate line GT8;

The first driving signal output terminal of S14 is electrically connected to the second driving signal output terminal of S24; the first driving signal output terminal of S14 is electrically connected to the ninth row of gate line GT9;

The second driving signal output terminal of S14 is electrically connected to the third driving signal output terminal of S24; the second driving signal output terminal of S14 is electrically connected to the tenth row of gate line GT10;

The third driving signal output terminal of S14 is electrically connected to the fourth driving signal output terminal of S24; the third driving signal output terminal of S14 is electrically connected to the eleventh row of gate line GT11;

The fourth driving signal output terminal of S14 is electrically connected to the first driving signal output terminal of S25; the fourth driving signal output terminal of S14 is electrically connected to the twelfth row of gate line GT12;

The first driving signal output terminal of S15 is electrically connected to the second driving signal output terminal of S25; the first driving signal output terminal of S15 is electrically connected to the thirteenth row of gate lines GT13;

The second driving signal output terminal of S15 is electrically connected to the third driving signal output terminal of S25; the second driving signal output terminal of S15 is electrically connected to the fourteenth row of gate line GT14;

The third driving signal output terminal of S15 is electrically connected to the fourth driving signal output terminal of S25; the third driving signal output terminal of S15 is electrically connected to the fifteenth row of gate lines GT15;

The fourth driving signal output terminal of S15 is electrically connected to the twelfth row of gate line GT12;

The first driving signal output terminal of S11 is electrically connected to the first row of dummy pixel circuit DU1, the second driving signal output terminal of S11 is electrically connected to the second row of dummy pixel circuit DU2, and the third driving signal output terminal of S11 is connected to the third row of dummy pixel circuit DU3, and the fourth driving signal output terminal of S11 is electrically connected to the fourth row of dummy pixel circuit DU4;

The first driving signal output terminal of S21 is electrically connected to the first row of dummy pixel circuit DU0;

The second driving signal output terminal of S21 is electrically connected to the first row of dummy pixel circuit DU1, the third driving signal output terminal of S21 is electrically connected to the second row of dummy pixel circuit DU2, and the fourth driving signal output terminal of S21 is connected to the third row of dummy pixel circuit DU3, and the first driving signal output terminal of S22 is electrically connected to the fourth row of dummy pixel circuit DU4;

In FIG. 31, the one labeled CLK1 is the first clock signal, the one labeled CLK2 is the second clock signal, the one labeled CLK3 is the third clock signal, the one labeled CLK4 is the fourth clock signal, and the one labeled CLK5 is the fifth clock signal, the one labeled CLK6 is the sixth clock signal, the one labeled CLK7 is the seventh clock signal, the one labeled CLK8 is the eighth clock signal, the one labeled CLK9 is the ninth clock signal, and the one labeled CLK10 is tenth clock signal;

The one labeled STV is the start signal terminal.

In at least one embodiment shown in FIG. 31, in the first driving circuit and the second driving circuit, the first electrode of the first carry output transistor is connected to the same clock signal as the first electrode of the first output transistor. The first electrode of the second carry output transistor and the first electrode of the second output transistor are connected to the same clock signal, so as to reduce the number of clock signal lines and facilitate the realization of a narrow frame.

Figure 32:
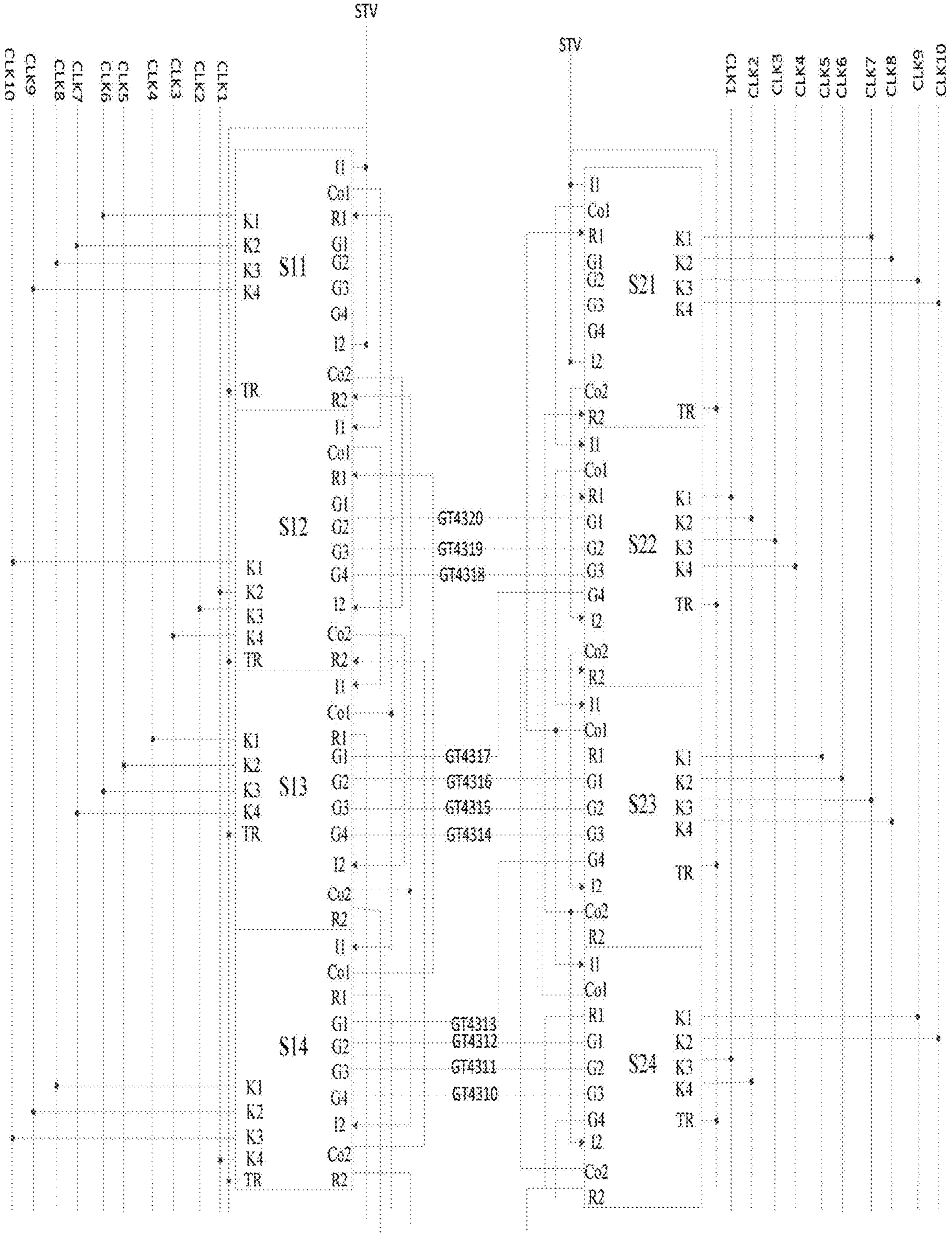
FIG. 32 is a structural diagram of a part of a display driving circuit according to at least one embodiment of the present disclosure.
Figure 33:
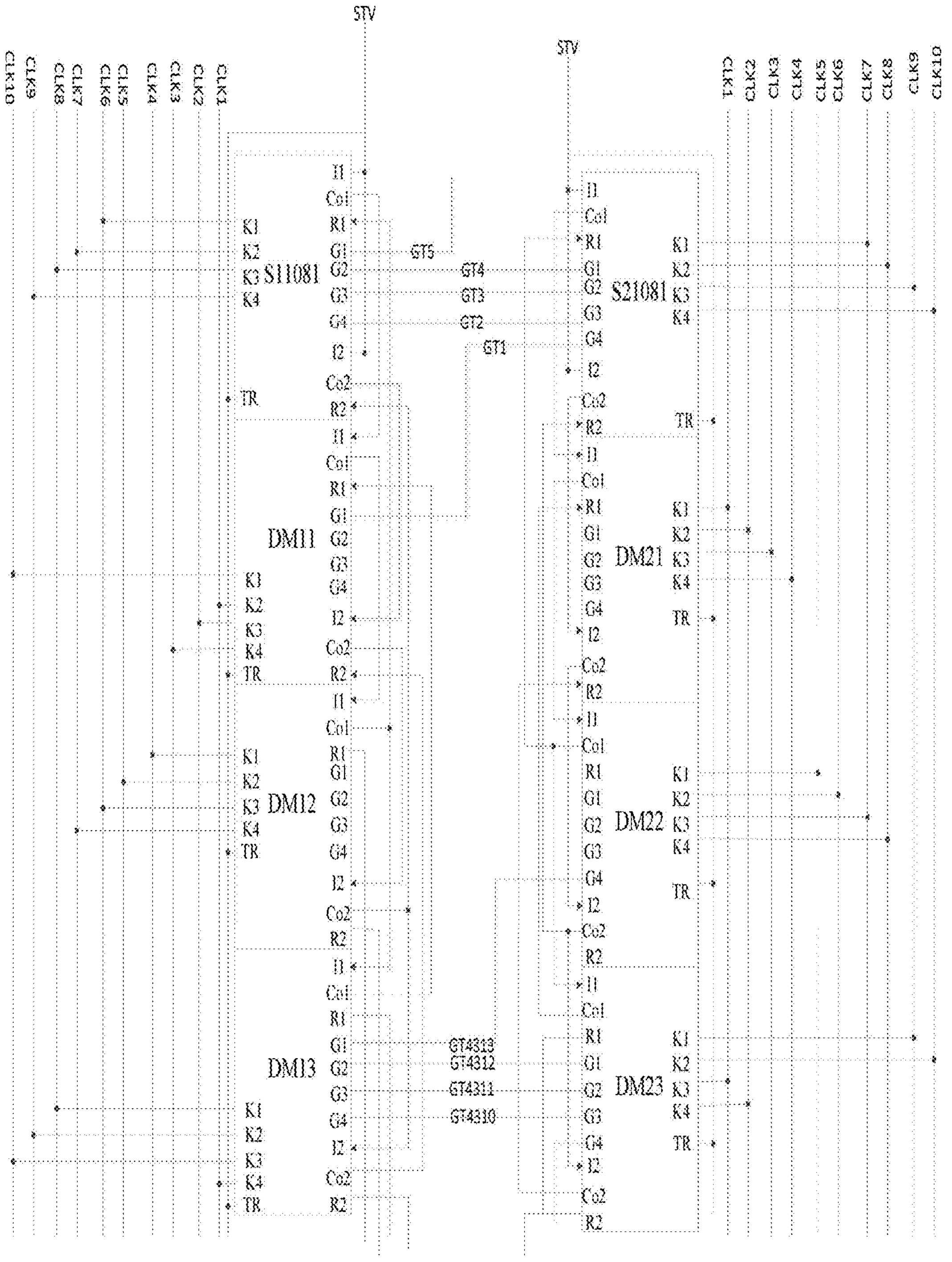
FIG. 33 is a structural diagram of a part of a display driving circuit according to at least one embodiment of the present disclosure.

As shown in FIG. 32 and FIG. 33, the display device includes 4320 rows of gate lines as an example for illustration, the first driving circuit included in the first gate driving circuit and the second driving circuit included in the second gate driving circuit are in a cascade connection in a staggered manner.

In FIG. 32, the one labeled S11 is the first stage of first driving circuit included in the first gate driving circuit, and the one labeled S12 is the second stage of first driving circuit included in the first gate driving circuit, labeled S13 is the third stage of first driving circuit included in the first gate driving circuit, and the one labeled S14 is the fourth stage of first driving circuit included in the first gate driving circuit;

The one labeled S21 is the first stage of second driving circuit included in the second gate driving circuit, the one labeled S22 is the second stage of second driving circuit included in the second gate driving circuit, and the one labeled S23 is the third stage of second driving circuit included in the second gate driving circuit, and the one labeled S24 is the fourth stage of second driving circuit included in the second gate driving circuit;

In FIG. 32 and FIG. 33, the one labeled STV is the start signal terminal, the one labeled CLK1 is the first clock signal, the one labeled CLK2 is the second clock signal, the one labeled CLK3 is the third clock signal, and the one labeled CLK4 is the fourth clock signal, the one labeled CLK5 is the fifth clock signal, the one labeled CLK6 is the sixth clock signal, the one labeled CLK7 is the seventh clock signal, the one labeled CLK8 is the eighth clock signal, the one labeled CLK9 is the ninth clock signal, and the one labeled CLK10 is the tenth clock signal;

As shown in FIG. 32, the second driving signal output terminal of S12 is electrically connected to the first driving signal output terminal of S22, and both the second driving signal output terminal of S12 and the first driving signal output terminal of S22 are electrically connected to the $4320^{th}$ row of gate line GT4320;

The third driving signal output terminal of S12 is electrically connected to the second driving signal output terminal of S22, and the third driving signal output terminal of S12 and the second driving signal output terminal of S22 are both electrically connected to the 4319th row of gate line GT4319;

The fourth driving signal output terminal of S12 is electrically connected to the third driving signal output terminal of S22, and both the fourth driving signal output terminal of S12 and the third driving signal output terminal of S22 are electrically connected to the 4318th row of gate line GT4318;

The first driving signal output terminal of S13 is electrically connected to the fourth driving signal output terminal of S22, and the first driving signal output terminal of S13 and the fourth driving signal output terminal of S22 are both electrically connected to the 4317th row of gate line GT4317;

The second driving signal output terminal of S13 is electrically connected to the first driving signal output terminal of S23, and both the second driving signal output terminal of S13 and the first driving signal output terminal of S23 are electrically connected to the 4316th gate line GT4316;

The third driving signal output terminal of S13 is electrically connected to the second driving signal output terminal of S23, and the third driving signal output terminal of S13 and the second driving signal output terminal of S23 are both electrically connected to the 4315th row of gate line GT4315;

The fourth driving signal output terminal of S13 is electrically connected to the third driving signal output terminal of S23, and the fourth driving signal output terminal of S13 and the third driving signal output terminal of S23 are both electrically connected to the 4314th row of gate line GT4314;

The first driving signal output terminal of S14 is electrically connected to the fourth driving signal output terminal of S23, and the first driving signal output terminal of S14 and the fourth driving signal output terminal of S23 are both electrically connected to the 4313th row of gate line GT4313;

The second driving signal output terminal of S14 is electrically connected to the first driving signal output terminal of S24, and both the second driving signal output terminal of S14 and the first driving signal output terminal of S24 are electrically connected to the 4312th row of gate line GT4312;

The third driving signal output terminal of S14 is electrically connected to the second driving signal output terminal of S24, and the third driving signal output terminal of S14 and the second driving signal output terminal of S24 are both electrically connected to the 4311th row of gate line GT4311;

The fourth driving signal output terminal of S14 is electrically connected to the third driving signal output terminal of S24, and both the fourth driving signal output terminal of S14 and the third driving signal output terminal of S24 are electrically connected to the 4310th row of gate line GT4310;

In FIG. 33, the one labeled S11081 is the 1081st stage of first driving circuit, and the one labeled S21081 is the 1081st stage of second driving circuit;

The one marked with DM11 is the first stage of first dummy driving circuit, the one marked with DM12 is the second stage of first dummy driving circuit, and the one marked with DM13 is the third stage of first dummy driving circuit The one labeled DM21 is the first stage of second dummy driving circuit, the one labeled DM22 is the second stage of second dummy driving circuit, and the one labeled DM23 is the third stage of second dummy driving circuit;

The first driving signal output terminal of S11081 is electrically connected to the fifth row of gate line GT5;

The second driving signal output terminal of S11081 is electrically connected to the first driving signal output terminal of S21081; the second driving signal output terminal of S11081 is electrically connected to the fourth row of gate line GT4;

The third driving signal output terminal of S11081 is electrically connected to the second driving signal output terminal of S21081; the third driving signal output terminal of S11081 is electrically connected to the third row of gate line GT3;

The fourth driving signal output terminal of S11081 is electrically connected to the first driving signal output terminal of S21081; the fourth driving signal output terminal of S11081 is electrically connected to the second row of gate line GT2;

The first driving signal output terminal of DM11 is electrically connected to the first row of gate line GT1.

The display device described in the embodiment of the present disclosure includes the above-mentioned display driving circuit.

The display device described in at least one embodiment of the present disclosure may further include a plurality of rows of gate lines, a plurality of columns of data lines, and a plurality of rows and a plurality of columns of pixel circuits;

The pixel circuit includes a display control transistor and a pixel electrode;

A gate electrode of the display control transistor is electrically connected to the gate line, a first electrode of the display control transistor is electrically connected to the data line, and a second electrode of the display control transistor is electrically connected to the pixel electrode;

The pixel electrode has a plurality of slits; an angle between slit directions of two pixel electrodes included in a same pixel electrode group is greater than 90 degrees and less than 180 degrees;

The pixel electrode group is a pixel electrode group arranged in a display area formed by adjacent rows of gate lines and adjacent columns of data lines.

In at least one embodiment of the present disclosure, the domains of the two pixel electrodes included in the same pixel electrode group are opposite, which can improve the color shift.

In at least one embodiment of the present disclosure, the two rows of gate lines between two adjacent rows of pixel circuits are respectively electrically connected to the two driving signal output terminals included in the driving circuit, or two rows of gate lines arranged on upper and lower sides of a row of pixel circuits are respectively electrically connected to the two driving signal output terminals included in the driving circuit.

Figure 34:
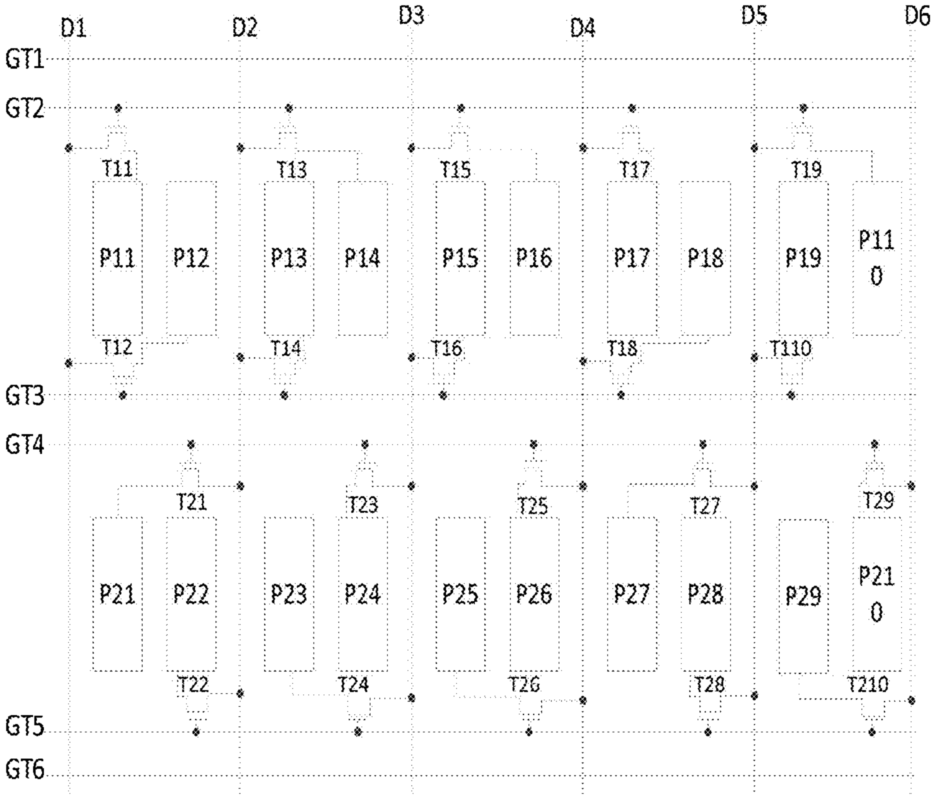
FIG. 34 is a structural diagram of a display substrate in a display device according to at least one embodiment of the present disclosure.

As shown in FIG. 34, the display device according to at least one embodiment of the present disclosure includes a first row of gate lines GT1, a second row of gate lines GT2, a third row of gate lines GT3, a fourth row of gate lines GT4, a fifth row of gate lines. GT5, a sixth row of gate line GT6, a first column of data line D1, a second column of data line D2, a third column of data line D3, a fourth column of data line D4, a fifth column of data line D5, a sixth column of data line D6, the first row and the first column of pixel circuit, the first row and the second column of the pixel circuit, the first row and the third column of the pixel circuit, the first row and the fourth column of the pixel circuit, the first row and the fifth column of the pixel circuit, the first row and the sixth column of pixel circuit, the first row and the seventh column of the pixel circuit, the first row and the eighth column of the pixel circuit, the first row and the ninth column of the pixel circuit, the first row and the tenth column of the pixel circuit, the first row and the eleventh column of the pixel circuit, the first row and the twelfth column of the pixel circuit, the second row and the first column of pixel circuit, the second row and the second column of the pixel circuit, the second row and the third column of the pixel circuit, the second row and the fourth column of the pixel circuit, the second row and the fifth column of the pixel circuit, the second row and the sixth column of pixel circuit, the second row and the seventh column of the pixel circuit, the second row and the eighth column of the pixel circuit, the second row and the ninth column of the pixel circuit, the second row and the tenth column of the pixel circuit;

The first row and the first column of pixel circuit includes in the first row and the first column of pixel electrode P11 and the first row and the first column of display control transistor T11;

The gate electrode of T11 is electrically connected to GT2, the source electrode of T11 is electrically connected to D1, and the drain electrode of T11 is electrically connected to P11;

The first row and the second column of pixel circuit includes the first row and the second column of pixel electrode P12 and the first row and the second column of display control transistor T12;

The gate electrode of T12 is electrically connected to GT3, the source electrode of T12 is electrically connected to D1, and the drain electrode of T12 is electrically connected to P12;

The first row and the third column of pixel circuit includes the first row and the third column of pixel electrode P13 and the first row and the third column of display control transistor T13;

The gate electrode of T13 is electrically connected to GT2, the source electrode of T13 is electrically connected to D2, and the drain electrode of T13 is electrically connected to P13;

The first row and the fourth column of pixel circuit includes the first row and the fourth column of pixel electrode P14 and the first row and the fourth column of display control transistor T14;

The gate electrode of T14 is electrically connected to GT3, the source electrode of T14 is electrically connected to D2, and the drain electrode of T14 is electrically connected to P14;

The first row and the fifth column of pixel circuit includes the first row and the fifth column of pixel electrode P15 and the first row and the fifth column of display control transistor T15;

The gate electrode of T15 is electrically connected to GT2, the source electrode of T15 is electrically connected to D3, and the drain electrode of T15 is electrically connected to P15;

The first row and sixth column of pixel circuit includes the first row and sixth column of pixel electrode P16 and the first row and the sixth column of display control transistor T16;

The gate electrode of T16 is electrically connected to GT3, the source electrode of T16 is electrically connected to D3, and the drain electrode of T16 is electrically connected to P16;

The first row and the seventh column of pixel circuit includes the first row and the seventh column of pixel electrode P17 and the first row and the seventh column of display control transistor T17;

The gate electrode of T17 is electrically connected to GT2, the source electrode of T17 is electrically connected to D4, and the drain electrode of T17 is electrically connected to P17;

The first row and eighth column of pixel circuit includes the first row and eighth column of pixel electrode P18 and the first row and eighth column of display control transistor T18;

The gate electrode of T18 is electrically connected to GT3, the source electrode of T18 is electrically connected to D4, and the drain electrode of T18 is electrically connected to P18;

The first row and ninth column of pixel circuit includes the first row and ninth column of pixel electrode P19 and the first row and ninth column of display control transistor T19;

The gate electrode of T19 is electrically connected to GT2, the source electrode of T19 is electrically connected to D5, and the drain electrode of T19 is electrically connected to P19;

The first row and tenth column of pixel circuit includes the first row and tenth column of pixel electrode P110 and the first row and tenth column of display control transistor T110;

The gate electrode of T110 is electrically connected to GT3, the source electrode of T110 is electrically connected to D5, and the drain electrode of T110 is electrically connected to P110;

The second row and the first column of pixel circuit includes the second row and the first column of pixel electrode P21 and the second row and the first column of display control transistor T21;

The gate electrode of T21 is electrically connected to GT4, the source electrode of T21 is electrically connected to D2, and the drain electrode of T21 is electrically connected to P21;

The second row and the second column of pixel circuit includes the second row and second column of pixel electrode P22 and the second row and second column of display control transistor T22;

The gate electrode of T22 is electrically connected to GT5, the source electrode of T22 is electrically connected to D2, and the drain electrode of T22 is electrically connected to P22;

The second row and the third column of pixel circuit includes the second row and the third column of pixel electrode P23 and the second row and the third column of display control transistor T23;

The gate electrode of T23 is electrically connected to GT4, the source electrode of T23 is electrically connected to D3, and the drain electrode of T23 is electrically connected to P23;

The second row and the fourth column of pixel circuit includes the second row and the fourth column of pixel electrode P24 and the second row and the fourth column of display control transistor T24;

The gate electrode of T24 is electrically connected to GT5, the source electrode of T24 is electrically connected to D3, and the drain electrode of T24 is electrically connected to P24;

The second row and the fifth column of pixel circuit includes the second row and the fifth column of pixel electrode P25 and the second row and the fifth column of display control transistor T25;

The gate electrode of T25 is electrically connected to GT4, the source electrode of T25 is electrically connected to D4, and the drain electrode of T25 is electrically connected to P25;

The second row and the sixth column of pixel circuit includes the second row and the sixth column of pixel electrode P26 and the second row and the sixth column of display control transistor T26;

The gate electrode of T26 is electrically connected to GT5, the source electrode of T26 is electrically connected to D4, and the drain electrode of T26 is electrically connected to P26;

The second row and the seventh column of pixel circuit includes the second row and the seventh column of pixel electrode P27 and the second row and the seventh column of display control transistor T27;

The gate electrode of T27 is electrically connected to GT4, the source electrode of T27 is electrically connected to D5, and the drain electrode of T27 is electrically connected to P27;

The second row and eighth column of pixel circuit includes the second row and eighth column of pixel electrode P28 and the second row and eighth column of display control transistor T28;

The gate electrode of T28 is electrically connected to GT5, the source electrode of T28 is electrically connected to D5, and the drain electrode of T28 is electrically connected to P28;

The second row and the ninth column of pixel circuit includes the second row and the ninth column of pixel electrode P29 and the second row and the ninth column of display control transistor T29;

The gate electrode of T29 is electrically connected to GT4, the source electrode of T29 is electrically connected to D6, and the drain electrode of T29 is electrically connected to P29;

The second row and tenth column of pixel circuit includes the second row and tenth column of pixel electrode P210 and the second row and tenth column of display control transistor T210;

The gate electrode of T210 is electrically connected to GT5, the source electrode of T210 is electrically connected to D6, and the drain electrode of T210 is electrically connected to P210.

In at least one embodiment of the present disclosure, the first driving signal output terminal G1 included in the driving circuit may be electrically connected to GT1 in FIG. 34, and the second driving signal output terminal G2 included in the driving circuit may be connected to GT2 in FIG. 34, the third driving signal output terminal G3 included in the driving circuit can be electrically connected to GT3 in FIG. 34, and the fourth driving signal output terminal G4 included in the driving circuit can be electrically connected to GT4 in FIG. 34; or, The first driving signal output terminal G1 included in the driving circuit may be electrically connected to GT2 in FIG. 34, and the second driving signal output terminal G2 included in the driving circuit may be electrically connected to GT3 in FIG. 34. The third driving signal output terminal G3 included in the driving circuit may be electrically connected to GT3 in FIG. 34, and the fourth driving signal output terminal G4 included in the driving circuit may be electrically connected to GT4 in FIG. 34, but not limited to this.

In at least one embodiment shown in FIGS. 34, P11 and P12 form a pixel electrode group, P13 and P14 form a pixel electrode group, P15 and P16 form a pixel electrode group, P17 and P18 form a pixel electrode group, and P19 and P110 form a pixel electrode group, P21 and P22 form a pixel electrode group, P23 and P24 form a pixel electrode group, P25 and P26 form a pixel electrode group, P27 and P28 form a pixel electrode group, P29 and P210 form a pixel electrode group.

In at least one embodiment of the present disclosure, two rows of gate lines are arranged between two rows of adjacent pixel electrodes;

The gate electrode of one of the two transistors electrically connected to the same row of data line is electrically connected to one of the two rows of gate lines, and the gate electrode of the other of the two transistor electrically connected to the same column of data lines is electrically connected to the other of the two rows of gate lines;

The width along the first direction of the conductive connection portion between the two transistors electrically connected to the same column of data line and the column of data line is greater than the minimum width of the data line along the first direction;

The first direction is the extending direction of the gate lines.

Optionally, the first direction may be a horizontal direction, but not limited thereto.

The display device described in at least one embodiment of the present disclosure may further include a plurality of rows and a plurality of columns of common electrodes;

The two adjacent rows of common electrodes are electrically connected by a crossing line, and the crossing line is arranged on the same layer as the pixel electrode.

In at least one embodiment of the present disclosure, the pixel electrodes corresponding to the two ends of the crossing line have avoiding portions.

Optionally, at the overlapping position of the crossing line and the gate line, the line width of the gate line is smaller than the maximum line width of the gate line.

Figure 36:
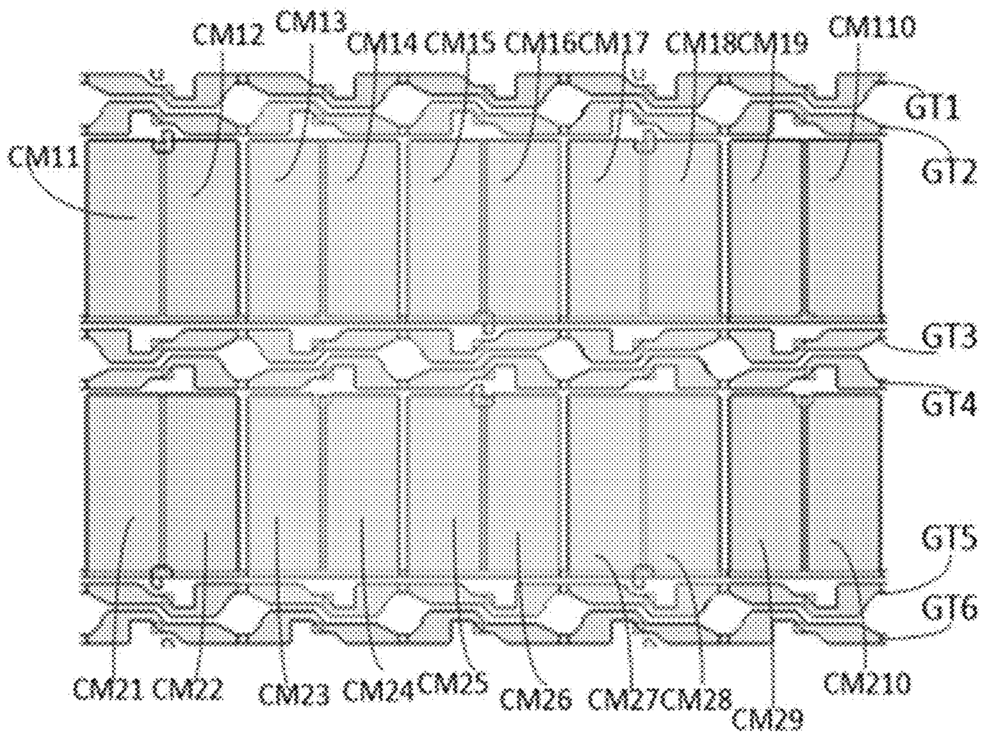
FIG. 36 is a layout diagram of the common electrode, the gate electrodes of display control transistor and each gate line in FIG. 35B.

As shown in FIG. 36, in at least one embodiment of the present disclosure, the gate lines are in a zigzag design, and the two gate lines located between two adjacent rows of pixel circuits are designed approximately axisymmetrically, so that the blank area between two adjacent gate lines is just enough to set the wider part of the data line.

Figure 35A:
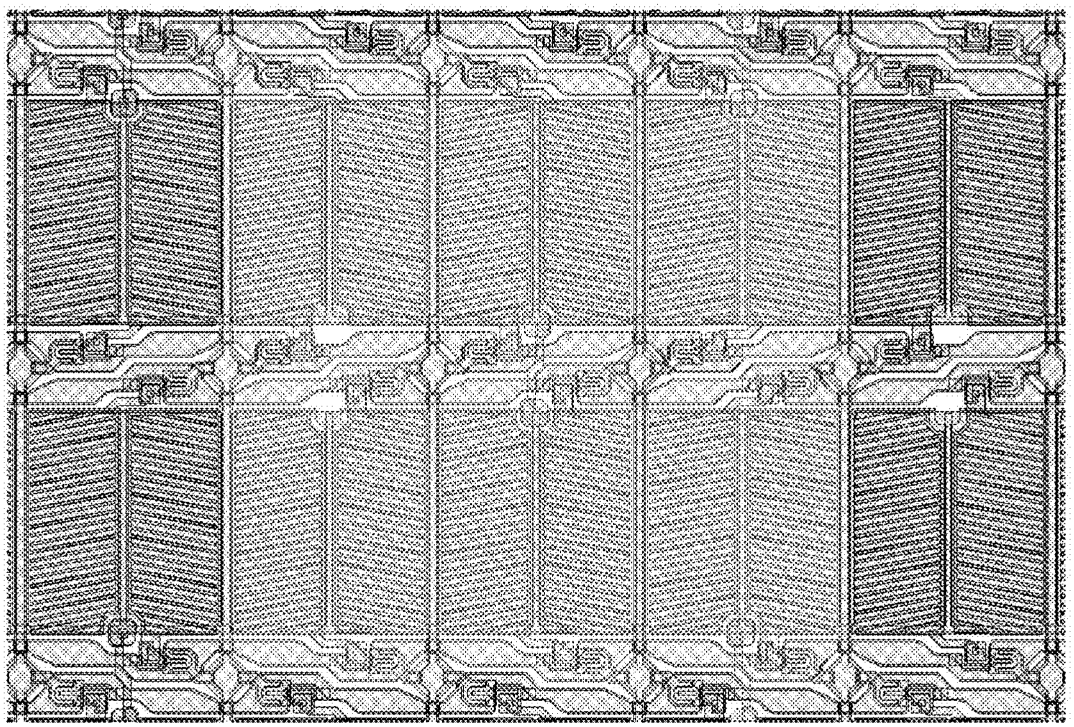
FIGS. 35A, 35B and 35C are layout diagrams of a display substrate including pixel circuits shown in FIG. 34 according to at least embodiment of the present disclosure.
Figure 35B:
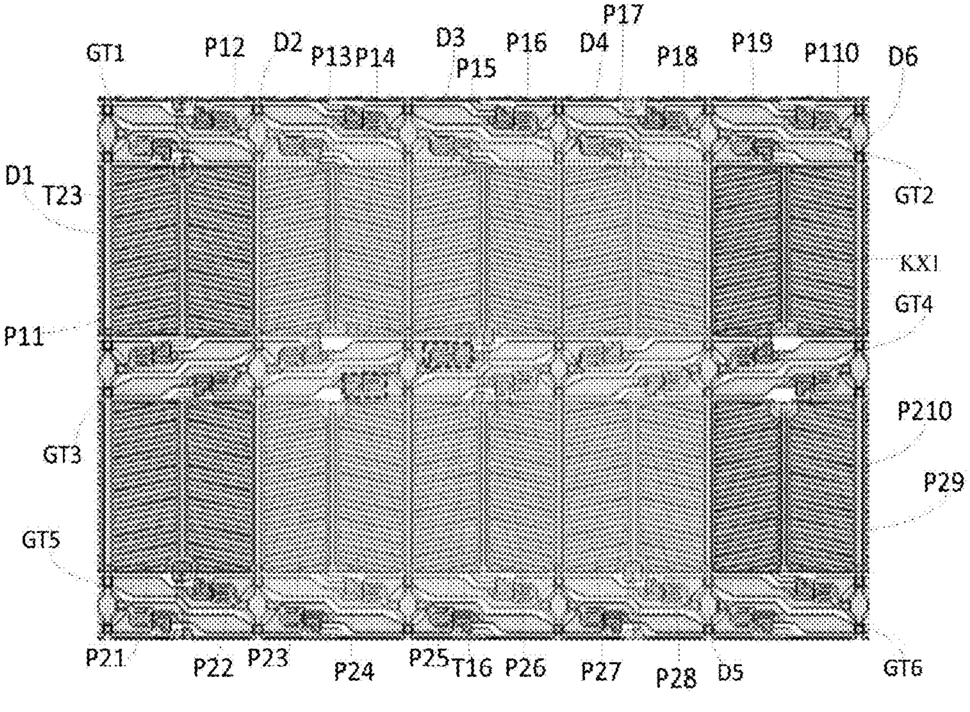
Figure 35C:
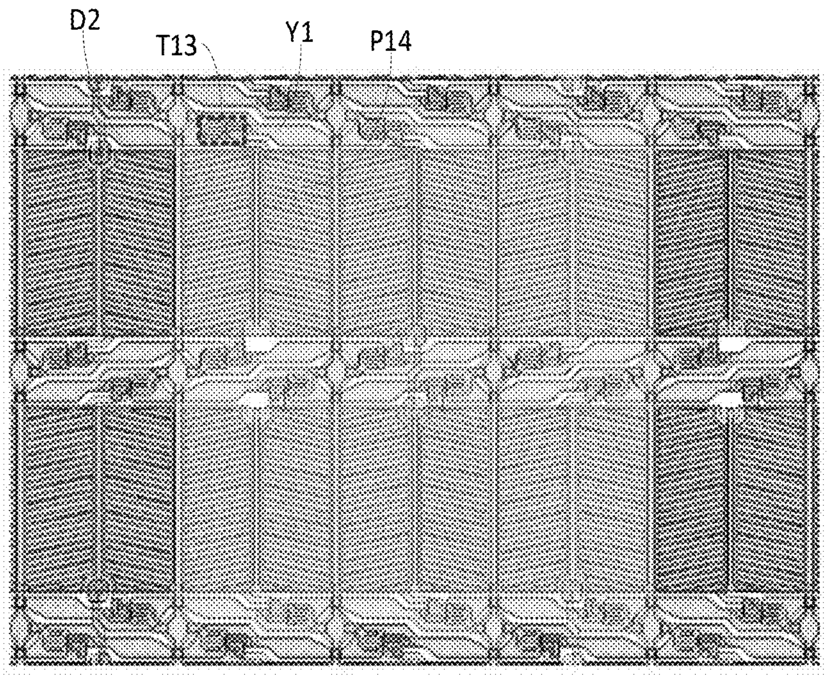

FIG. 35A, FIG. 35B and FIG. 35C are layout diagrams of a display substrate including pixel circuits shown in FIG. 34.

Figure 37:
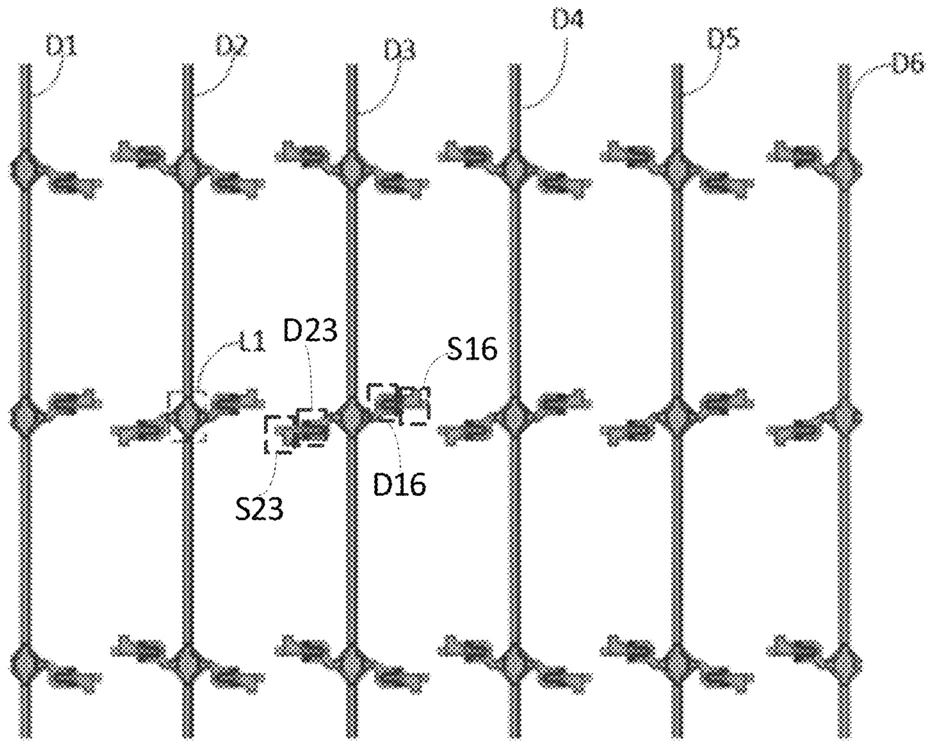
FIG. 37 is a layout diagram of the data line, the source electrode of each display control transistor, the drain electrode of each display control transistor, and the active layer of each display control transistor in FIG. 35B.
Figure 38:
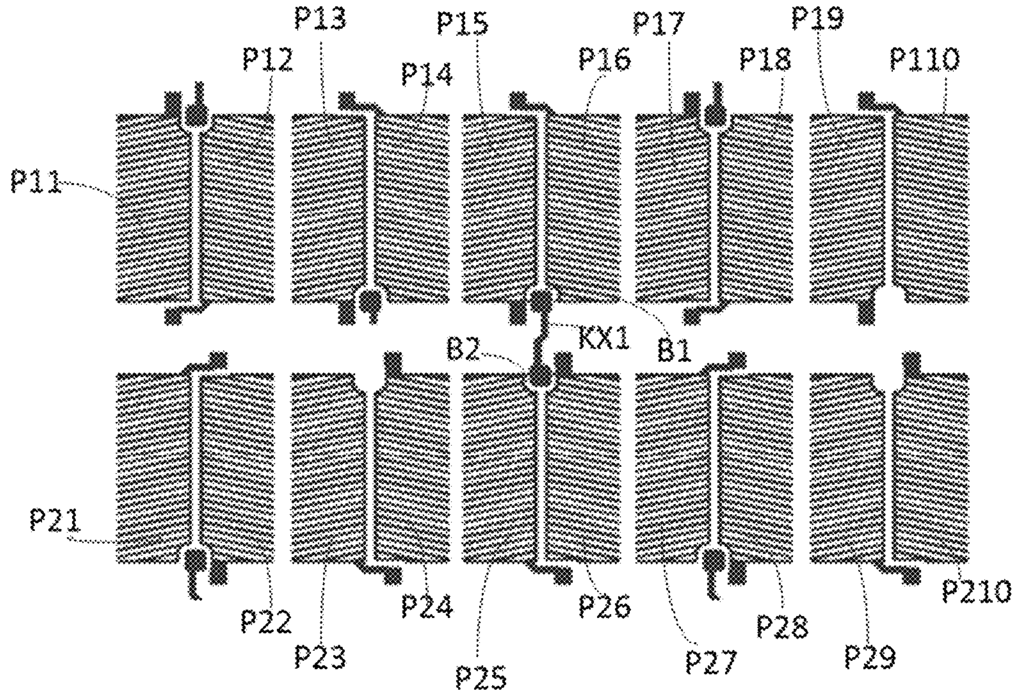
FIG. 38 is a layout diagram of pixel electrodes and crossing lines in FIG. 35B.

FIG. 36 is a layout diagram of the common electrode, the gate electrode of each display control transistor and each gate line in FIG. 35B;

FIG. 37 is a layout diagram of the data line, the source electrode of each display control transistor, the drain electrode of each display control transistor, and the active layer of each display control transistor in FIG. 35B;

FIG. 38 is a layout diagram of pixel electrodes and crossing lines in FIG. 35B.

In FIG. 35C, the one labeled D2 is the second column of data line, the one labeled T13 is the first row and the third column of display control transistor, the one labeled Y1 is the first extension line, and the one labeled P14 is the first row and the fourth column of pixel electrode.

As shown in FIG. 35C, the source electrode of T13 is electrically connected to the first row and fourth column of pixel electrode P14 through the first extension line Y1.

As shown in FIGS. 35A-38, the common electrode is a plate-shaped electrode, and the common electrode can be located on the same layer as the gate electrode of each display control transistor and the gate line; the pixel electrode may arranged at a side of the common electrode away from the base substrate, or the common electrode can also be set on the side of the pixel electrode away from the base substrate, that is, the pixel electrode is on the bottom and the common electrode is on the top. At this time, the common electrode is designed with a slit, which is not limited herein. The semiconductor layer of the transistor in this disclosure may be an amorphous silicon semiconductor layer, a low-temperature polysilicon semiconductor layer, or an oxide semiconductor layer, etc., which is not limited herein.

In FIG. 37, the one labeled D23 is the drain electrode of T23, the one labeled S23 is the source electrode of T23, the one labeled D16 is the drain electrode of T16, and the one labeled S16 is the source electrode of T16.

As shown in FIG. 37, the one labeled L1 is the conductive connection portion between T13, T22 and D2. The width of L1 along the horizontal direction is greater than the minimum width of D2 along the horizontal direction, so that the pillar spacer (PS) can be arranged on the conductive connection portion to support the display panel; optionally, the PS can be arranged on the color filter substrate or on the array substrate.

In FIG. 36, the one labeled CM11 is the first row and the first column of common electrode, the one labeled CM12 is the first row and the second column of common electrode, and the one labeled CM13 is the first row and the third column of common electrode, the one labeled CM14 is the first row and the fourth column of common electrode, the ones labeled CM15 are the first row and the fifth column of common electrode, the one labeled CM16 is the first row and the sixth column of common electrode, and the one labeled CM17 is the first row and the seventh column of common electrode, the one labeled CM18 is the first row and eighth column of common electrode, the one labeled CM19 is the first row and ninth column of common electrode, and the one labeled CM110 is the first row and tenth column of common electrode.

The one labeled CM21 is the second row and the first column of common electrode, the one labeled CM22 is the second row and the second column of common electrode, and the one labeled CM23 is the second row and the third column of common electrode, the one labeled CM24 is the second row and the fourth column of common electrode, the ones labeled CM25 are the second row and the fifth column of common electrode, the one labeled CM26 is the second row and the sixth column of common electrode, and the one labeled CM27 is the second row and the seventh column of common electrode, the one labeled CM28 is the second row and eighth column of common electrode, the one labeled CM29 is the second row and ninth column of common electrode, and the one labeled CM210 is the second row and tenth column of common electrode.

As shown in FIG. 36 and FIG. 35B, the one labeled GT1 is the first row of gate line, the one labeled GT2 is the second row of gate line, the one labeled GT3 is the third row of gate line, and the one labeled GT4 is the fourth row of gate line, the one labeled GT5 is the fifth row of gate line, and the one labeled GT6 is the sixth row of gate line.

In at least one embodiment of the present disclosure, CM11, CM12, CM13, CM14, CM15, CM16, CM17, CM18, CM19 and CM110 are electrically connected to each other to form a strip-shaped common electrode;

CM21, CM22, CM23, CM24, CM25, CM26, CM27, CM28, CM29 and CM210 are electrically connected to each other to form a strip-shaped common electrode.

In FIG. 35B, the one labeled T16 is the first row and the sixth column of display control transistor, and the one labeled T23 is the second row and the third column of display control transistor.

In FIG. 37 and FIG. 35B, the one labeled D1 is the first data line, the one labeled D2 is the second data line, the one labeled D3 is the third data line, the one labeled D4 is the fourth data line, the one labeled D5 is the fifth data line, and the one labeled D6 is the sixth data line.

In FIG. 38 and FIG. 35B, the one labeled P11 is the first row and the first column of pixel electrode, the one labeled P12 is the first row and the second column of pixel electrode, the one labeled P13 is the first row and the third column of pixel electrode, the one labeled P14 is the first row and the fourth column of pixel electrode, the one labeled P15 is the first row and the fifth column of pixel electrode, the one labeled P16 is the first row and the sixth column of pixel electrode, the one labeled P17 is the first row and the seventh column of pixel electrode, the one labeled P18 is the first row and the eighth column of pixel electrode, the one labeled P19 is the first row and the ninth column of pixel electrode, the one labeled P110 is the first row and the tenth column of pixel electrode;

the one labeled P21 is the second row and the first column of pixel electrode, the one labeled P22 is the second row and the second column of pixel electrode, the one labeled P23 is the second row and the third column of pixel electrode, the one labeled P24 is the second row and the fourth column of pixel electrode, the one labeled P25 is the second row and the fifth column of pixel electrode, the one labeled P26 is the second row and the sixth column of pixel electrode, the one labeled P27 is the second row and the seventh column of pixel electrode, the one labeled P28 is the second row and the eighth column of pixel electrode, the one labeled P29 is the second row and the ninth column of pixel electrode, the one labeled P210 is the second row and the tenth column of pixel electrode;

The one labeled KX1 is the first crossing line, and the first crossing line KX1 is located on the same layer as each pixel electrode;

KX1 is used to electrically connect CM15, CM16, CM25 and CM26.

As shown in FIG. 38, the upper terminal of KX1 corresponds to P15 and P16, and P15 and P16 have a first avoiding portion B1 in order to set KX1;

The lower terminal of KX1 corresponds to P25 and P26, and P25 and P26 have a second avoiding portion B2 in order to set KX1.

In at least one embodiment of the present disclosure, taking P11, P12, P21 and P22 as one unit, P21 can be rotated 180 degrees in the horizontal direction, and P22 can also be rotated 180 degrees in the horizontal direction, so that the domains of P11 and P22 are the same, the domain of P12 is the same as that of P21;

Taking P13, P14, P23, and P24 as one unit, P23 can be rotated 180 degrees in the horizontal direction, and P24 can also be rotated 180 degrees in the horizontal direction, so that the domain of P13 is the same as that of P24, and the domain of P14 is the same as that of P23;

Taking P15, P16, P25, and P26 as one unit, P25 can be rotated 180 degrees in the horizontal direction, and P26 can also be rotated 180 degrees in the horizontal direction, so that the domain of P15 is the same as that of P26, and the domain of P16 is the same as that of P25;

Taking P17, P18, P27, and P28 as one unit, P27 can be rotated 180 degrees in the horizontal direction, and P28 can also be rotated 180 degrees in the horizontal direction, so that the domain of P17 is the same as that of P28, and the domain of P18 is the same as that of P27;

Taking P19, P110, P29, and P210 as one unit, P29 can be rotated 180 degrees in the horizontal direction, and P210 can also be rotated 180 degrees in the horizontal direction, so that the domain of P19 is the same as that of P210, and the domain of P110 is the same as that of P29.

In a specific implementation, each pixel electrode may be provided with an avoiding portion, and it is not limited that the pixel electrode corresponding to the crossing line has an avoiding portion.

As shown in FIG. 35A-FIG. 38, at the overlapping position of the first crossing line KX1 and the third row of gate line GT3, the line width of the third row of gate line GT3 is smaller than the maximum width of the third row of gate line GT3, which can reduce the parasitic capacitance formed by the overlapping portion between the crossing line and the gate line;

At the overlapping position of the first crossing line KX1 and the fourth row of gate line GT4, the line width of the fourth row of gate line GT4 is smaller than the maximum line width of the fourth row of gate line GT4.

The display device provided by the embodiments of the present disclosure may be any product or component with a display function, such as a mobile phone, a tablet computer, a television, a monitor, a notebook computer, a digital photo frame, a navigator, and the like.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display driving circuit, comprising two gate driving circuits, wherein the two gate driving circuits are respectively arranged on two opposite sides of a display panel; the gate driving circuit includes a plurality of cascaded driving circuits;

the driving circuit includes N clock signal terminals, N output sub-circuits and N driving signal output terminals; N is an integer greater than or equal to 2; the N output sub-circuits share a first pull-up node;

an nth output sub-circuit is used to control to output an nth driving signal through an nth driving signal output terminal according to an nth clock signal provided by an nth clock signal terminal under the control of a potential of the first pull-up node; n is a positive integer less than or equal to N;

an ith driving signal output terminal of one of the two driving circuits is electrically connected to an (i+j)th driving signal output terminal of the other of the two driving circuits, and both i and j are positive integers, i is a positive integer less than or equal to N, j is a positive integer less than or equal to N, and i+j is a positive integer less than or equal to N;

when a potential of an ith clock signal provided by the ith clock signal terminal among the N clock signal terminals jumps from an invalid level to a valid level, the potential of the first pull-up node is a first voltage value, when a potential of an (i+j)th clock signal provided by the (i+j)th clock signal terminal among the N clock signal terminals jumps from an invalid level to a valid level, the potential of the first pull-up node is a second voltage value; the first voltage value is not equal to the second voltage value;

a time period during which the potential of the ith clock signal continues to be at the valid level and a time period during which the potential of the (i+j)th clock signal continues to be at the valid level at least partially overlap;

a time point when the potential of the ith clock signal jumps from the valid level to the invalid level is different from a time point when the potential of the (i+j)th clock signal jumps from the valid level to the invalid level;

wherein the driving circuit further includes a first input sub-circuit, a first pull-down sub-circuit, a first pull-down node control sub-circuit, and N output reset sub-circuits; the N output reset sub-circuits share the first pull-down node;

the first input sub-circuit is configured to control the potential of the first pull-up node under the control of a first input signal provided by the first input terminal;

the first pull-down sub-circuit is electrically connected to the first pull-up node, the first pull-down node, a first reset terminal and the first voltage terminal respectively, and is used to control to connect the first pull-up node and the first voltage terminal under the control of the potential of the first pull-down node, and control to connect the first pull-up node and the first voltage terminal under the control of a first reset signal provided by the first reset terminal;

the first pull-down node control sub-circuit is electrically connected to a first control voltage terminal, the first pull-up node, the first pull-down node and the first voltage terminal, and is configured to control the potential of the first pull-down node under the control of a first control voltage provided by the first control voltage terminal and the potential of the first pull-up node, according to a first voltage signal provided by the first voltage terminal;

an nth output reset sub-circuit is electrically connected to the first pull-down node, a second voltage terminal, and an nth driving signal output terminal, and is used to control to connect the nth driving signal output terminal and the second voltage terminal under the control of the potential of the first pull-down node.

2. The display driving circuit according to claim 1, wherein when the potential of the ith clock signal jumps from the valid level to the invalid level, the potential of the first pull-up node is a third voltage value; when the potential of the (i+j)th clock signal jumps from the valid level to the invalid level, the potential of the first pull-up node is a fourth voltage value;

the third voltage value is not equal to the fourth voltage value.

3. The display driving circuit according to claim 1, wherein when the potential of the ith clock signal jumps from the invalid level to the valid level, within a first time period, the potential of the first pull-up node rises by a first potential height;

when the potential of the (i+j)th clock signal jumps from the invalid level to the valid level, within a second time, the potential of the first pull-up node rises by a second potential height;

the first potential height is not equal to the second potential height, and/or, the first time is not equal to the second time.

4. The display driving circuit according to claim 3, wherein the driving circuit includes a capacitor arranged between an ath driving signal terminal and the first pull-up node, the first time is less than the second time, and the first potential height is smaller than the second potential height; a is an even number, and a is a positive integer; or;

the driving circuit includes a capacitor arranged between a bth driving signal terminal and the first pull-up node, the first time is greater than the second time, and the first potential height is greater than the second potential height; b is an odd number, and b is a positive integer.

5. The display driving circuit according to claim 1, wherein when the potential of the ith clock signal jumps from the valid level to the invalid level, within a third time period, the potential of the first pull-up node drops by a third potential height;

when the potential of the (i+j)th clock signal jumps from the valid level to the invalid level, within a fourth time, the potential of the first pull-up node drops by a fourth potential height;

the third potential height is not equal to the fourth potential height, and/or, the third time is not equal to the fourth time.

6. The display driving circuit according to claim 5, wherein the driving circuit includes a capacitor arranged between the ath driving signal terminal and the first pull-up node, the third time is less than the fourth time, and the third potential height is greater than the fourth potential height; a is an even number, and a is a positive integer; or;

the driving circuit includes a capacitor arranged between the bth driving signal terminal and the first pull-up node, the third time is greater than the fourth time, and the third potential height is less than the fourth potential height; b is an odd number, and b is a positive integer.

7. The display driving circuit according to claim 1, wherein the driving circuit further includes a first carry signal output terminal and a first carry output sub-circuit;

the first carry output sub-circuit is electrically connected to the first pull-up node, the first carry signal output terminal and a first carry clock signal terminal respectively, and is configured to control to connect the first carry signal output terminal and the first carry clock signal terminal under the control of the potential of the first pull-up node, wherein the first input sub-circuit is respectively electrically connected to the first input terminal, the first input voltage terminal and the first pull-up node, is configured to control to connect the first pull-up node and the first input voltage terminal under the control of the first input signal provided by the first input terminal;

the first input terminal is a first carry signal output terminal of an adjacent previous stage of driving circuit;

the first input voltage terminal is a first carry signal output terminal of the adjacent previous stage of driving circuit, a cth driving signal output terminal included in the adjacent previous stage of driving circuit or a third voltage terminal; c is a positive integer less than or equal to N.

8. The display driving circuit according to claim 7, wherein the nth output sub-circuit comprises an nth output transistor;

a control electrode of the nth output transistor is electrically connected to the first pull-up node, a first electrode of the nth output transistor is electrically connected to the nth clock signal terminal, and a second electrode of the nth output transistor is electrically connected to the nth driving signal output terminal;

the first carry output sub-circuit includes a first carry output transistor;

a control electrode of the first carry output transistor is electrically connected to the first pull-up node, a first electrode of the first carry output transistor is electrically connected to the first carry clock signal terminal, and a second electrode of the first carry output transistor is electrically connected to the first carry signal output terminal;

the nth output reset sub-circuit includes an nth output reset transistor;

a control electrode of the nth output reset transistor is electrically connected to the first pull-down node, a first electrode of the nth output reset transistor is electrically connected to the nth driving signal output terminal, and a second electrode of the nth output reset transistor is electrically connected to the second voltage terminal.

9. The display driving circuit according to claim 8, wherein the driving circuit further comprises a first on-off control sub-circuit;

the first on-off control sub-circuit is electrically connected to a touch enable terminal, a first connection node and the first pull-up node respectively, and is configured to control to connect or disconnect the first connection node and the first pull-up node under the control of a touch enable signal provided by the touch enable terminal, wherein the first on-off control sub-circuit comprises a first on-off control transistor;

a control electrode of the first on-off control transistor is electrically connected to the touch enable terminal, a first electrode of the first on-off control transistor is connected to the first pull-up node, and a second electrode of the first on-off control transistor is electrically connected to the first connection node.

10. The display driving circuit according to claim 1, wherein the driving circuit further comprises N capacitors;

a first terminal of an nth capacitor among the N capacitors is electrically connected to the first pull-up node, and a second terminal of the nth capacitor among the N capacitors is electrically connected to the nth driving signal output terminal.

11. The display driving circuit according to claim 1, wherein the driving circuit further includes M clock signal terminals, M output sub-circuits, a second carry output sub-circuit, M driving signal output terminals and a second carry signal output terminal; the M output sub-circuits share a second pull-up node;

an (N+m)th output sub-circuit is configured to output an (N+m)th driving signal through an (N+m)th driving signal output terminal according to an (N+m)th clock signal provided by the (N+m)th clock signal terminal under the control of a potential of the second pull-up node, m is a positive integer less than or equal to M, and M is a positive integer greater than or equal to 2;

the second carry output sub-circuit is electrically connected to the second pull-up node, the second carry signal output terminal and the second carry clock signal terminal, and is configured to control to connect the second carry signal output terminal and the second carry clock signal terminal under the control of the potential of the second pull-up node.

12. The display driving circuit according to claim 11, wherein the driving circuit further comprises M capacitors;

a first terminal of an mth capacitor among the M capacitors is electrically connected to the second pull-up node, and a second terminal of the mth capacitor among the M capacitors is connected to the (N+m)th driving signal output terminal.

13. The display driving circuit according to claim 11, wherein the driving circuit further includes a second input sub-circuit, a second pull-down sub-circuit, a second pull-down node control sub-circuit, and M output reset sub-circuits; the M output reset sub-circuits share a second pull-down node;

the second input sub-circuit is configured to control the potential of the second pull-up node under the control of a second input signal provided by the second input terminal;

the second pull-down sub-circuit is respectively electrically connected to the second pull-up node, the second pull-down node, the second reset terminal and the first voltage terminal, and is used to control to connect the second pull-up node and the first voltage terminal under the control of a potential of the second pull-down node, and control to connect the second pull-up node and the first voltage terminal under the control of a second reset signal provided by the second reset terminal;

the second pull-down node control sub-circuit is electrically connected to a second control voltage terminal, the second pull-up node, the second pull-down node, and the first voltage terminal, is configured to control the potential of the second pull-down node under the control of a second control voltage provided by the second control voltage terminal and the potential of the second pull-up node according to the first voltage signal provided by the first voltage terminal;

the (N+m)th output reset sub-circuit is electrically connected to the second pull-down node, the second voltage terminal, and the (N+m)th driving signal output terminal, and is used to control to connect the (N+m)th driving signal output terminal and the second voltage terminal under the control of the potential of the second pull-down node.

14. The display driving circuit according to claim 13, wherein the driving circuit further comprises a second carry reset sub-circuit;

the second carry reset sub-circuit is electrically connected to the second pull-down node, the second carry signal output terminal and the first voltage terminal, and is used to control to connect the second carry signal output terminal and the first voltage terminal under the control of the potential of the second pull-down node, wherein the second carry reset sub-circuit comprises a third carry reset transistor and a fourth carry reset transistor;

a control electrode of the third carry reset transistor is electrically connected to the second pull-down node, a first electrode of the third carry reset transistor is electrically connected to the second carry signal output terminal, and a second electrode of the third carry reset transistor is electrically connected to the first voltage terminal;

a control electrode of the fourth carry reset transistor is electrically connected to the first pull-down node, a first electrode of the fourth carry reset transistor is electrically connected to the second carry signal output terminal, and a second electrode of the fourth carry reset transistor is electrically connected to the first voltage terminal.

15. The display driving circuit according to claim 13, wherein the second input sub-circuit is respectively electrically connected to the second input terminal, the second input voltage terminal and the second pull-up node, is configured to control to connect the second pull-up node and the second input voltage terminal under the control of the second input signal provided by the second input terminal;

the second input terminal is a second carry signal output terminal of an adjacent previous stage of driving circuit;

the second input voltage terminal is the second carry signal output terminal of the adjacent previous stage of driving circuit, a dth driving signal output terminal included in the adjacent previous stage of driving circuit or the third voltage terminal; d is a positive integer less than or equal to M, wherein the second carry clock signal terminal is a dth clock signal terminal among the M clock signal terminals;

the second pull-down sub-circuit is further electrically connected to the second input voltage terminal, and is used to control to connect the second pull-down node and the first voltage terminal under the control of the second input voltage provided by the second input voltage terminal;

the second input sub-circuit is also electrically connected to the frame reset terminal, and is also used to control to connect the second pull-up node and the first voltage terminal under the control of the frame reset signal provided by the frame reset terminal.

16. The display driving circuit according to claim 13, wherein the second pull-down sub-circuit comprises a twelfth transistor;

a control electrode of the twelfth transistor is electrically connected to the first pull-down node, a first electrode of the twelfth transistor is electrically connected to the second pull-up node, and a second electrode of the twelfth transistor is electrically connected to the first voltage terminal;

the second pull-down node control sub-circuit includes a thirteenth transistor;

a control electrode of the thirteenth transistor is electrically connected to the first pull-up node, a first electrode of the thirteenth transistor is electrically connected to the second pull-down control node, and a second electrode of the thirteenth transistor is electrically connected to the first voltage terminal.

17. The display driving circuit according to claim 13, wherein the driving circuit further comprises a second on-off control sub-circuit;

the second on-off control sub-circuit is electrically connected to a touch enable terminal, a second connection node and the second pull-up node, and is configured to control to connect or disconnect the second connection node and the second pull-up node under the control of a touch enable signal provided by the touch enable terminal.

18. The display driving circuit according to claim 1, wherein the first pull-down sub-circuit further comprises a tenth transistor;

a control electrode of the tenth transistor is electrically connected to the second pull-down node, a first electrode of the tenth transistor is electrically connected to the first pull-up node, and a second electrode of the tenth transistor is electrically connected to the first voltage terminal;

the first pull-down node control sub-circuit further includes an eleventh transistor;

a control electrode of the eleventh transistor is electrically connected to the second pull-up node, a first electrode of the eleventh transistor is electrically connected to the first pull-down control node, and a second electrode of the eleventh transistor is electrically connected to the first voltage terminal.

19. A display device comprising the display driving circuit according to claim 1.

* * * * *